United States Patent [19]

Zeevi

[11] Patent Number: 4,878,170
[45] Date of Patent: Oct. 31, 1989

[54] VEHICLE NAVIGATION SYSTEM

[76] Inventor: Eliahu I. Zeevi, 475 Cumulus Ave., 16, Sunnyvale, Calif. 94087

[21] Appl. No.: 169,645

[22] Filed: Mar. 17, 1988

Related U.S. Application Data

[63] Continuation-in-part of Ser. No. 27,292, Mar. 17, 1987, abandoned.

[51] Int. Cl.$^4$ ............................................. G06F 15/50
[52] U.S. Cl. .................................. 364/449; 364/444; 340/988; 340/995; 73/178 R
[58] Field of Search ................... 364/424.01, 443, 444, 364/449; 340/988, 990, 995; 73/178 R

[56] References Cited

U.S. PATENT DOCUMENTS

| | | | |
|---|---|---|---|
| 4,633,709 | 1/1987 | Numata et al. | 364/443 |
| 4,646,089 | 2/1987 | Takanabe et al. | 364/449 |
| 4,672,563 | 6/1987 | Harumatsu et al. | 364/449 |
| 4,677,562 | 6/1987 | Uota et al. | 364/449 |
| 4,688,176 | 8/1987 | Hirata | 364/449 |

FOREIGN PATENT DOCUMENTS

| | | | |
|---|---|---|---|
| 0080736 | 6/1983 | European Pat. Off. | 364/443 |
| 61-17911 | 1/1986 | Japan | 364/443 |

Primary Examiner—Gary Chin
Attorney, Agent, or Firm—Townsend and Townsend

[57] ABSTRACT

A vehicle navigation system is provided wherein a preselected route is established in terms of a sequence data and processing means computes sequence action data based on lineal distances between landmarks, such as junctions, and movement detecting means, such as a turn detection, for detecting movement only around an approached landmark in order to synchronize position with the landmark. In accordance with the invention, it is unnecessary to store all geographic data about a region to be traversed during a journey and further computation can be extremely efficient without reliance at any time on detection of direction with respect to magnetic north or other fixed, remote reference. All needed information is incorporated into data related only to distance travelled by the vehicle between landmarks and movement around (e.g., turns) an approached landmark. The system works on the assumption that the vehicle moves in one dimension between predetermined landmarks so that route information can be reduced to a sequence of indicators. The movements around landmarks, or more specifically junction or turns where deviations are expected from a straight line constant velocity path are used to synchronize vehicle location relative to the landmark. The accuracy of map distance between landmarks is assumed within an acceptable error so that synchronization can be obtained within a window distance during which the system seeks synchronization.

36 Claims, 69 Drawing Sheets

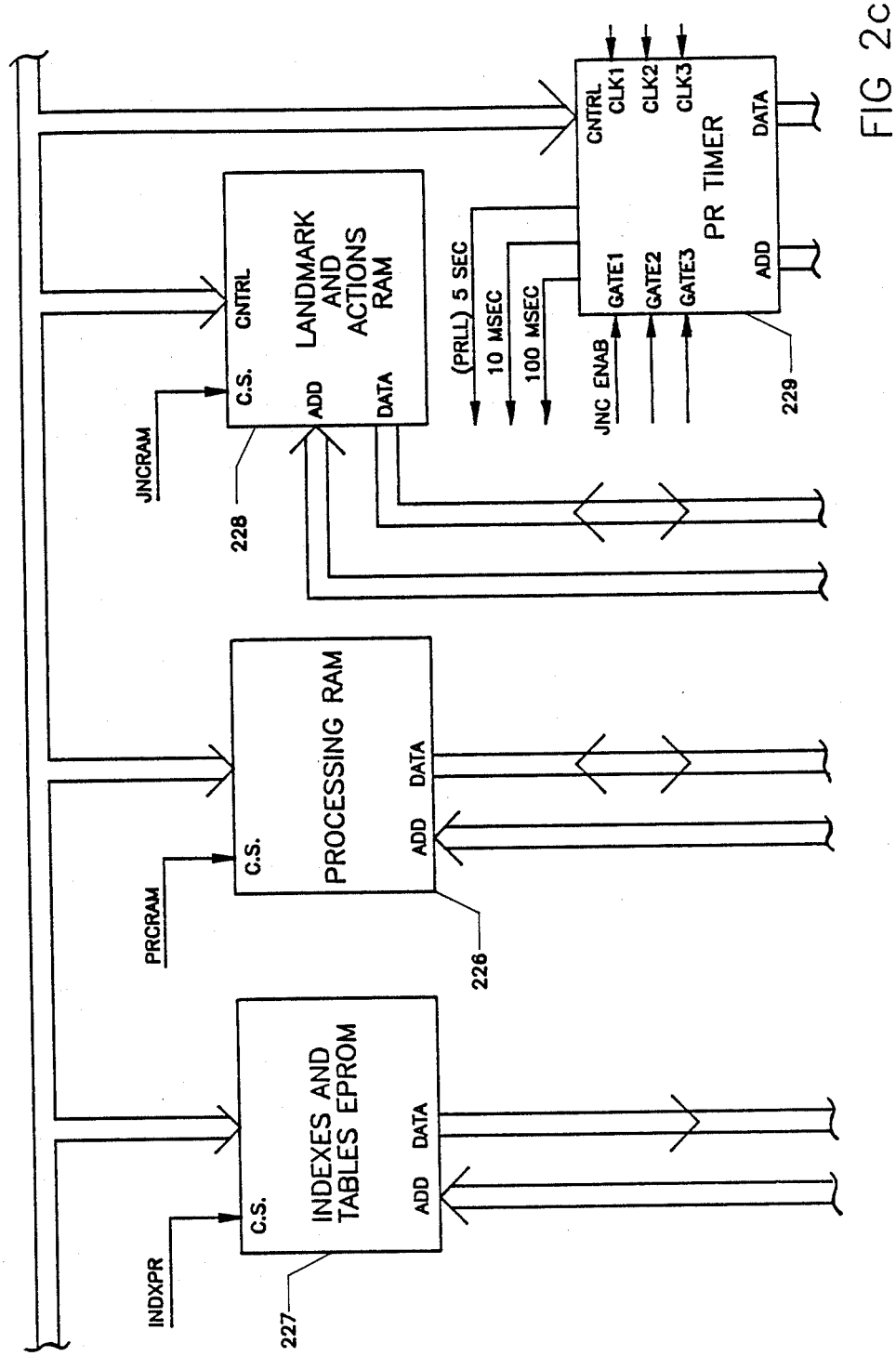

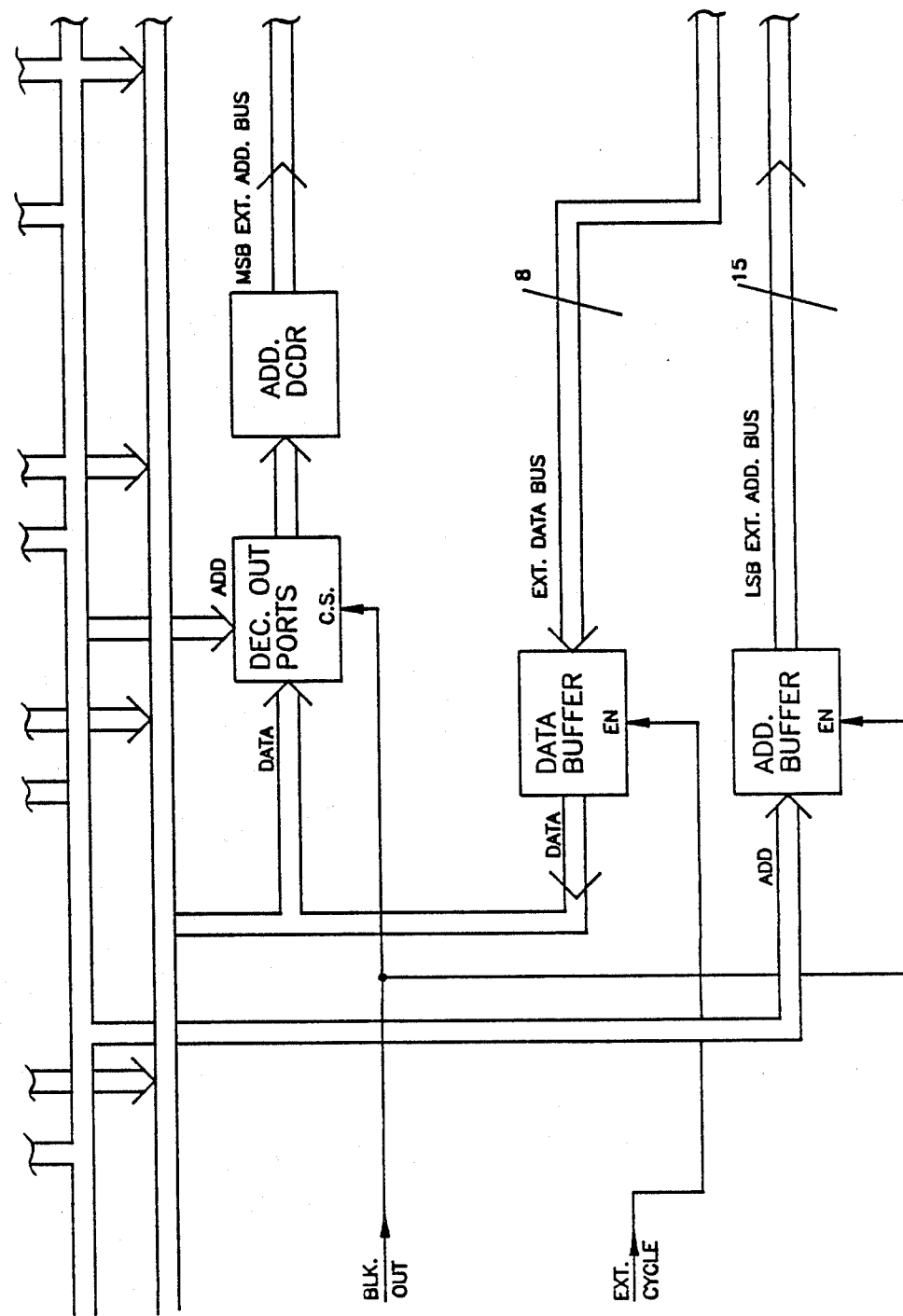

| FIG 2a | FIG 2c | FIG 2e | FIG 2g | FIG 2i |
|--------|--------|--------|--------|--------|
| FIG 2b | FIG 2d | FIG 2f | FIG 2h | FIG 2j |

FIG 3

A. USER (MANUAL)

B. AUTOMATIC MODE

C. STATUS FLAGS (SET DURING ACTION MEMORY CALCULATION)

A. WHEN SYNC. HAS NOT EXECUTED

B. WHEN SYNC. HAS EXECUTED

VEHICLE NAVIGATION SYSTEM

BACKGROUND OF THE INVENTION

This application is a continuation in-part of co-pending U.S. patent application Ser. No. 7/027,292 filed Mar. 17, 1987, now abandoned, the content of which is incorporated herein by reference. The present invention relates to vehicle navigation systems.

Map reading is a skilled task and may cause particular problems in cities where the large number of road intersections and density of traffic can easily give rise to confusion. The problem is compounded when in the absence of a passenger, the driver is forced to do his own map reading and navigation.

The following patents and publications have been cited in the course of prosecution of patent or analog applications to the present application.

| | | | |
|---|---|---|---|
| UK | 2121176A | 12/14/83 | |
| UK | 2020019A | 11/07/79 | |
| UK | 2060880A | 05/07/81 | |
| EP | 0158214 | 10/16/85 | |
| EP | 0110171 | 06/13/84 | (French) |
| PCT | 84/01823 | 05/10/84 | (German) |
| US | 4,688,176 | 08/87 | Hirata |
| US | 4,672,563 | 06/87 | Haramatsu |
| US | 4,633,709 | 01/87 | Numata |
| JP | 61-17911 | 01/87 | Tamura (Japanese) |
| EP | 0080736 | 06/83 | (Japan) |
| UK | 2180066A | 03/18/87 | (Foreign Analog of present application) |

Of the above patents and publications Hirate is representative of a typical two-dimensional navigation system. Location within an area is determined continuously in two spatial dimensions with reference to an absolute reference such as magnetic north.

The Tamara reference is a still further example of a mechanism requiring continuous detection of orientation. Tamura provides for correction of deviation between a "present position" and a "display position" continually and in at least two dimensions with reference to a coordinate system using a direction sensor, an angle sensor, and an azimuth sensor. Other sensors are also provided.

The UK published application No. 218077A published 3/18/87 is not a reference against the present application as it was published less than one year prior to the effective filing date of the present application. The present application describes enhancements of the previously-described system.

SUMMARY OF THE INVENTION

According to the present invention, a vehicle navigation system is provided wherein a preselected processing means computes sequence action data based on lineal distances between landmarks, such as junctions, and movement detecting means, such as a turn detection, for detecting movement only around an approached landmark in order to synchronize position with the landmark.

In accordance with the invention, it is unnecessary to store all geographic data about a region to be traversed during a journey and further computation can be extremely efficient without reliance at any time on detection of direction with respect to magnetic north or other fixed, remote reference. All needed information is incorporated into data related only to distance travelled by the vehicle between landmarks and movement around (e.g. turns) an approached landmark.

The system works on the assumption that the vehicle moves in one dimension between predetermined landmarks so that route information can be reduced to a sequence of indicators. The movements around landmarks, or more specifically junction or turns where deviations are expected from a straight line constant velocity path are used to synchronize vehicle location relative to the landmark. The accuracy of map distance between landmarks is assumed within an acceptable error so that synchronization can be obtained within a window distance during which the system seeks synchronization.

The system eliminates need for a compass and actions related to continuous or even interim reference to compass data.

An object of the invention is to provide a vehicle navigation system which can compute a route to a desired destination.

A further object of the invention is to provide a vehicle navigation system which avoids the need for use of a map.

Another object of the invention is to provide a vehicle navigation system which avoids the need continuously to measure position without sacrificing accuracy.

In one embodiment, the storage means stores one or more specific preset routes. the output means may function to provide a visual display, or to provide audible spoken information, or to provide both spoken information and the visual display.

The main purpose of the system is to assist a vehicle driver to navigate from a given starting point to a desired destination along a route selected from data representing a map. The system employs a non-volatile memory device for storing data representing a map for a region, a city, a village, or a route etc. The memory device may be designed as a plug-in unit and will be prepared in advance for the user.

Data may be entered into the system by the user by means of a portable key board optionally provided inside the vehicle.

Navigation and guiding instructions for the driver may be displayed on a visual display unit.

The vehicle location is determined preferably from the following devices: a distance sensor deriving data from wheel revolution; and a turn sensor, e.g., an angle sensor preferably deriving data from rotation of the steering wheel of the vehicle. If desired, two distance sensors may be provided associated with two differing road wheels, and such a pair of sensors may function as an turn detector.

The correlation between the vehicle actual location and the current vehicle location assumed (i.e. computed) by the system is preferably regularly updated. This ensures that the system remains accurately synchronized with the moving vehicle. In a preferred embodiment of the invention, the system can automatically reset itself every time the vehicle makes a significant detectable movement, such as a turn at a recognized intersection (junction) or other landmark. It is possible of course to identify the vehicle position with precision when a turn is made at an intersection since the vehicle is forced to adhere to the public highways and roads whose locations are accurately known and defined by data stored in the system memory. Thus, when the turn is detected, it may be assumed that the vehicle is precisely at a recognized street intersection. Other detectable movements may also be employed for system synchronization or accurate positioning, such as a deceleration movement or a stopping movement.

A window enable distance is defined corresponding to a period during which the system is enabled to await the automatic synchronizing action, preferably a turn, (which will be marked in the data base format as a synchronizing turn), and during the enable period at the location when the integration over a time interval of the measured speed multiplied by the measured angle detected by the turn detector is a maximum, the system will be synchronized. This point may be regarded as the point on the road where the rate of turn is the greatest, because the actual angle of the turn in a given time interval is proportional to the integration of the measured speed multiplied by the measured angle over that time interval.

If desired, the system may be adapted to receive data from three different memory units. These three units may be:

a. A country memory unit which would normally be an integral part of the system;

b. A city unit which may be a plug-in unit to allow for road map data of various cities; and c. A plug-in memory unit for various special applications such as location of favorite hotels, restaurants or sports arenas or for playing games.

The country memory unit would normally store data representing all the main roads such as motorways or main cross-country highways and all main roads leading to city centers. The city plug-in unit would store all the roads within a certain city. The third plug-in unit can be adapted to various purposes in dependence upon the wishes of the user. It is possible to employ the system only with the country memory unit in place. It would be possible however to use the system with the country memory unit and the city memory unit. It is also of course possible to employ the system with the country memory unit and the special applications unit and it is even possible to omit the country memory unit and rely only on one or both of the other units although, as stated above, the country memory unit will normally be an integral part of the system.

Usually, the special applications memory unit will be used with the city memory unit or with both the city memory unit and the country memory unit. This is because, in a preferred embodiment, the special applications memory unit will contain names of places referred to an intersection number in one of the other memory units, and normally to an intersection number which is defined in the city memory unit.

Of course any combination of units may be plugged into the system, but when only the special applications memory unit is employed (if the country memory unit is not an integral part of the system) it is possible to use the system for playing games etc, and not for navigation. When the country memory unit is an integral part of the system (which it preferably will be) and the special applications memory unit is employed, the potential of the system for navigation through the special applications memory unit will be quite limited, since the country memory unit will naturally not include many special places, because it will contain mostly highways.

It would be recommended to implement the various kinds of the memory units as follows:

The special applications memory unit may be implemented in ROM or EPROM, and the system will access it directly. The country memory unit and the city memory units may also be implemented by providing a magnetic tape cassette containing the data about the various countries or cites. The system may also include dynamic RAM with capacity of around 5 MB-10 MB. The country tape cassette would be loaded into the system just once, or when the vehicle travels to a different country. The city memory unit would be loaded into the dynamic RAM before "data verification and fixing" (only if changing zone). If the journey were between two different zones stored in two different tape cassettes, the data about the zones will be loaded into the dynamic RAM from each tape cassette separately for "data verification and fixing" and "path outline" stages.

For a better understanding of the invention, and to show how the same may be carried into effect, reference will now be made by way of example to the accompanying drawings which show preferred embodiments of the invention:

BRIEF DESCRIPTION OF THE DRAWINGS

FIG. 3 is a diagram showing how the Figures of FIG. 2 are assembled together;

DESCRIPTION OF SPECIFIC EMBODIMENTS GENERAL DESCRIPTION

Before embarking on a detailed description of the system, it will be useful to give a generalized description of the system operation.

General System Operation

Figure 1:
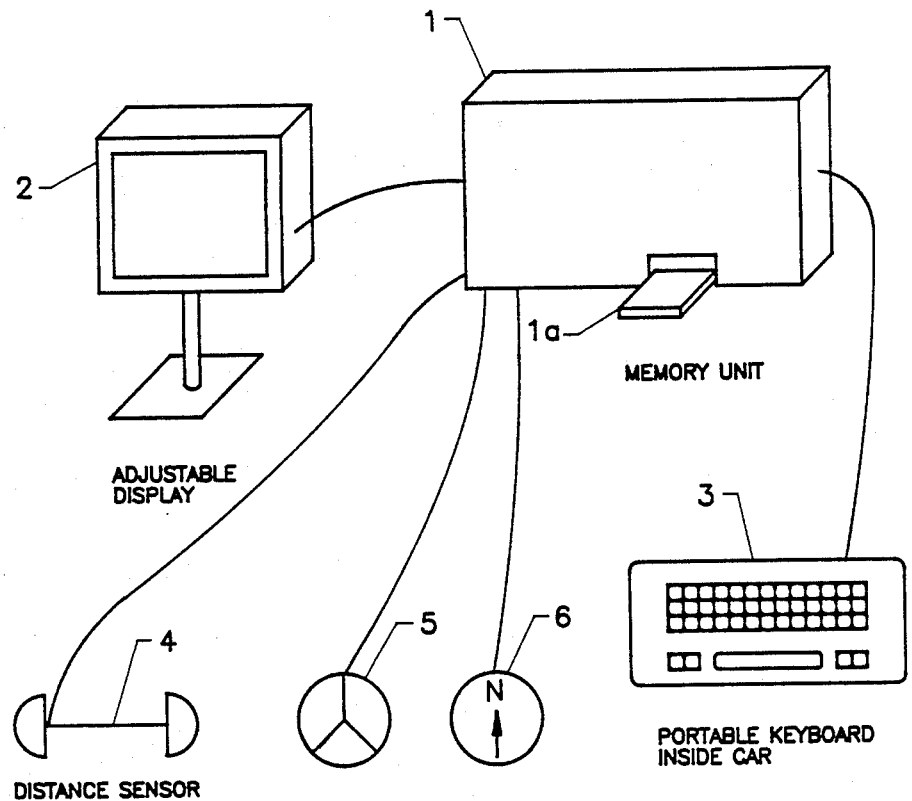
FIG. 1 is a schematic diagram of a vehicle navigation system in accordance with one embodiment of the invention.

Reference will first of all be made to FIG. 1 which is a diagrammatic representation of apparatus used in the navigation system according to on embodiment of the invention. FIG. 1 illustrates a central processing and control unit 1 having an input slot for receiving a memory unit 1a which will contain data representing streets, roads, junctions and other landmarks, etc. The unit 1 is connected to a display unit 2 and a portable keyboard 3 for input of data. Furthermore, the system comprises a distance sensor 4 operably associated with the wheels of the vehicle, and an angle sensor 5 provided in the steering mechanism of the vehicle indicating front wheel angle. Unit 1 receives data from the sensors 4 and 5 to determine the distance travelled by the vehicle, and the angle turned through by the vehicle. Optionally a compass may be provided to determine absolute orientation of the vehicles with respect to magnetic north at selected positions such as at the starting landmark.

In the preferred embodiment the compass 6 is used only to preset the vehicle orientation relative to the starting landmark before commencement of a journey. During the journey, the unit 1 then operates solely on data continuously received from the distance sensor 4. However, in a window distance around a landmark, the unit 1 operates both as data continuously received from the distance sensors and on continuously received data from the angle sensor 5. This is sufficiently accurate since the unit 1 operates on the assumption that the vehicle is travelling only on recognized highways and roads. This enables the unit 1 to compensate for minor errors in positioning as will be explained in detail hereinafter.

As far as the user is concerned, he drives the vehicle in the normal manner but follows instructions which appear on the display unit 2 and further instructions which may be supplied to him by spoken commands reproduced from magnetic tape or from a speech synthesizer. Once the system is set up, and is provided with data defining the initial vehicle positions orientation destination, the first instruction appears on the display unit and is preferably arranged to flash and generate an audible bleeping sound before the instruction has been carried out. After the instruction has been executed, the second instruction is displayed and this process is continued until the vehicle reaches the desired preset destination.

Each instruction will include guidance information and the name of the current street in which the vehicle is located. At every passage of the vehicle through a main intersection or junction, the user is notified of the intersecting street name and guidance information is presented both on the display and by means of an audible command of "left" or "right" or "forward", (although the "forward" command may be omitted). Depending upon the vehicle speed, the guidance instruction will be emphasized to the driver at a greater or lesser distance from the intersection. Preferably, at 30 kilometers per hour the instruction will be supplied to the driver at 50 meters from the approached landmark, in the range from 30 to 60 kilometers per hour, an additional 10 meters will be added to the warning distance for every 5 kilometers per hour and in the range from 60 kilometers per hour upwards larger additions will be made so that, for example, at 90 kilometers per hour the warning distance will be 750 meters.

In the same way, the system may be utilized to provide a warning to check other items which vary as a function of the distance travelled by the vehicle. For example, a warning to change oil or to regularly check the oil each several thousands of miles. the system can also be given an indication for calibration or other checks for the navigation system (e.g., for calibration of the angle sensor).

As an additional feature, in addition to the navigation function, the system may be utilized to provide a warning to check the vehicle tires for wear. In other words, the system may provide the user with an indication of the total distance through which the individual tires have travelled and upon reaching a preset distance, such as 30,000 kilometers, the system may remind the user to check the tires.

Before the driver sets out on his journey, the system may be placed in a self-test mode which indicates that the system functioning is normal. The self-test mode provides testing of the memory, the display, the key board and the input output facilities. During travelling, normality of the system may be tested by making a comparison between the output of two sensors installed respectively to measure the speedometer reading (perhaps not the normal vehicle speedometer) and to count wheel revolutions.

If during the course of his journey, the user becomes aware of unusual traffic situations or blocked roads, or decides to choose a particular road for part of his journey, he may insert information through the keyboard to inform the system that a particular road either should or should not be used as part of the route. The system will then operate to select a new route taking account of the inserted information.

As will be apparent, distance travelled by the vehicle is determined basically in accordance with the number of wheel revolutions. In order for this measure to be accurate, it is clearly necessary to know the circumference of the wheel fairly accurately. A scaling factor between the distance and number of wheel revolutions may be preset into the system memory by the manufacturer or assembler of the system. For this purpose, it is preferred to have three different scale factors based upon the type of tires employed, which may be summer tires, winter tires or tires provided with chains for use in icy conditions.

The system may also provide means to enable the user to correct the scaling factor. This may be achieved by measuring the number of wheel revolutions counted by the system as the vehicle drives over a predetermined measured map distance. This allows the system to take account of any mechanical changes in the vehicle or any errors caused by a particular idiosyncratic manner of driving. For recalibration of the scaling factor, a minimum distance (e.g., 20 kilometers) should be employed. It may be recommendable to check the scaling factor every 5,000 kilometers. In order to achieve an error factor of one wheel revolution per 500 kilometers, it is necessary to employ a scaling distance of at least 20 kilometers if the distance sensor (for instance a shaft encoder), is counting 25 pulses per wheel revolution.

In order to achieve this accuracy, it is necessary however to start and finish the scaling from exactly defined points. It would also be recommendable to employ a longer distance than the minimum required (i.e. longer than 20 km).

It would however be possible to carry out automatic scaling as follows:

This scaling would be done over a "scaling distance", which would not be less than a "minimum distance" determined in advance. The scaling shall be done between two junctions, where the system will synchronize itself as hereinafter described. These two synchronization points would be the start and the finish points of the scaling. There will be some tolerance as a result of the way these two points are defined (since the angle sensor is quite limited, it would not be possible to start and finish the automatic scaling function from exactly defined points). These tolerances will be added to the error of the scaling factor for the distance that was employed by the scaling function. Because of this, it would of course be preferred to employ a long distance, such as 500 kilometers, for this function (so that the total error will be no more than one wheel revolution plus the tolerances for a distance of 500 kilometers). Since most journeys are not very long, and the automatic scaling would be done over one journey, it would be appropriate to employ a shorter distance for this function (e.g. 50 km). After one automatic scaling function has been completed, the scaling factor result will be stored in the system as an updated scale factor. The system will start searching for a new scaling factor automatically, and when a new scaling factor has been found, it will again be stored into the system as an updated one, etc. It would be possible to compute more than one scaling factor during one journey. It would also be possible to compute no scaling factors during some of the journeys. However, the last scaling factor that is computed will be stored in the system and will be considered as the updated one. In addition to the scaling function, the automatic scaling will continually compensate for systematic errors. All of the systematic errors will have constant effects on the total accuracy of the system, and they can be much smaller as a result of this function. Systematic errors would be caused, for example, by a style of driving (e.g. frequent overtaking), or by changes in the mechanical condition of the vehicle (e.g. air pressure of the tires).

Implementation of this function will be done by employing two counters: the first will keep track of the distance travelled by the vehicle, as it appears in the memory, and the other counter will count the number of wheel revolutions (or a certain number per wheel revolution) over this distance. The counters will stop counting after the first has reached at least the minimum distance (determined in advance for this purpose). The scaling factor will be the distance which was counted by the first counter, divided by the result in the other counter.

The counters will start counting again at the same synchronization point. If by the end of the journey the first counter has reached at least the minimum distance (e.g. 50 km), and then the system has synchronized itself, a new scaling factor has been computed. If not, the counters will be zeroed and will start counting on the next journey, at the first automatic synchronization point.

It is also necessary to preset into the system a scaling factor representative of the ratio of the angle of the front wheels relative to the vehicle axis and the angle through which the steering wheel has been turned. This scaling factor is also preferably preset into the system memory during manufacture or assembly of the system. Again, the scaling factor may be preset by the user. This may be necessary if the steering wheel system is changed or if changes occur in the mechanical properties of the vehicle. The scale factor is selected in dependence upon the maximum steering angle. The angle through which the steering wheel is turned from one side to the other gives an indication of the wheel angle relative to the steering wheel angle. It may be recommendable to calibrate the angle scaling factor every 5,000 kilometers.

During operation of the system, preferable a data processing operation and test operation is executed once every travelling period between two landmarks. Distance data is added to road counter for forward and reverse driving and during this process the outputs of two sensors are compared for improved reliability. For a map of scale 1:1250, and with a measuring accuracy of $\pm 0.05$ mm, an error of $\pm 12.5$ centimeters will occur for any distance between two landmarks. Although in a city like London, which has relatively flat terrain, height deviations give rise to no significant errors, in a city like San Francisco the height deviations must always be take into account. In practice, a measured distance accuracy of 0.02% may be achieved.

As the vehicle travels along a predetermined route, the measured vehicle location is regularly synchronized with the actual vehicle location so that errors are never allowed to accumulate excessively. This may be achieved by automatic synchronization whenever the vehicle turns through a predetermined angle as measured by the turn sensor at a recognized intersection or junction. Every time calculation indicates the actual vehicle location error to be possibly more than 40 meters, the user may in addition be required to synchronize the system manually at a predetermined landmark. By this means, the deviation calculation may be zeroed. If the user does not synchronize the system when required to do so, the system would nevertheless maintain its normal activity and would ask the user to effect synchronization at the next available opportunity, such manual synchronization would normally be unnecessary, because the regular automatic synchronization should be sufficient.

Man-machine interface

The interface between the driver and the system will now be described in more detail.

Data entry is effected by the user under system guidance and control. The data entry stages are as follows:

A. The user presses a "reset" key and the system displays the request "name of present location?". Preferably, the user will be able to choose any one of three preset positions which may represent home, place of work etc and may simply insert "start" and then enters a digit 1, 2 or 3 and then the "enter" key. The system then advances t stage G described below. As an alternative, the user may enter a name code for a particular area and press the enter key. The system will then verify the existence of the area and will then advance to stage B.

B. It is necessary to begin the route at a recognized junction. Therefore, the system displays a message such as "drive to the first right hand junction on this road". When the user reaches this junction, he depresses the "enter" key and then the system advances to state C.

C. The system displays a message request
"name of present road?"
The user then inserts the name of the road or street and presses the enter key and the system then requests:
"name of right intersection road?". The user inserts the street name of the right hand intersecting road and presses the enter key. The system then checks the possibility of setting the current position as the junction defined by data entered in stages A and B and then advances to stage E if this is possible. If it is not possible with the data received the system advances to stage D.

D. If the junction setting is impossible on the data received in stages A and B, the system displays the message:
"drive to the next right hand road junction". When the user has reached the next junction, he presses the enter key and the system then returns to stage C and the sequence is repeated.

E. The system displays the message request: "are you behind the junction? - enter yes or no" The user inserts the appropriate response and then depresses the enter key. The system will then display the message:
"how large is the distance from the junction?". After the distance has been entered in appropriate units, which may be adjusted in accordance with user requirements, the user will again depress the enter key.

F. In this section of the program the system will set the starting junction. This is described in more detail under "data verification and fixing".

G. The system displays the message: "name of intended destination area?". After the desired destination area has been entered, the user will again depress the entry key.

H. The system displays the message: "choose route or place" The user chooses whether he is to enter information selecting a route or a specific place. Following this selection, he presses the entry key. If the user has selected "route", the system advances to section I. If he has selected "place", the system advances to section J.

I. The system displays the message: "name of intended destination street". The user enters the name of the street and depresses the entry key. The system verifies the existence of the street (as described under data verification and fixing) and moves to stage K.

J. The system displays the message: "type of place". The user enters data such as "restaurant" or "hotel" and depresses the entry key. The system verifies the existence of the place as described under data verification and fixing.

The system then displays the message: "name of intended destination place". The user enters the name of the place and again depresses the entry key. The system verifies the existence of the place and sets the relevant "final junction". This again is described under the section "data verification and fixing".

K. The system displays the message: "is there any road you wish to use?- answer yes or no". The user enters the appropriate response and depresses the entry key. If the user response is negative, the system advances to stage M.

L. If the user response is positive, the system displays the message:
"insert road:
from
to:
The user inserts the appropriate data and depresses the entry key.
The system then displays the message:
"others?- answer
yes or no".
If the user response is positive, the system returns to step L. If the answer is negative, the system advances to step M.

M. The system displays the message: "any road you wish to avoid?"
If the user response is positive, the system advances to step N. If the answer is negative, the system advances to step O.

N. The system displays the message:
"insert road:
from:
to:
The user inserts the required data and depresses the entry key. The system then displays the message:
"others? answer yes or no".
If the user response is positive, the system returns to step N. If the answer is negative, the system advances to step O.

O. The system advances to the route marking out stage referred to hereinafter as the path outline stage.

Data verification and fixing

Data verification is carried out in parallel to entry of data by the following steps:

A. Verification of the zone name. In the case of a place, the place name and type will be verified as soon as they are entered.

B. Setting of the start junction and its data verification will be carried out after entry of all the data defining the start junction.

C. Setting of the end junction and its data verification will be carried out after setting of the start junction and entry of the end junction data.

D. During the data verification stage:
  1. The system will check if the inserted names are correct. In the event of a wrong data entry, the system will display a suitable message with the remark:
  "try again"
  2. The system will guide the user with a request for insertion of an appropriate cassette by displaying the message:
  "put in cassette number X".
  3. The system will check that the correct cassette was entered. In the event of a mistake, it will display the suitable announcement again, adding the remark:
  "try again". As soon as data verification and fixing has ended, the system will display the message:
  "wait"

Route determination and data processing

As soon as the data verification and data fixing stages have been concluded, the system will process and determine the route and will display the message:

"Journey time at average speed X miles per hour will be Y minutes start now"

The user will depress the "enter" key or begin driving. The system will then advance to the route completion stage.

Route completion

During the drive, the system will monitor the vehicle location and, accordingly, will guide the user. In the event of a deviation from the preselected route, such as overrun of a turn due to a driving error or desire to take a different route, a warning signal may be given by means of a buzzer and/or a warning lamp. If desired, the system can determine a new route, taking account of the route deviation.

During the route guidance process, the next instruction will always be displayed on the display screen. When the instruction has been completed, the user will depress the "enter" key or, the system itself may assume that the instruction has been completed in response to determination that a particular distance has been driven. After each instruction has been completed, the instruction will vanish from the screen and the next will be displayed, until the desired destination has been reached.

HARDWARE DESCRIPTION

The system whose operation and functioning has been described in general terms in the foregoing may be implemented by means of the hardware illustrated in FIGS. 2a to 2j and 3. As will be noted, the hardware basically consists of a plurality of integrated circuit and other modules which include, in addition to a 10 Megahertz clock generator 201, timing and control logic 202, an address decoder 203, and various memory chips, the primary component of the system being an 8085-A2 microprocessor unit of the system. Interface logic 206, 207, 208a, 208b is provided for decoding signals received from the steering transducer 209, and from the compass transducer 210, and the wheel revolution counter 211, 212, 213. Electrical socket connectors 214, 215, 216, 217, 218 are provided for receiving electrically programmable read only memory chips (EPROMS) 219, 220, 221, 222, 223 each of which contains data representing a road or street map. The data is stored in these EPROMS in the manner indicated in this specification.

Figure 2A:
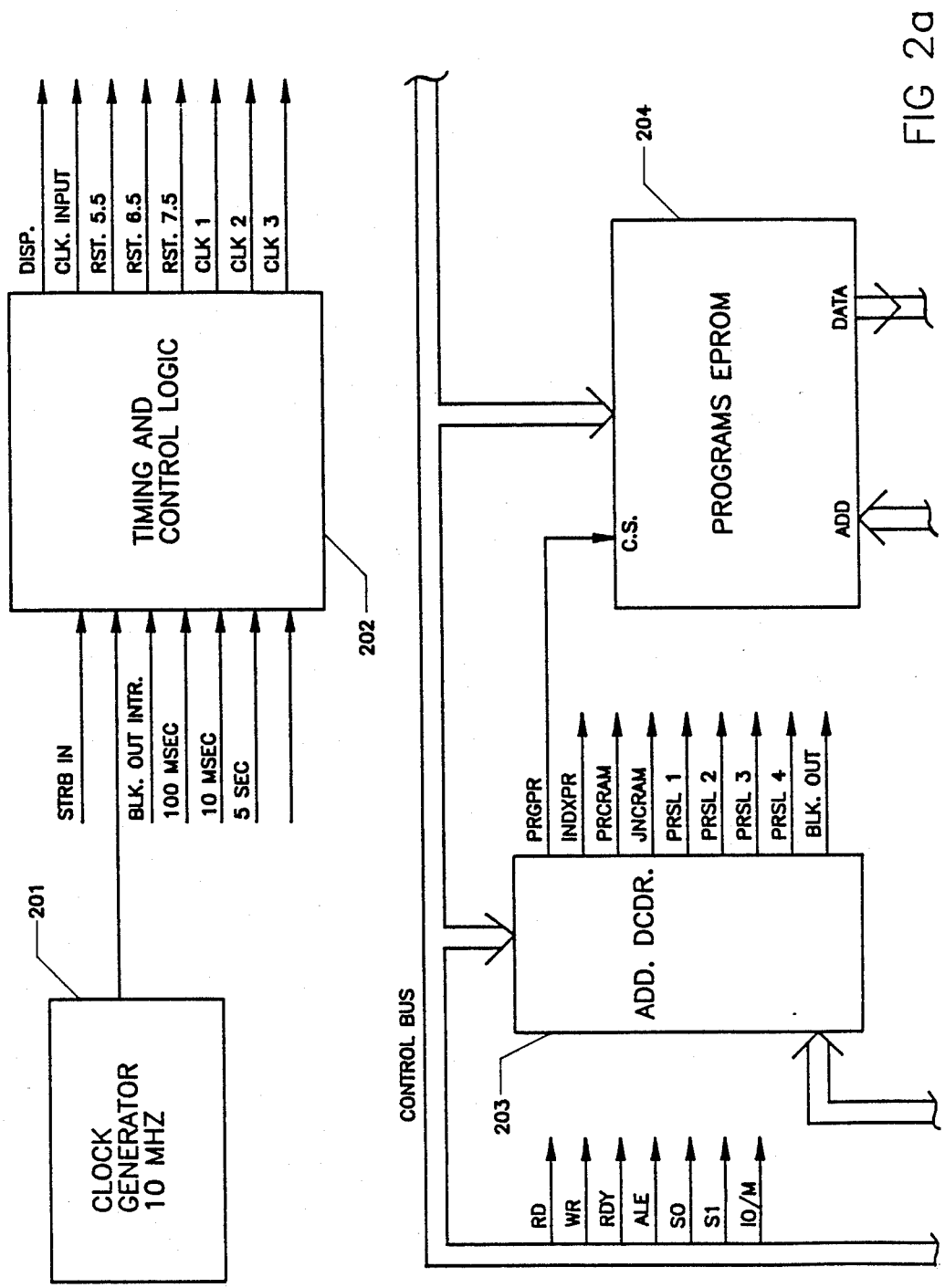
FIG. 2 is a schematic block circuit diagram of apparatus for use in a vehicle navigation system according to FIG. 1, the Figure comprising FIGS. 2a, 2b, 2c, 2d, 2e, 2f, 2g, 2h, 2i, and 2j, the various Figures being combined together as shown in FIG. 3.
Figure 2B:
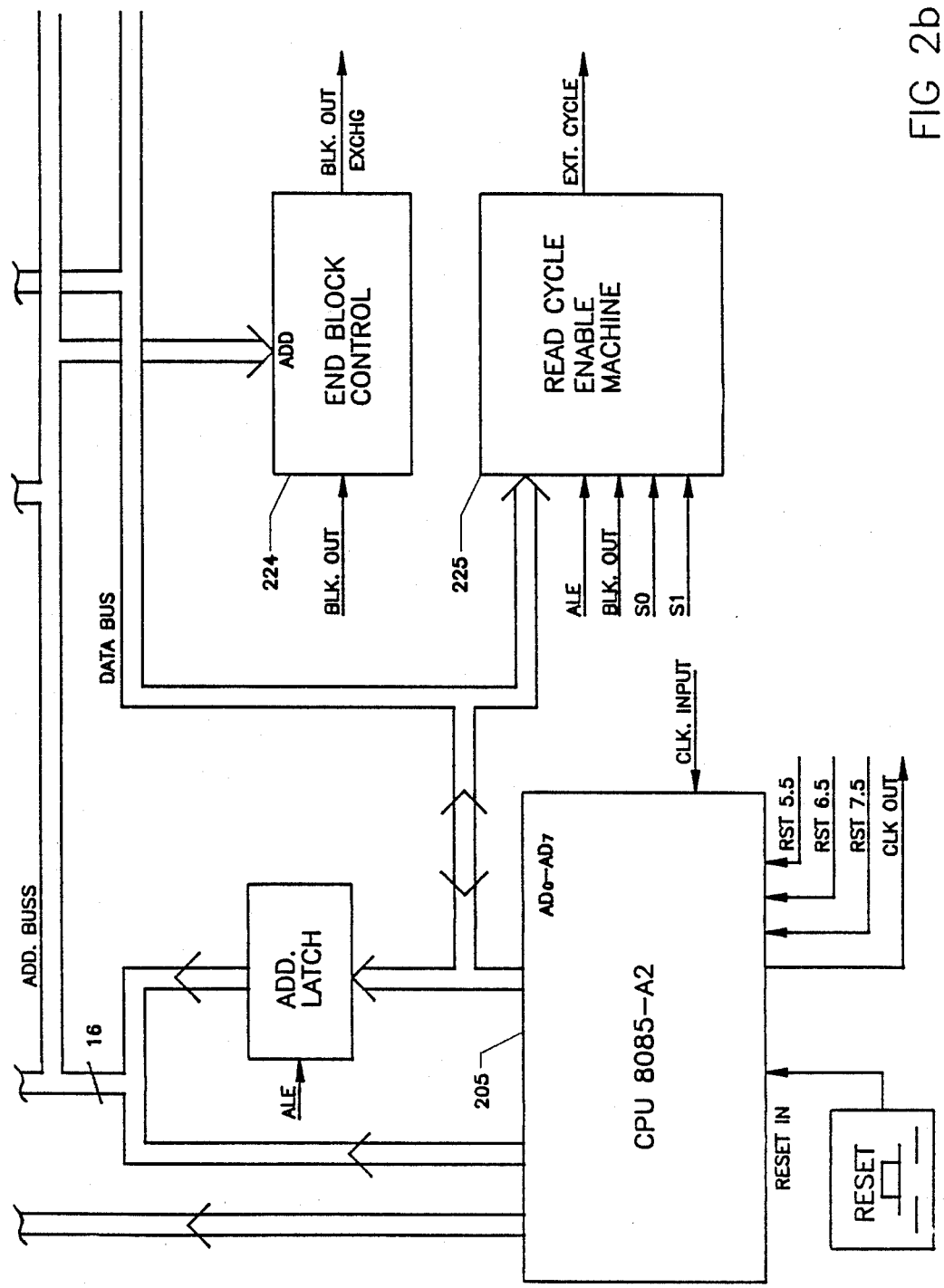

Referring to FIG. 2B, there is shown a memory paging subsystem for the extended memory of the plug-in units 219, 220, 221, 222 and 223, comprising end block control 224 and a read cycle enable machine 225 receiving input signals regarding the status of the cycle from the CPU control bus. This is a unique feature of small microcomputers. This subsystem allows expansion of the available memory beyond the 64k limit.

Referring to FIG. 2C, a processing RAM 226 is connected to the CPU bus, specifically address data and control. This is the memory supporting the CPU functions.

There may be optionally included an indexes and tables EPROM 227. The indexes and tables EPROM 227 provide the global indexing of the EPROMs 219, 220, 221, 222 and 223 containing localized map information with reference to the cassette numbers or places wherein the information is stored. If the system does not required global indexing, this memory unit is not needed.

RAM 228, herein the landmark and actions ram 228, is provided for storing the landmark information and action information, typically in table form, for use in issuing instructions when a landmark is approached. RAM 228 contains all information related to a cycle, that is a trip segment between landmarks, including the sequence data generated by the route establishing means.

A programmable timer 229 operates in response to timing and control logic 202 (FIG. 2A) to issue programmed time signals (TRLL) five seconds delay time for display exchange, 10 milliseconds for general interrupt, and 100 milliseconds for a distance sampling. The programmable timer 229 also receives gate signals indicating a junction or landmark enable controlled by the software (FIGS. 43, 44 and 45, for example) and illustrated in FIGS. 29 through 32.

Referring to FIG. 2D, elements are provided to provide the external bus in connection with the paging system.

Figure 2E:
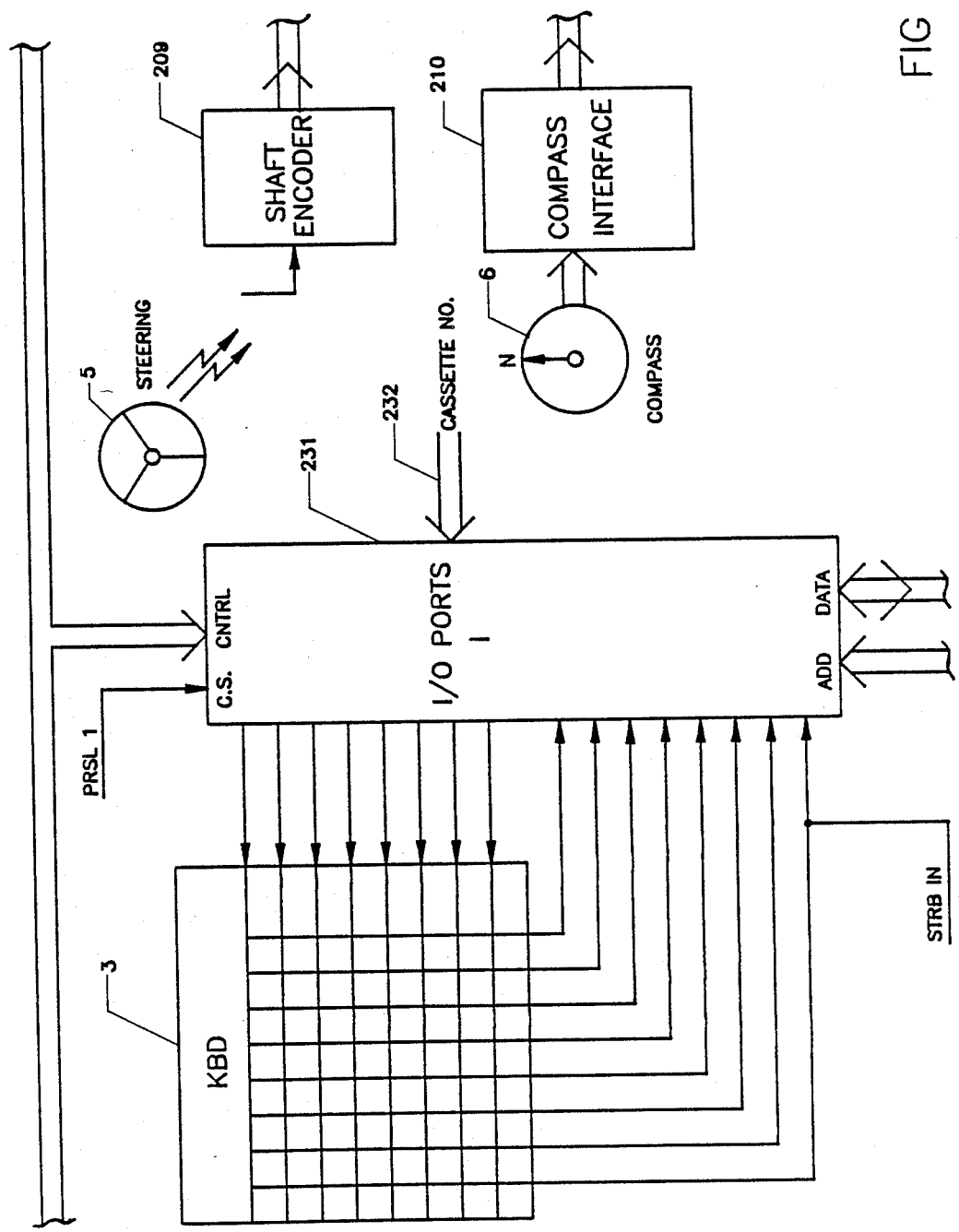
Figure 2F:
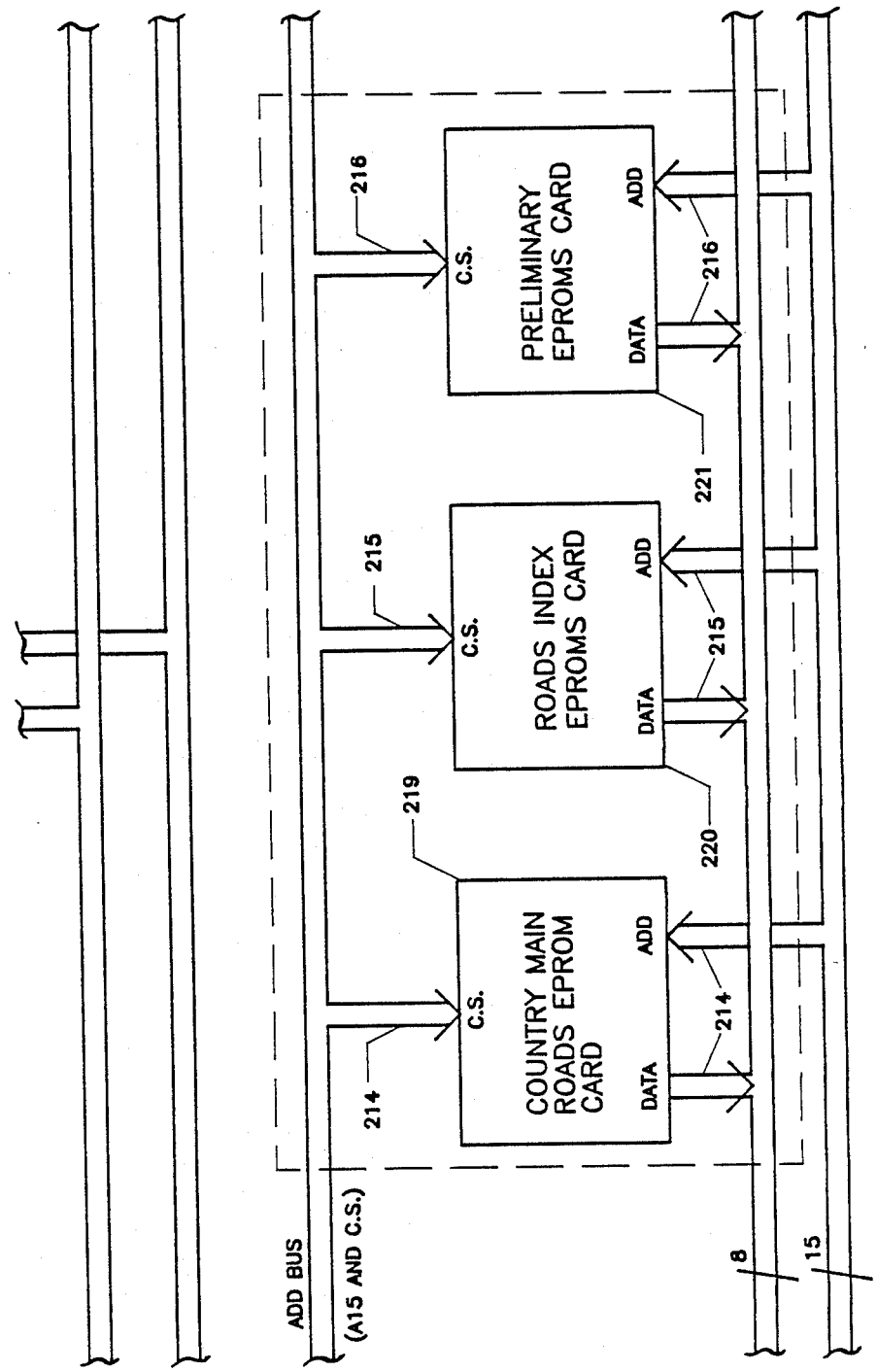
Figure 2G:
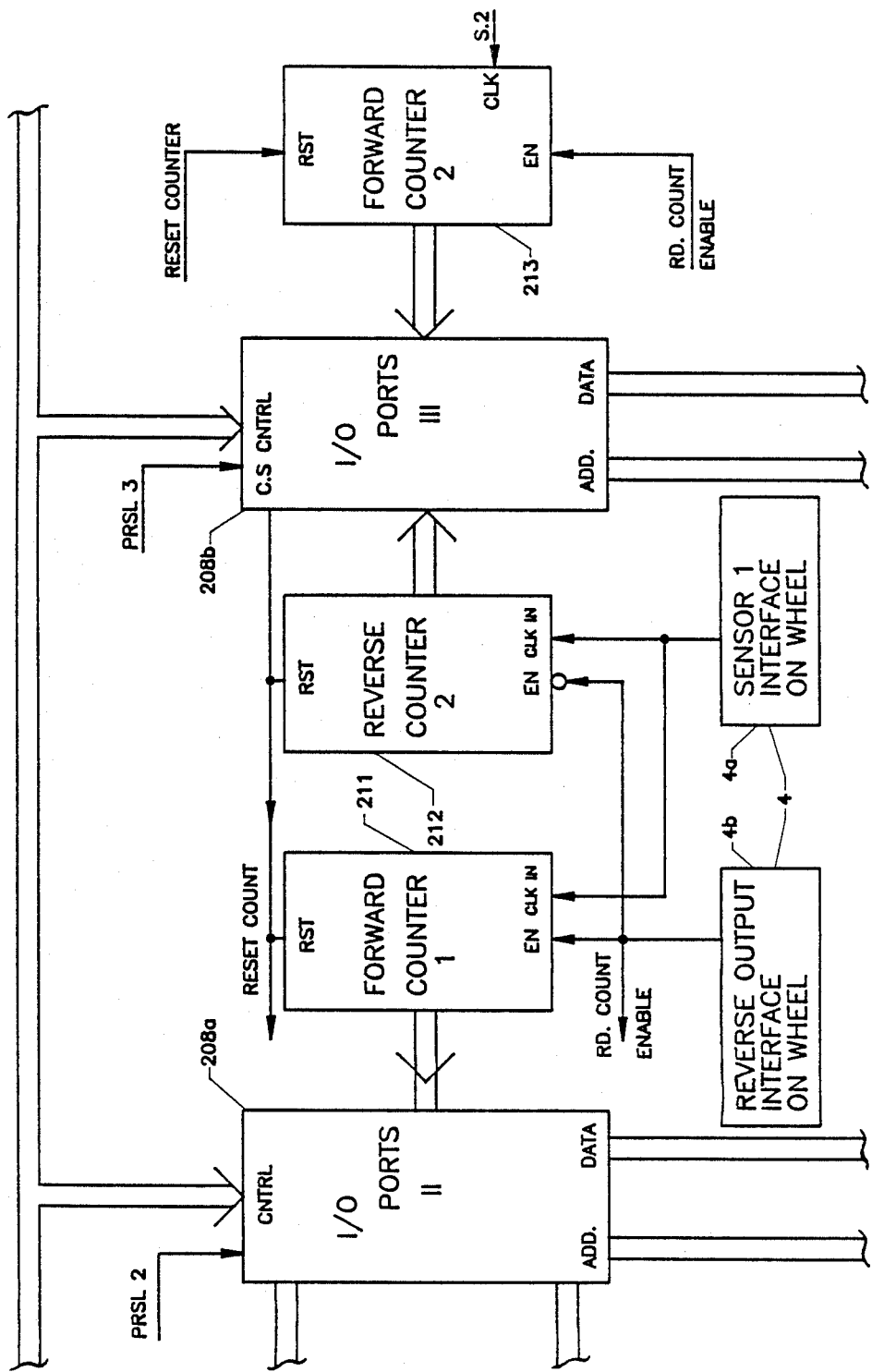
Figure 2H:
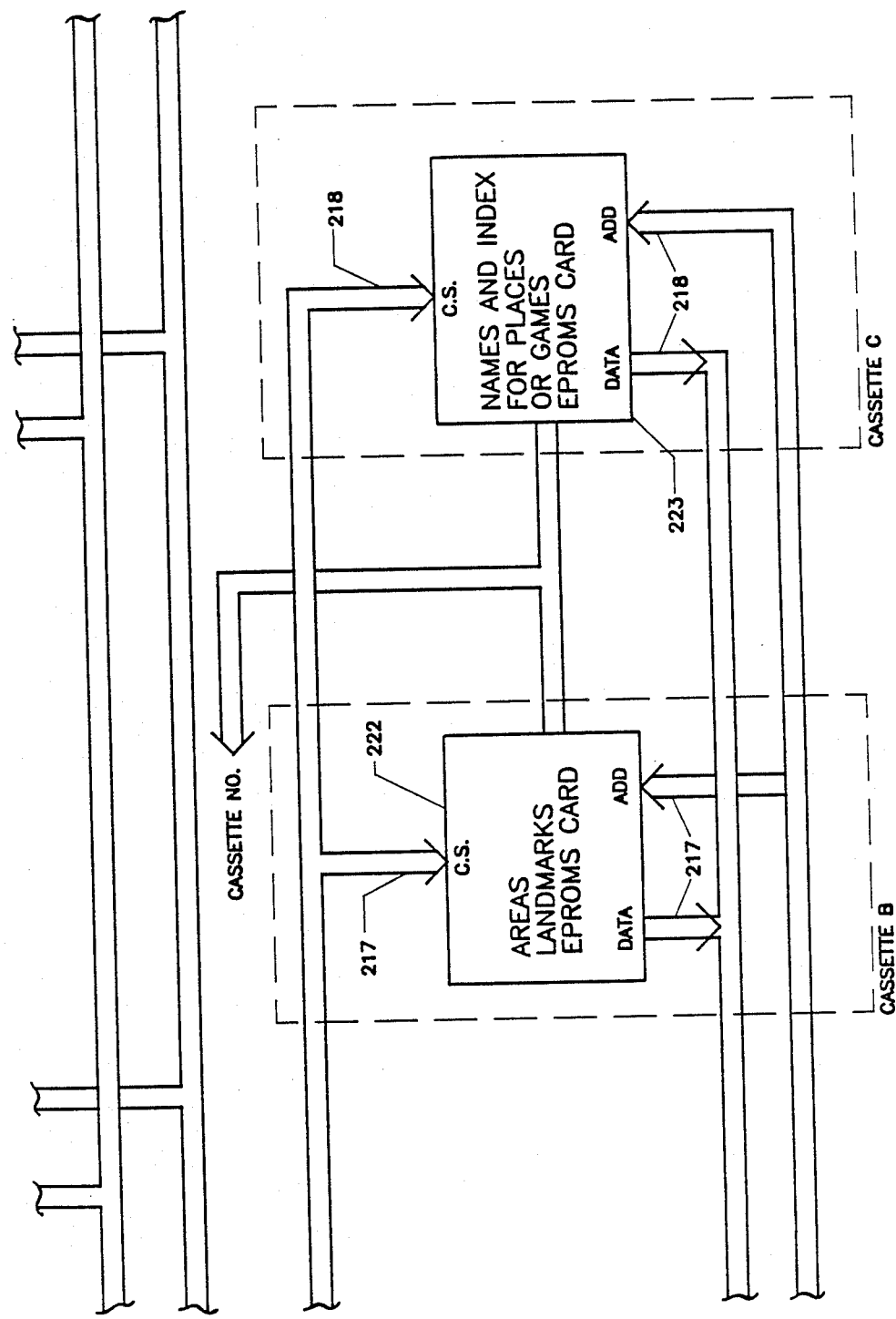

FIG. 2E illustrates the IO ports 231 for the keyboard 3. Cassette number is provided from the memory units 222 and 223 to port 232 of the IO port unit 231. As previously explained, units 222 and 223 are insertable units as, for example, memory unit IA of FIG. 1. The shaft encoder 209 receives its input from the steering mechanism of 5 (FIG. 1). The compass interface 210 receives its input from an electronic compass 6 (FIG. 1). As previously noted, the compass is not necessary for operation in accordance with the invention.

Figure 2I:
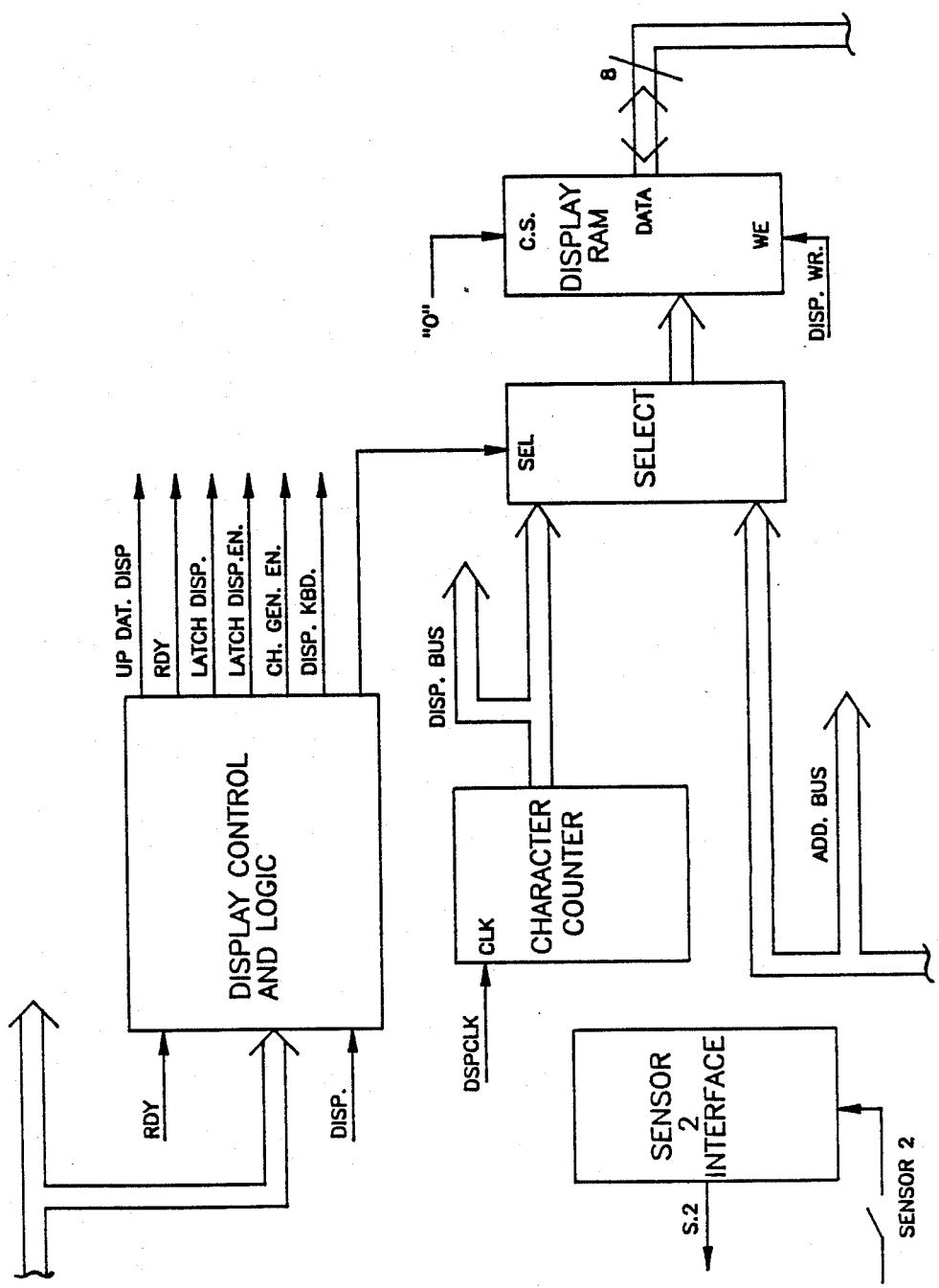
Figure 2J:
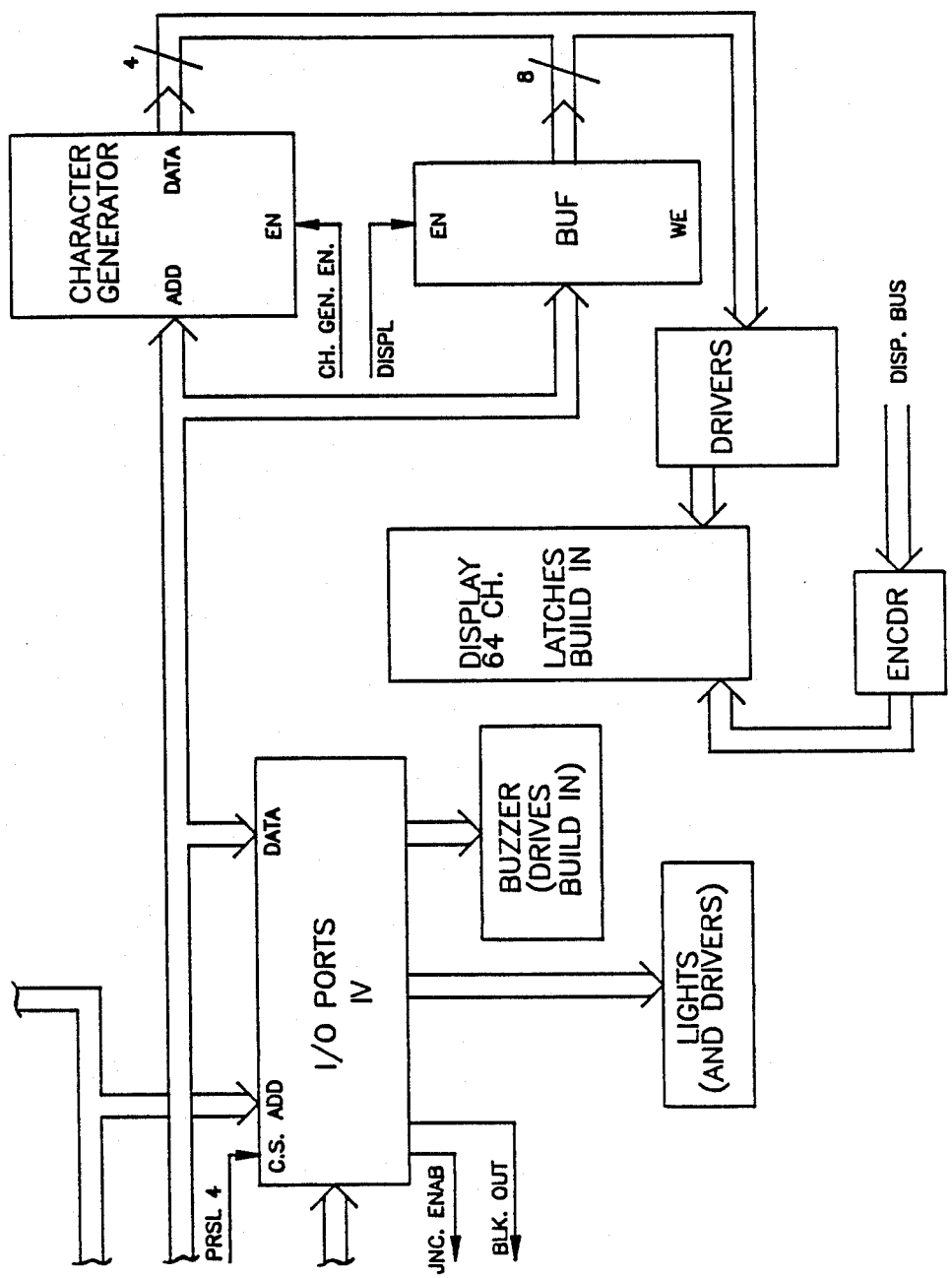

FIGS. 2I and 2J illustrate the display interface for a specific embodiment of the invention, including light and character generator as well as audio alarms. The details of this are not essential to the understanding of the invention.

FIG. 3 shows the interrelationship of FIGS. 2A through 2J.

Figure 4:
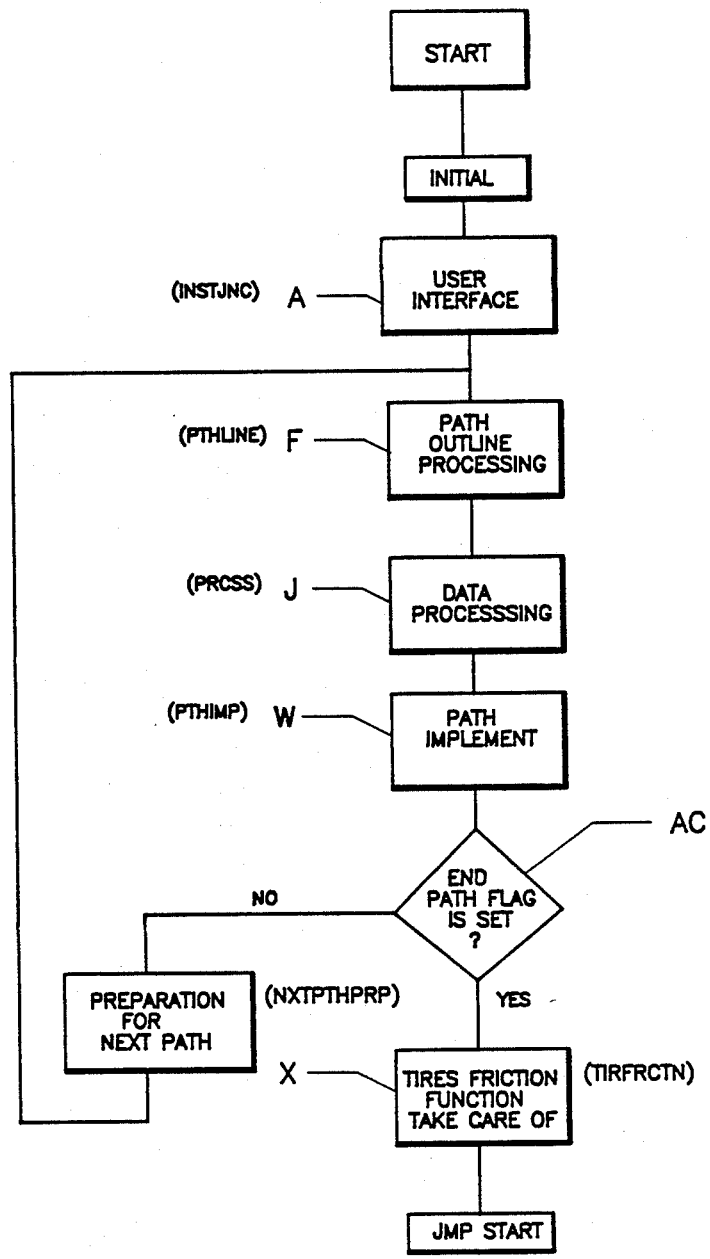
FIG. 4 is a main program for operating a microprocessor forming part of the system illustrated in FIGS. 1 and 2.
Figure 66:
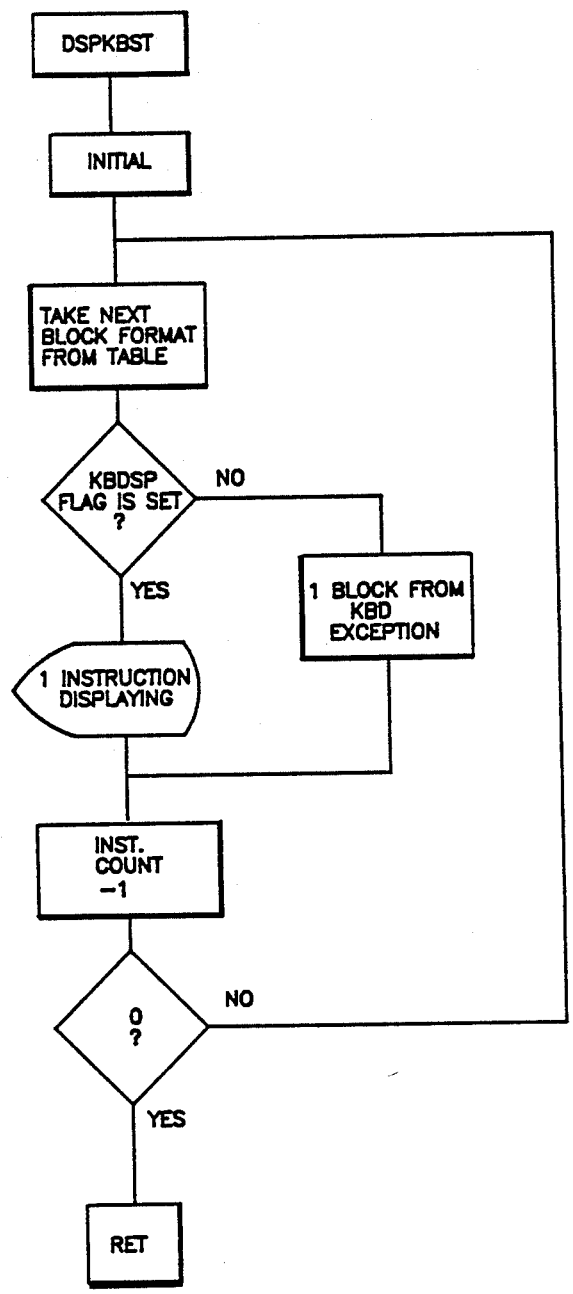
FIG. 66 is a flow chart illustrating a second DSPKBST (display keyboard status) routine showing greater detail than in FIG. 65.

Stored in non-volatile memory 204 is a control program for operating the microprocessor. the main program for carrying out this control is illustrated in FIG. 4 and various sub- routines which form part of the main program and supplement its functioning together with timing diagrams and tables are illustrated in FIGS. 4 to 66, as described herein below.

Figure 67:
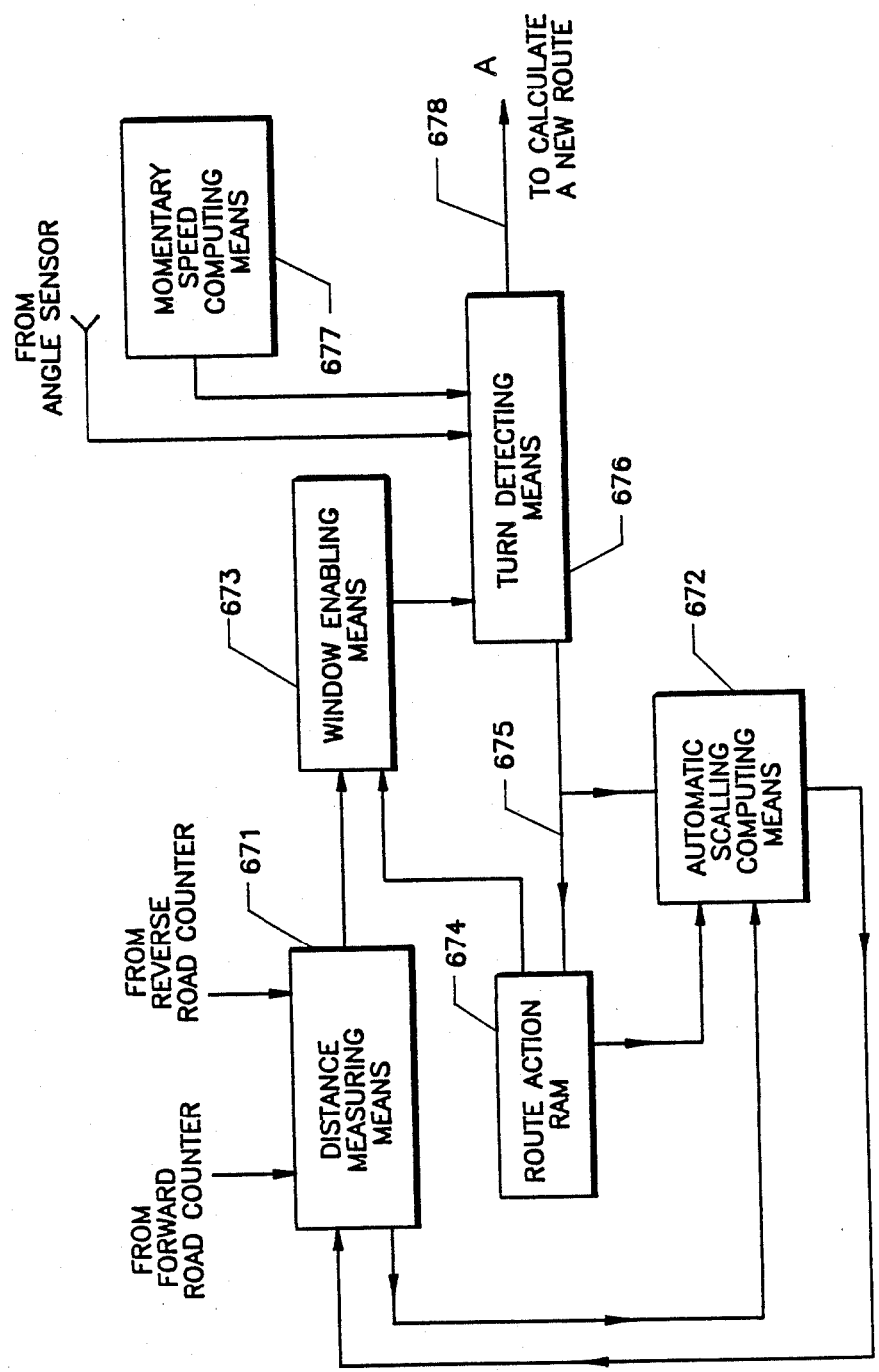
FIG. 67 is a block schematic diagram illustrating the part of the system performing control over the route.

For ease of understanding, FIG. 67 provides a block schematic diagram which illustrates the basic functional blocks of the system employed during a journey including hardware components and functional blocks defined in the system software. A distance measuring means 671 receives inputs from a forward road counter 4a and a reverse road counter 4b (FIG. 29), referred to hereinafter, and from an automatic scaling computing means 672 (a software processor). It provides a first output to a window enable means 673 and a second output to the automatic scaling computing means 672. A route action random access memory 674 (corresponding to RAM 228 of FIG. 2c) provides data to the window enable means 673 and the automatic scaling computing means 672 in response to a signal received on a sync line 675 from a turn detecting means 676. The turn detecting means receives data defining a distance window from window enabling means 673 and receives further signals representing the turning angle from an angle sensor and the instantaneous momentary speed from a speed computing means 677. On detecting a turn which is unexpected, the turn detecting means 676 produces a signal output on line 678 to cause the system to calculate a new route taking into account deviation from the previously calculated route.

Figure 68:
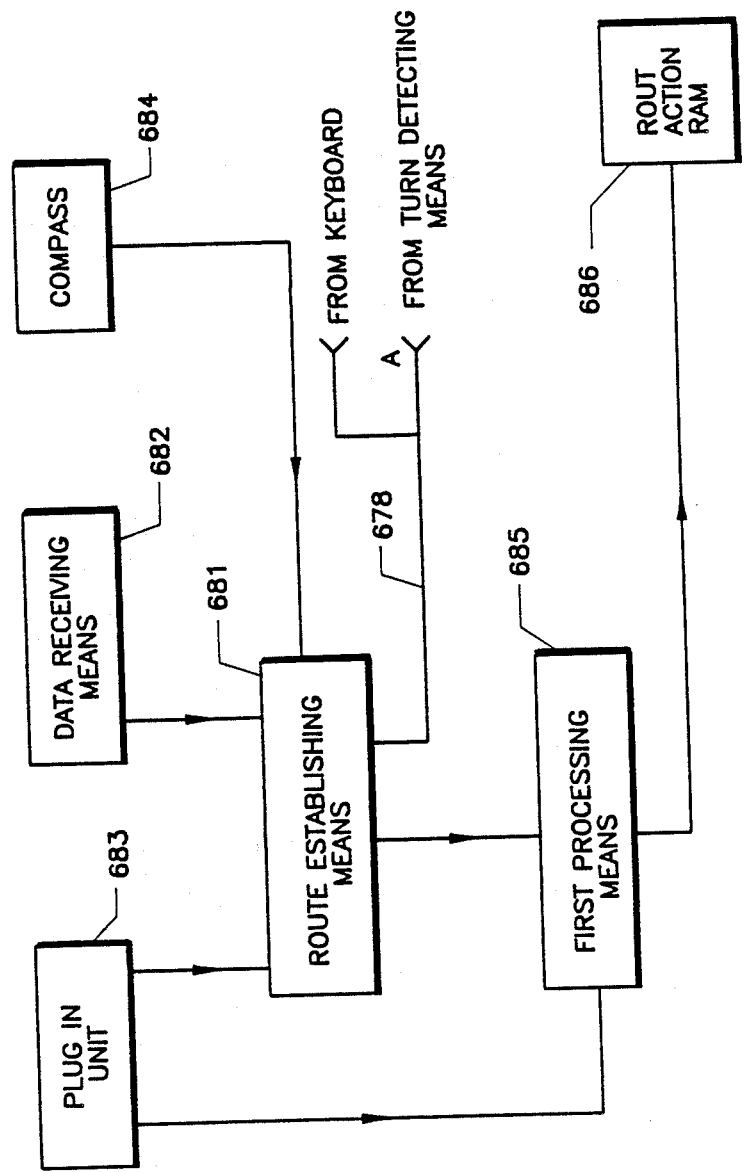
FIG. 68 is a functional block schematic diagram of an embodiment of the system according to the invention.

Referring now to FIG. 68, there is shown a functional block diagram illustrating the basic functional blocks employed prior to any journey or in preparation of any new route. The signal on line 678 is supplied to a route establishing means 681 which also receives inputs from the data receiving means 682, a plug-in unit 683, if provided separately, and a compass 684, if provided at all. In response to these data and signals, the route establishing means 681 provides a data input to a first processing means 685 which generates action data blocks and supplies them to a route action RAM 686. The software enabling these various functional operations to occur will be described in detail hereinafter.

FIGS. 27 to 32, and FIG. 48 illustrate techniques which may be employed in synchronizing or correlating the system memory with the actual location of the vehicle. Various system flags and counters are also defined and illustrated in these Figures.

FIGS. 34 to 48 illustrate further sub-routines which are concerned, inter alia, with synchronization or correlation of the actual vehicle location with the internally stored location of the vehicle, which the system utilizes to produce its prompt and warning messages.

Figure 49:
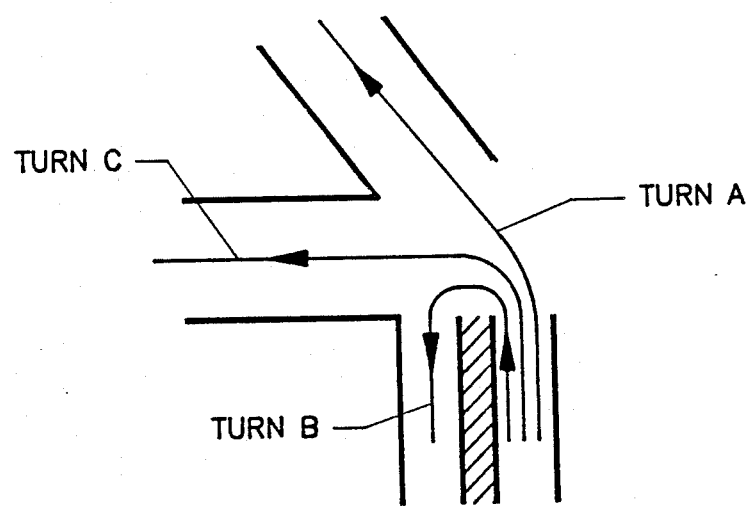
FIG. 49 shows various types of left turns.
Figure 50:
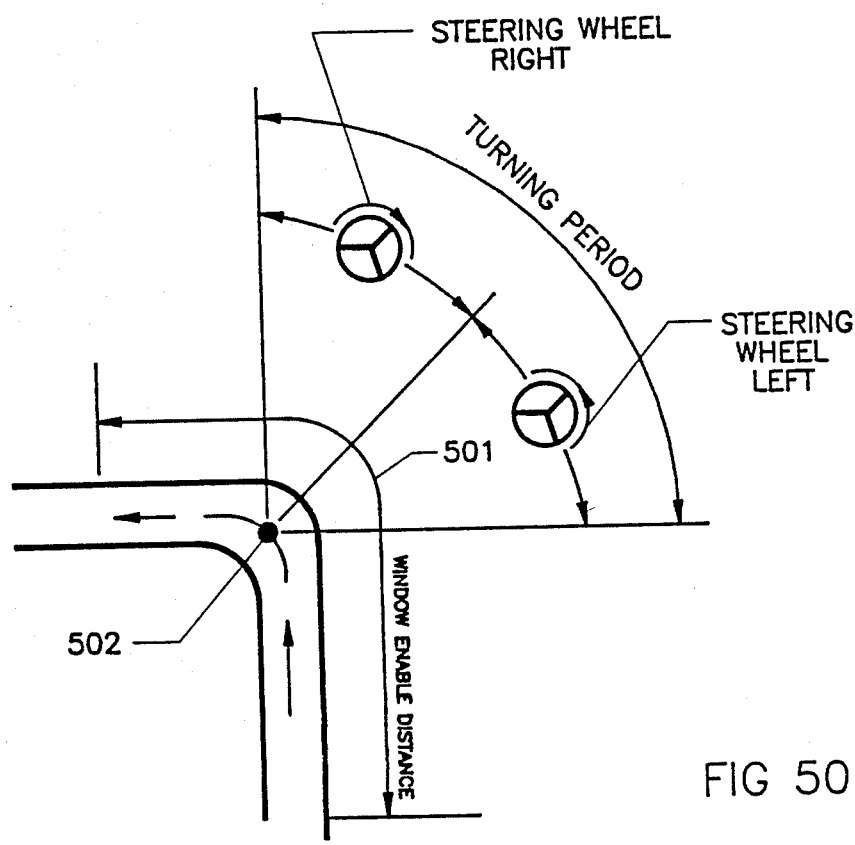
FIG. 50 illustrates steering wheel operation during a left turn.
Figure 51:
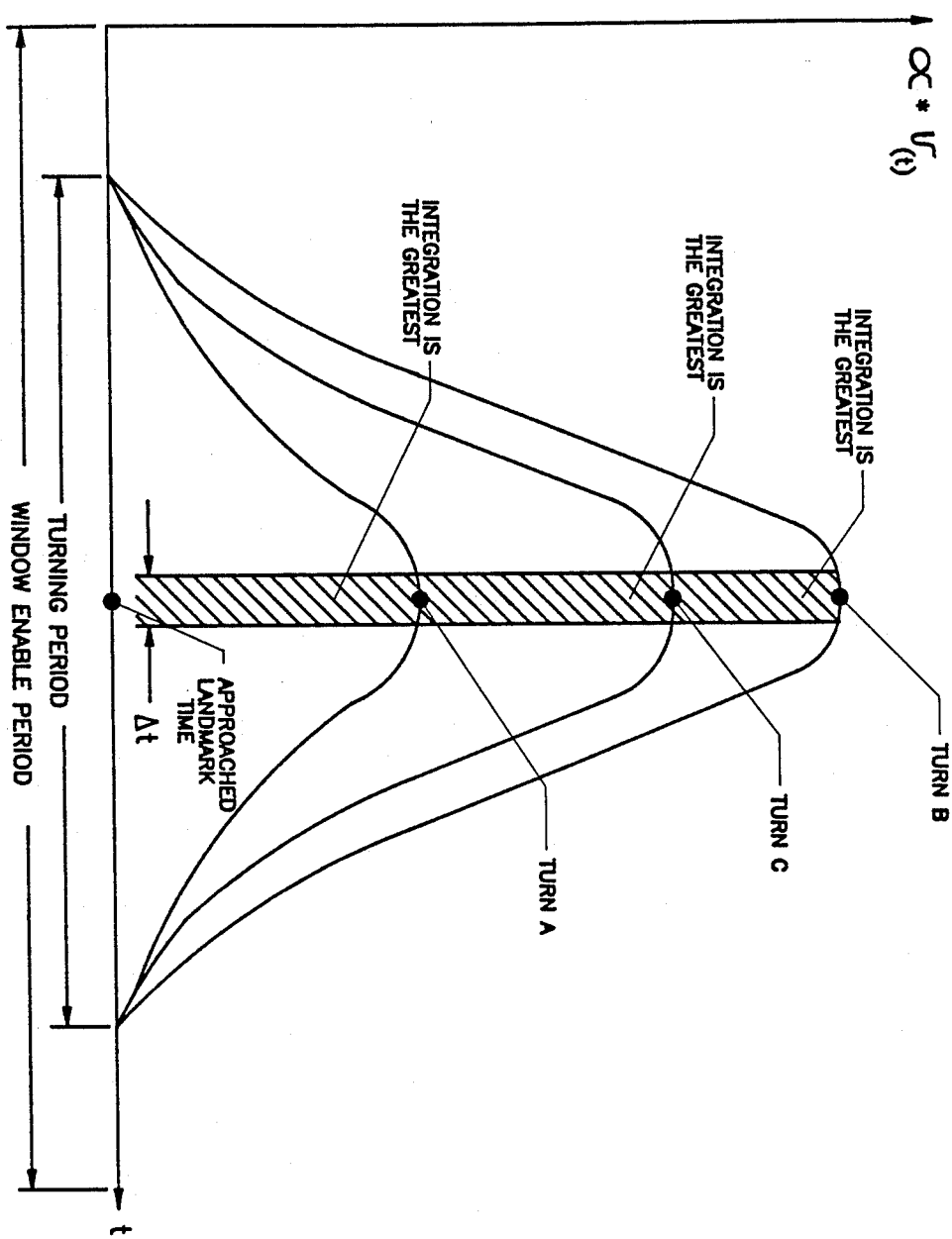
FIG. 51 is a graph of the product of steering angle and vehicle speed against time to illustrate the integration process for the three different turns illustrated in FIG. 50.
Figure 52:
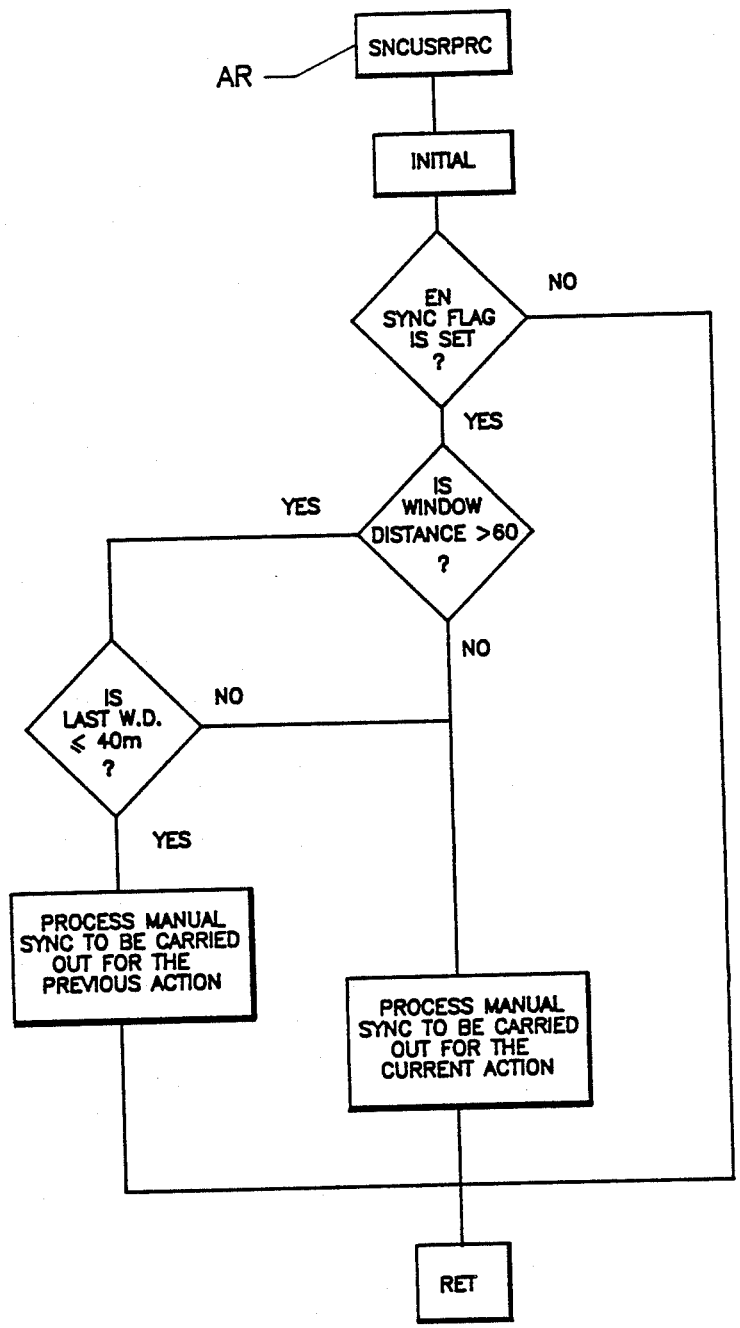
FIG. 52 is a flow chart illustrating the SNCUSRPRC (synchronize user procedure) subroutine for determining which action, if any, would involve manual synchronization.

FIGS. 49 to 51 illustrate further data and information relating to timing functions and parameters relating to the turn detecting.

FIGS. 54 to 66 illustrate further flow charts concerned particularly with the various routines for controlling the man-machine interface for the interactive part of the main system program.

The flow charts give explicit instructions for programming a small dedicated computer system such as illustrated in FIGS. 2a to 2j and 3 to implement a vehicle navigation system in accordance with the present invention. It should be noted that each sub-routine has a reference code such as "INSTJNC" herein indicating "instruction acceptance for start and destination functions". This sub-routine forms the first main part of the main program illustrated in FIG. 4 and is set forth in more detail in FIG. 5. This sub-routine in turn is subdivided into further sub-routines each having its own reference code. By use of these reference codes, the inter-relationship between the sub-routines may be readily discerned.

The above described system may be simplified for special purposes, e.g., for use as a tourist guiding system for guiding tourists along a preselected route. Then of course no route computation is required. It is only necessary to plug n a cassette having the predetermined route data therein. When the vehicle reaches predetermined landmarks of the route as determined by the distance sensor and the movement detection around landmarks, a message player will be enabled to cause output of a message giving information or instructions of local interest.

DATA BASE

Before discussing the operation of the system in more detail with reference to the flow charts, it is necessary to define the way in which data relating to landmarks, such as road intersections, and road names is defined in memory. For a given area, data is stored relating to each landmark such as a road intersection within that area. To indicate the location of each intersection or other landmark, sometimes also referred to herein as a junction, use is made of longitude and latitude lines present on a map from which the data is derived. The intersection of each longitude line with latitude line defines one reference point, and each landmark location on the map is represented by a single unique reference point. Naturally, as the scale of the map is increased, there is less chance that more than one landmark will be associated with one reference point. For example, in a map of London having scale 1:1250, in general there is only one landmark associated with each reference point. On such a map, the distance between two longitude lines or two latitude lines is 125 meters. It will be appreciated that these reference points do not define the location of the landmark absolutely, but they do indicate with sufficient precision the location of the landmarks with reference to the map.

The use of reference points is necessary for two main reasons:

1. Where a map is divided into sub-regions, the relative location of one landmark in one region to another landmark in another region will be determined in accordance with the reference points.

2. The reference points are used to derive the direction of a destination landmark from the initial landmark of a route and to obtain a regular indication of location during the path outline procedure which will be described hereinafter.

Two independent data fields are defined in memory: a data field in respect of specified landmarks and a data field defining the names of the roads. The path outline procedure makes use of these two data fields.

1. Landmark ("Junction") data field

The storage of the map in memory is based on one absolute identifier for each landmark such as illustrated in Table A forming part of this specification and showing a data-base format for a junction of four roads.

TABLE A

| ByteNo. | Example: Data Base Format for: Four Roads Junction | |
|---|---|---|
| 0 | (1) General Data: Junction | ⎫ |
| 1 | (2) Number of Longitude | ⎬ Reference Point |
| 2 | (2) Number of Latitude | ⎭ |
| 3 | | ⎫ |
|   | (3) North Junction Number | ⎪ |
| 4 | | ⎪ |
| 5 | (4) Distance to North Junction - In 32 m Units | ⎪ |
| 6 | (5) Distance to North Junction - In 12.5 Cm Units | ⎬ North Road Specified |
| 7 | (6) North Junction's Leading Road Definition | ⎪ |
| 8 | | ⎪ |
|   | (7) Number of the North Junction's Leading Road | ⎪ |
| 9 | | ⎭ |
| 10 | | |
|   | (3) South Junction Number | |
| 11 | | |

TABLE A-continued

Example: Data Base Format for: Four Roads Junction

| ByteNo. | | |
|---|---|---|
| 12 | (4) Distance to South Junction - In 32 m Units | |
| 13 | (5) Distance to South Junction - In 12.5 Cm units | South Road Specified |
| 14 | (6) South Junction's Leading Road Definition | |
| 15 | | |
|  | (7) Number of the South Junction's Leading Road | |
| 16 | | |
| 17 | | |
|  | (3) East Junction Number | |
| 18 | | |
| 19 | (4) Distance to East Junction - In 32 m Units | |
| 20 | (5) Distance to East Junction - In 12.5 Cm Units | East Road Specified |
| 21 | (6) East Junction's Leading Road Definition | |
| 22 | | |
|  | (7) Number of the East Junction Leading Road | |
| 23 | | |
| 24 | | |
|  | (3) West Junction Number | |
| 25 | | |
| 26 | (4) Distance to West Junction - In 32 m Units | |
| 27 | (5) Distance to West Junction - In 12.5 Cm Units | West Road Specified |
| 28 | (6) West Junction's Leading Road Definition | |
| 29 | | |
|  | (7) Number of the West Junction Leading Road | |
| 30 | | |

For each junction, general data will be specified and the roads leading into the junction will be specified. In addition, the junctions at the remote ends of the roads leading tot he junction under consideration will be defined. The definition of any junction will be according to the data base format relating to that section. The general data of each junction will be defined by indexing each junction with one number, (block number), by defining the level of the junction (main, central, internal etc.), and by defining any nearby central junction, which may be employed as an intermediate destination in the path outline procedure defined hereinafter.

Roads leading into the junction will be specified by the distance between the junction under consideration and an adjacent junction, by the direction of the road, and by the type of road.

Each road junction is thus indexed in memory by a particular number, referred to hereinafter as a block number. Associated with the block number for each junction, data is included which defines the level (hierarchy) of the junction together with data specifying roads entering the junction and further data defining junctions which terminate the other ends of those roads entering the junction in question. By "level of the junction", is meant whether it is a main junction, or a central junction or an internal junction etc.

The roads entering the junction are thus defined in terms of the following parameters:
 a: The distance between the junction in question and the next (adjacent) junction along that road;
 b: The direction of the road (optional);
 c: The type of road (motorway, A-road, B-road etc);
 d: Any other important factors such as no entry, bridges, roundabouts, etc.

It will be appreciated that the size of the data block for each specific junction will depend upon the number of roads which branch out from that junction. Thus, storage of the map in memory (the plug-in unit) is based on indexing each junction with one unique number. The data related to each junction is stored in one block in which the junction number is related to a CPU address line value. In other words, the CPU can access the data of a specific junction by setting its address lines to the junction number. The plug-in unit memory stores all the junction blocks which together specify one or more areas of a map (such as a city map).

Referring to Table A, the data for each junction is specified in the relevant block from the point of view of a person standing in the center of the junction. For each junction, general data will be sorted including (1) general junction information and (2) longitude and latitude line numbers which together specify a reference point. In addition, for each road leading from the junction four further types of information will be sorted as follows: (3) the adjacent intersection number, (4) distance to the adjacent junction in large units (most significant bits), (5) where the distance is not exactly a large unit, the distance from the closest large unit to the next adjacent junction in small units (least significant bits), (6) general data concerning the road, (7) and road number.

The general junction data (1) may include information concerning the number of roads connected to the junction, and whether it is a junction forming part of a closed loop of road.

The "large units" referred to above may for example be units of 32 meters and the "small units" may be units in terms of the measurement accuracy available when the data base is constructed, e.g., for a map of scale 1:1250 where the measurement accuracy available is plus or minus 0.05 mm, the possible error in terms of distance between two intersections on the road is plus or minus 12.5 cm. In this case, the units will be units of 12.5 cm. Data (4) and (5) together give the distance between the intersections.

The data (6) may include the level of the road in terms of a coefficient which when multiplied by actual road distance between two landmarks linked by the road gives an equivalent straight-line distance. For example, for a main road defined as a level 1 road, the coefficient may be 0.7. The equivalent straight-line distance for each kilometer would then be 0.7 kilometers. The use of such coefficients is necessary for the path outline stage to be described hereinafter. In addition, the general data will include an indication of whether the intersecting road has a dead end, is a no entry road, permits no U-turns, or leads into a circle. In addition, data concerning "significant turns" will be included for automatic synchronization. Furthermore, a road index number indicating the name of the road would be included.

The data for each intersecting road also indicates the direction of the road with reference to magnetic north. This information is useful in the path outline stage to assist in determining the desired change of vehicle orientation with reference to the road approaching the intersection. As already mentioned, the actual vehicle orientation can be detected by the compass before the journey begins. Alternatively, the relative angles (or proportional numbers to the turns) between the branching roads, will be defined and included for example in the general junction data. In this connection, the possible turns for auto sync should also be marked. In the preferred embodiment the resolution of the angle is only as great as needed to distinguish between various turns at a landmark.

2. Road name data

The road names are defined in a data field (not shown) by providing each road with a single reference number from field 7. The association between the road number and the name is specified by a name index for the road.

SYSTEM FLAGS. COUNTERS AND ACTIONS

The term "action" is used in this specification to mean the sequence of operations performed by the system during the path implementation stage between two landmarks, usually junctions. The process to perform one action is referred to as a "cycle" and corresponds the travel time of the vehicle between the two landmarks.

In order to understand the system software, it is necessary to be aware of the fact that various system flags are set and reset for each action during operation. These flags are defined in FIGS. 27 and 28. In addition, the system makes use of various counters which are defined in the Table C below.

TABLE C
ROAD COUNTERS
HARDWARE
H1. Forward Road Counter
H2. Reverse Road Counter
SOFTWARE
S1. Path Road Counter
S2. One Action Road Counter
S3. Sync. Road Counter
S4. Speed Road Counter
SOFTWARE COUNTERS OPERATION
1. Subtract Between Reverse to Forward
2. Time Operation of Those Counters is Defined in Software
MAIN STAGES HOW THEY WORK
A. In Start of Meas. Set Road Count EN
B. Storing Output of Path Road Counter
   Checking Their Output
   Substract Them From Output of Path Road Counter
   End of Action (Meas.)-Reset Road Count EN Two counters are hardware counters provided respectively to count wheel revolutions during forward motion of the vehicle (H1) and wheel revolutions during reverse motion of the vehicle (H2). Four further counters are provided in software (i.e. storage locations of RAM are defined by the software as counters) including a path road counter (S1), a one action road counter (S2), a sync road counter (S3) and a speed road counter (S4). The path road counter (S1) stores the result of subtracting the contents of the reverse road counter (H2) from the forward road counter (H1) and is updated at regular intervals by an interrupt.

The one action road counter (S2) keeps track of the number of wheel revolutions in each action and is enabled at or around the first landmark (junction) of the action and reset at or around the approached landmark. The sync road counter (S3) counts the number of wheel revolutions during a window enable distance which will be discussed in detail hereinafter. The sync road counter (S3) begins to count when the distance measured by the action road counter (S2) indicates that the vehicle is within an accumulated error distance of the approached landmark (junction). Counting is stopped when the maximum accumulated error distance is reached or before this if a sync signal is received following a turn during this distance.

The speed road counter (S4) gives an indication of the vehicle speed by counting the number of wheel revolutions over a known time interval.

Figure 27:
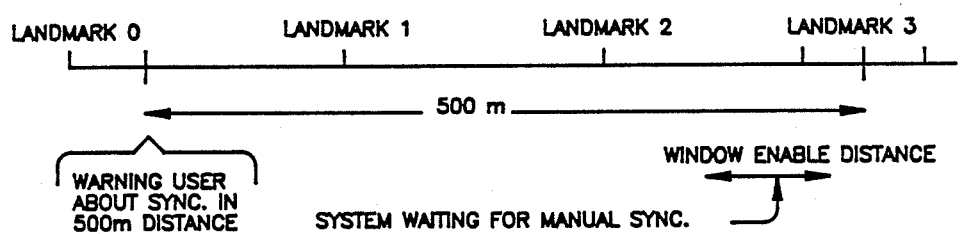
FIG. 27 is a diagram illustrating the synchronization possibilities according to the invention, including status flags (status of action data)
Figure 27:
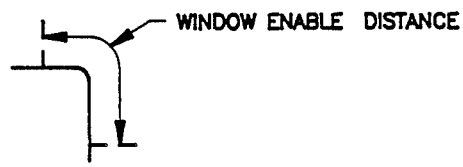
Figure 27:
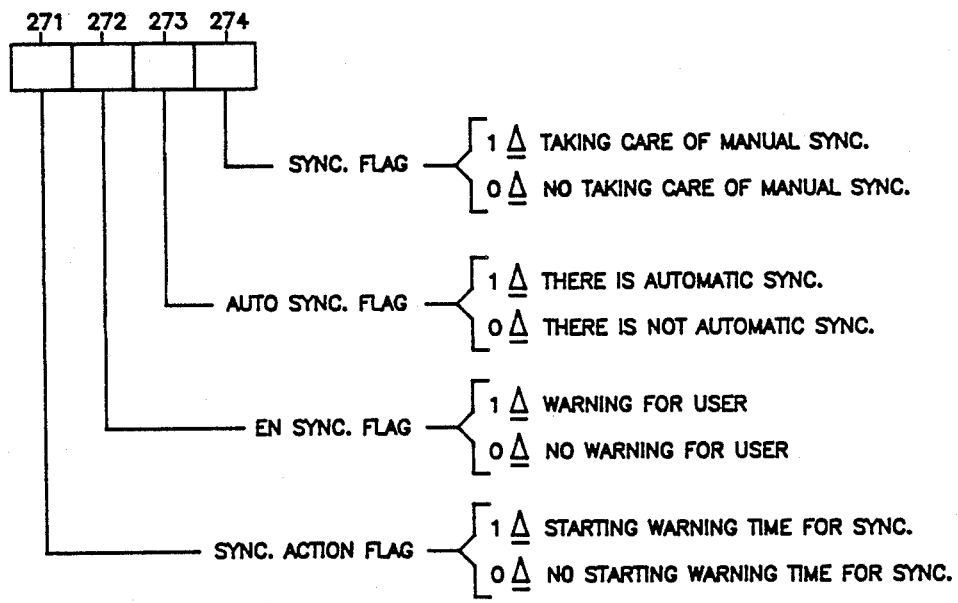

Referring now to FIG. 27 the flags include: a sync action flag 271 indicating whether a warning time is being displayed for the driver, an EN sync flag 272 indicating whether a warning should be displayed for the driver, an AUTO SYNC flag 273 to indicate whether automatic synchronization is to occur, and a SYNC flag 274 indicating whether provision for manual synchronization is to be made.

Figure 28:
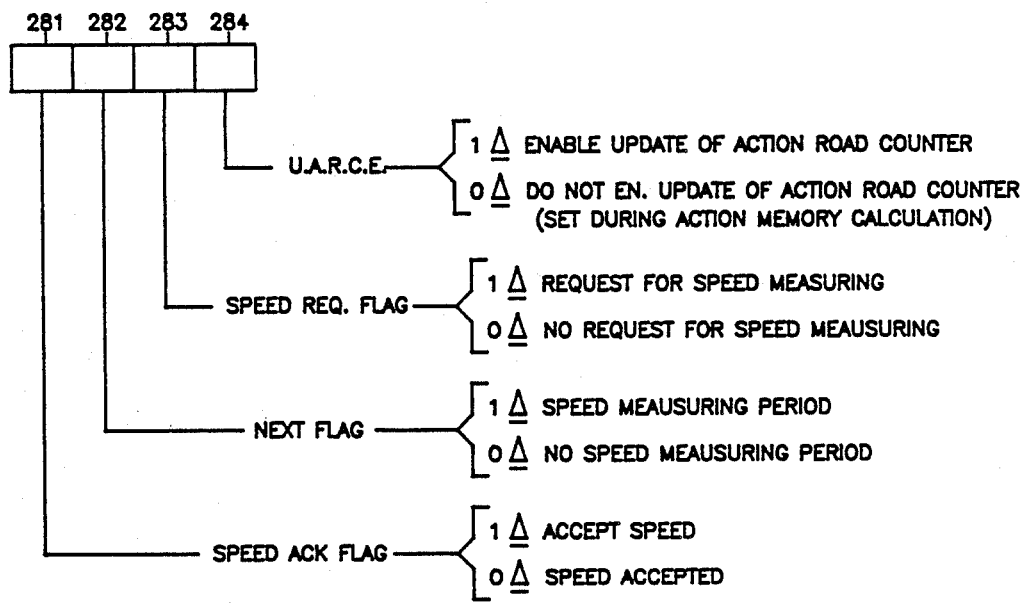
FIG. 28 is a diagram illustrating momentary speed flags as referred to in FIG. 34, including an update action road counter enable flag to indicate when the previous action involved automatic synchronization.

Referring to FIG. 28, further flags include the speed request flag (speed req) 283 indicating whether a speed measurement should be effected, a "next" flag 282 indicating whether a speed measuring period is current, a speed acknowledge flag (speed ack) 281 indicating that the speed requested was measured, and an "update action road counter enable" flag 284 indicating whether the one action road counter (S2 FIG. 33) should be updated, following automatic synchronization.

As will be explained, in the initial stages of preparing a route, the route is divided into action sections. The one action road counter S2 counts the number of wheel revolutions occurring during one cycle, i.e. during one action period. It will be appreciated that the first landmark of one action is in fact the approached landmark of the previous action.

In the absence of any synchronization method, the one action road counter S2 would in general not necessarily begin counting at the precise start of each action. By means of the synchronization process, described in more detail hereinafter, it is possible to ensure that the one action road counter S2 is reset automatically each time the vehicle passes through a junction or other landmark at which a significant movement, e.g. a turn, is made by the vehicle.

Figure 25:
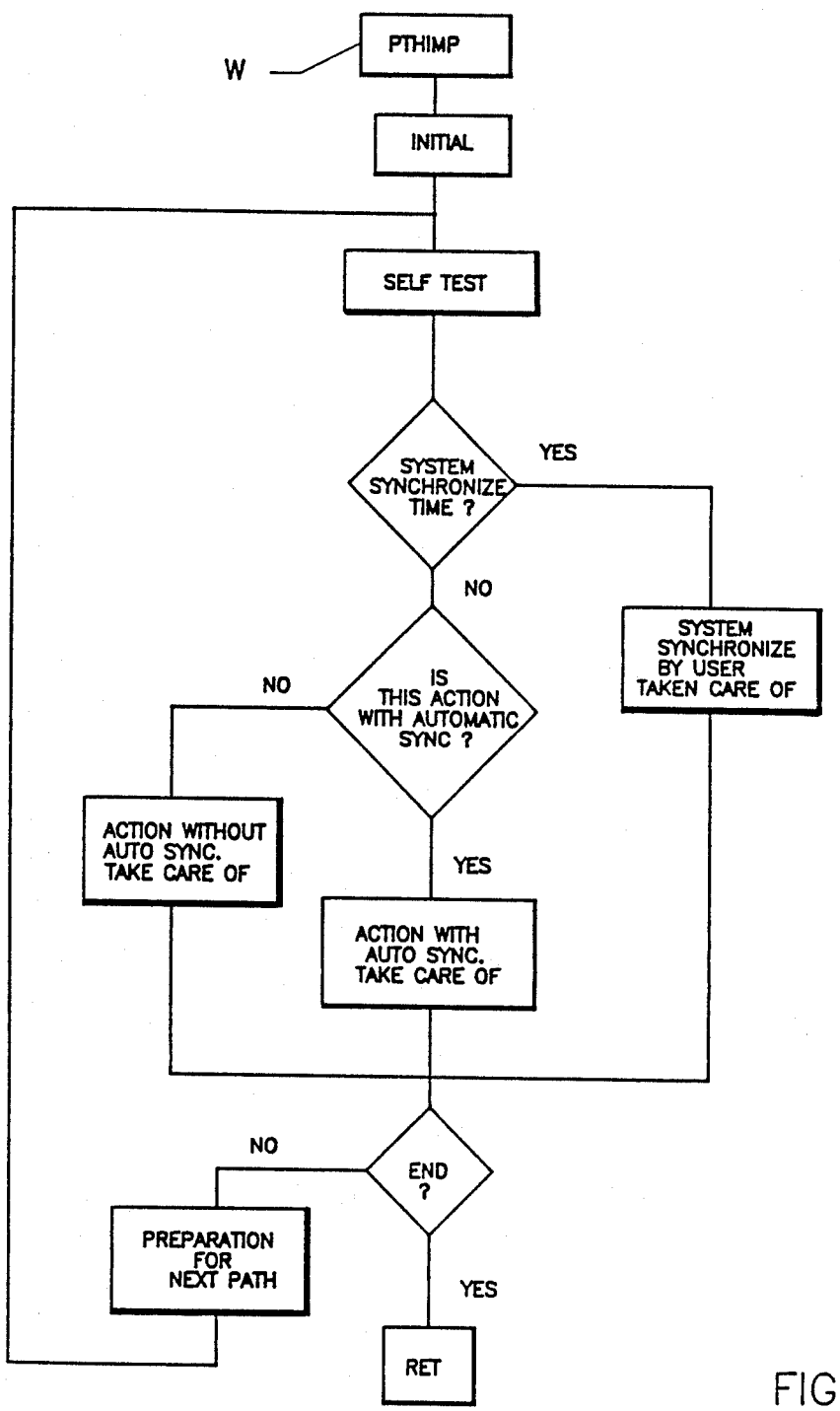
FIG. 25 is a flow chart illustrating general control over a route under the routine named PTHIMP (path implementation)
Figure 26:
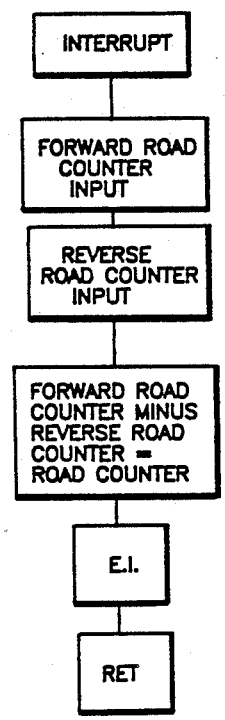
FIG. 26 is a flow chart illustrating the interrupt handling of the distance measuring means in connection with the routine of FIG. 25.
Figure 33:
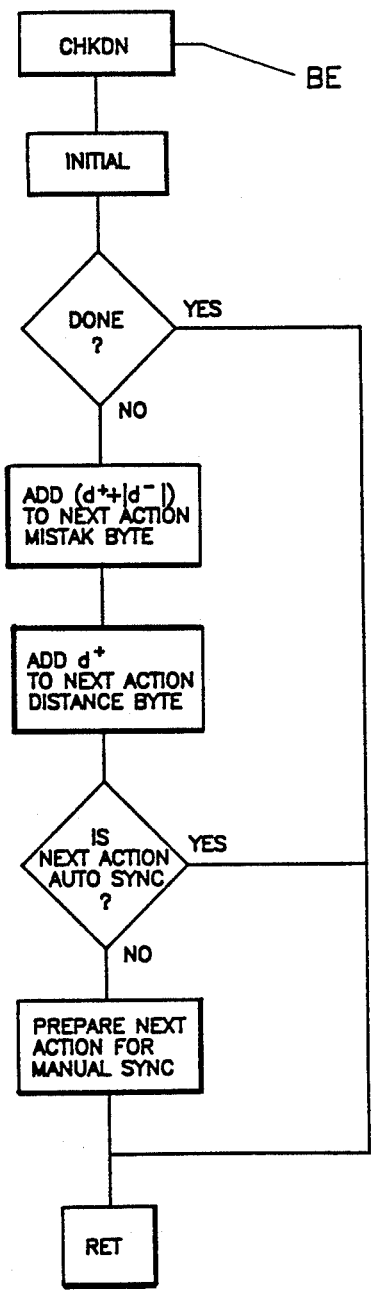
FIG. 33 is a flow chart illustrating the CHKDN (check if done) routine of FIG. 38.
Figure 34:
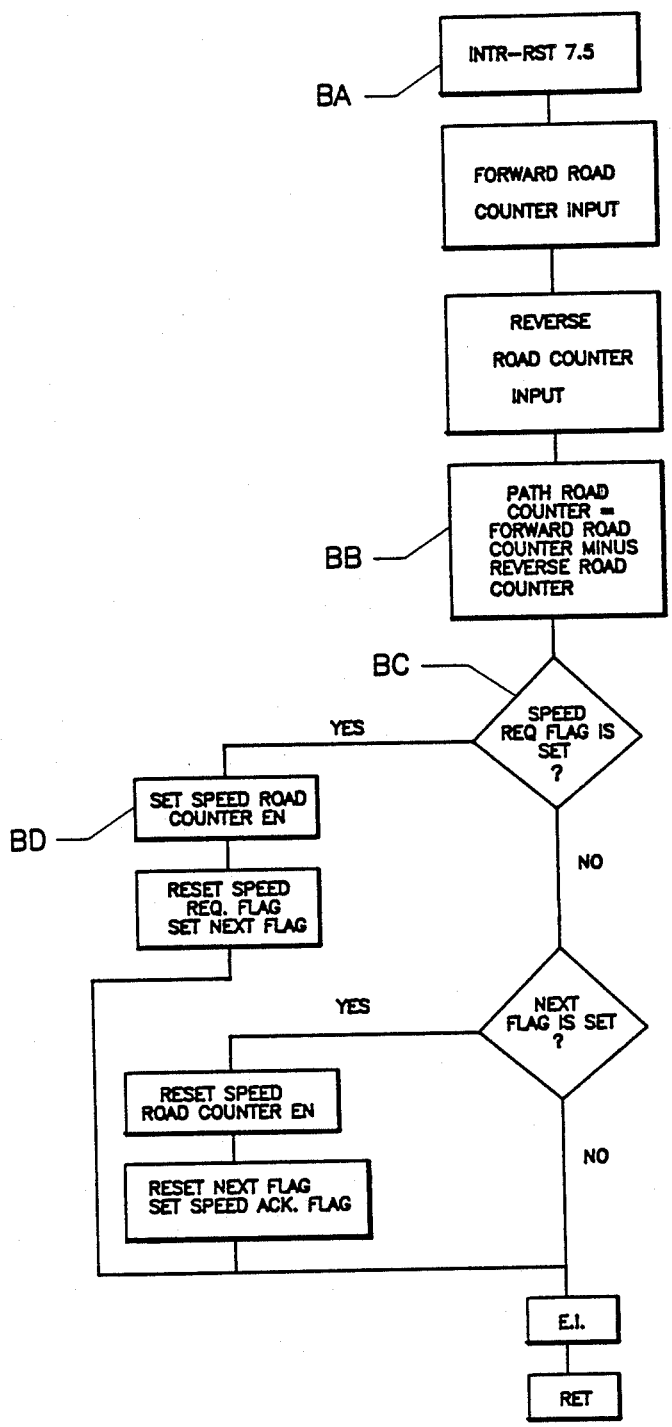
FIG. 34 is a flow chart illustrating the interrupt handling processes of FIG. 26 and the routine for checking momentary speed.
Figure 35:
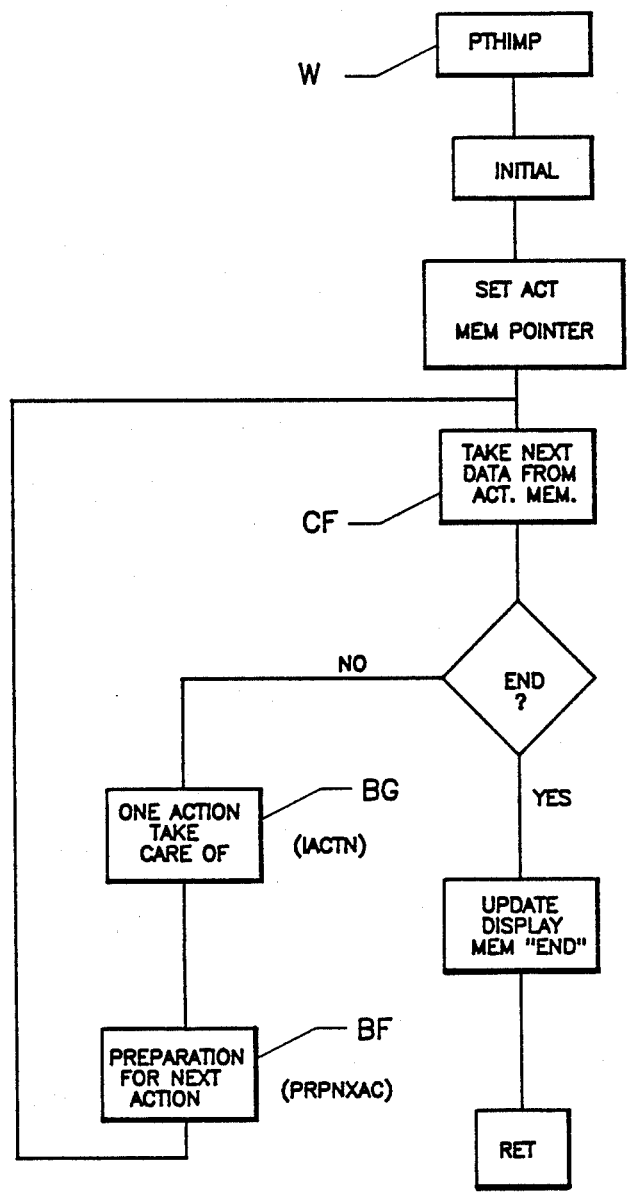
FIG. 35 is a flow chart illustrating a specific embodiment of a PTHIMP (path implementation) routine for FIG. 4.

SOFTWARE EXPLAINED in system software is defined in FIGS. 4 to 25 and FIGS. 52 and 53, whereas FIG. 26 defines an interrupt routine. FIG. 25 defines a sub-routine PTHIMP for path implementation which refers to system synchronization. However, the system synchronization is defined in more detail with reference to FIGS. 33 to 48. In this connection, FIG. 35 illustrates a more specific version of FIG. 25. FIG. 34 is an interrupt routine to which reference will be made hereinafter. FIG. 44 is a further interrupt routine.

Start routine

Figure 5:
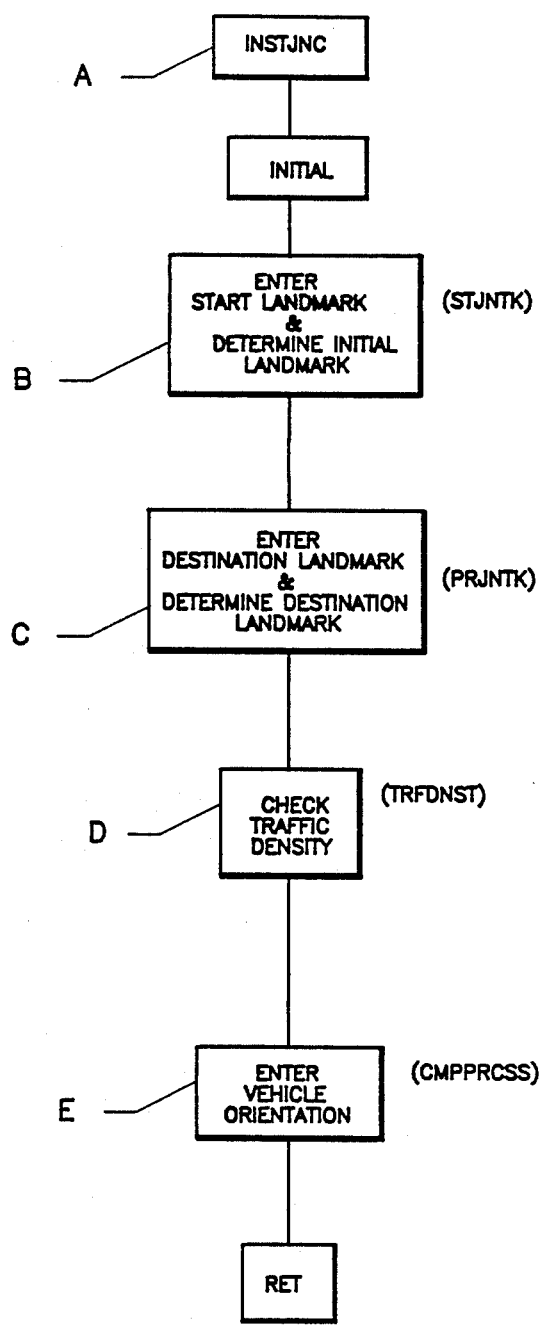
FIG. 5 is a flow chart illustrating steps to determine start and destination.
Figure 6:
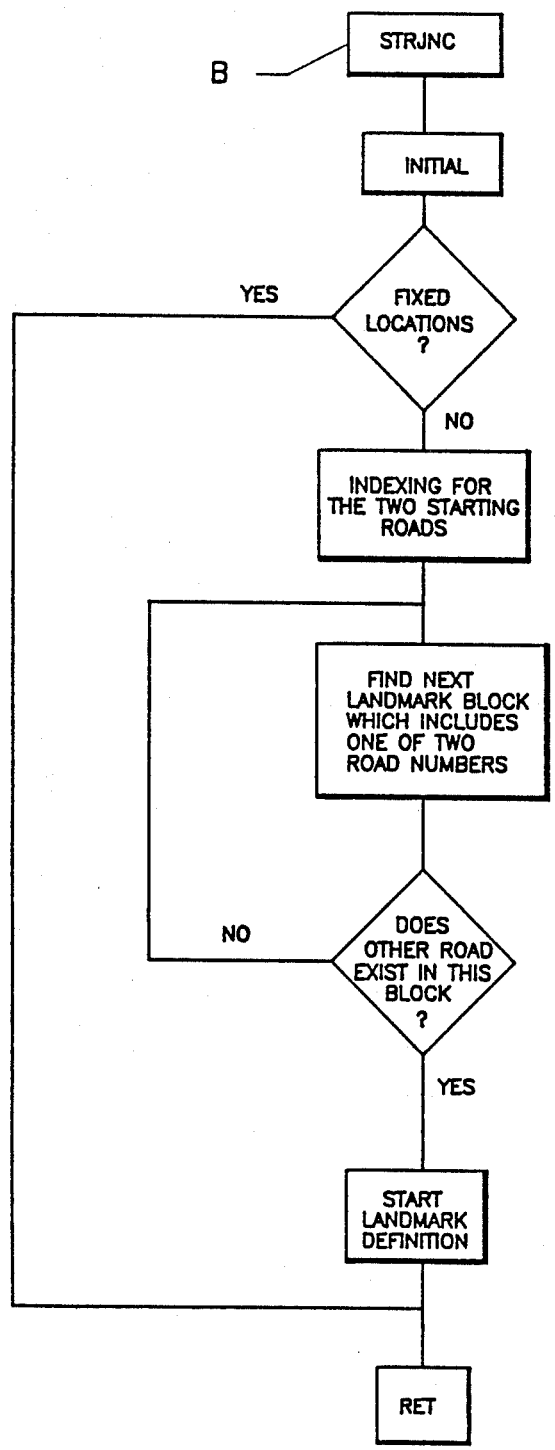
FIG. 6 is a flow chart illustrating start junction determination.
Figure 7:
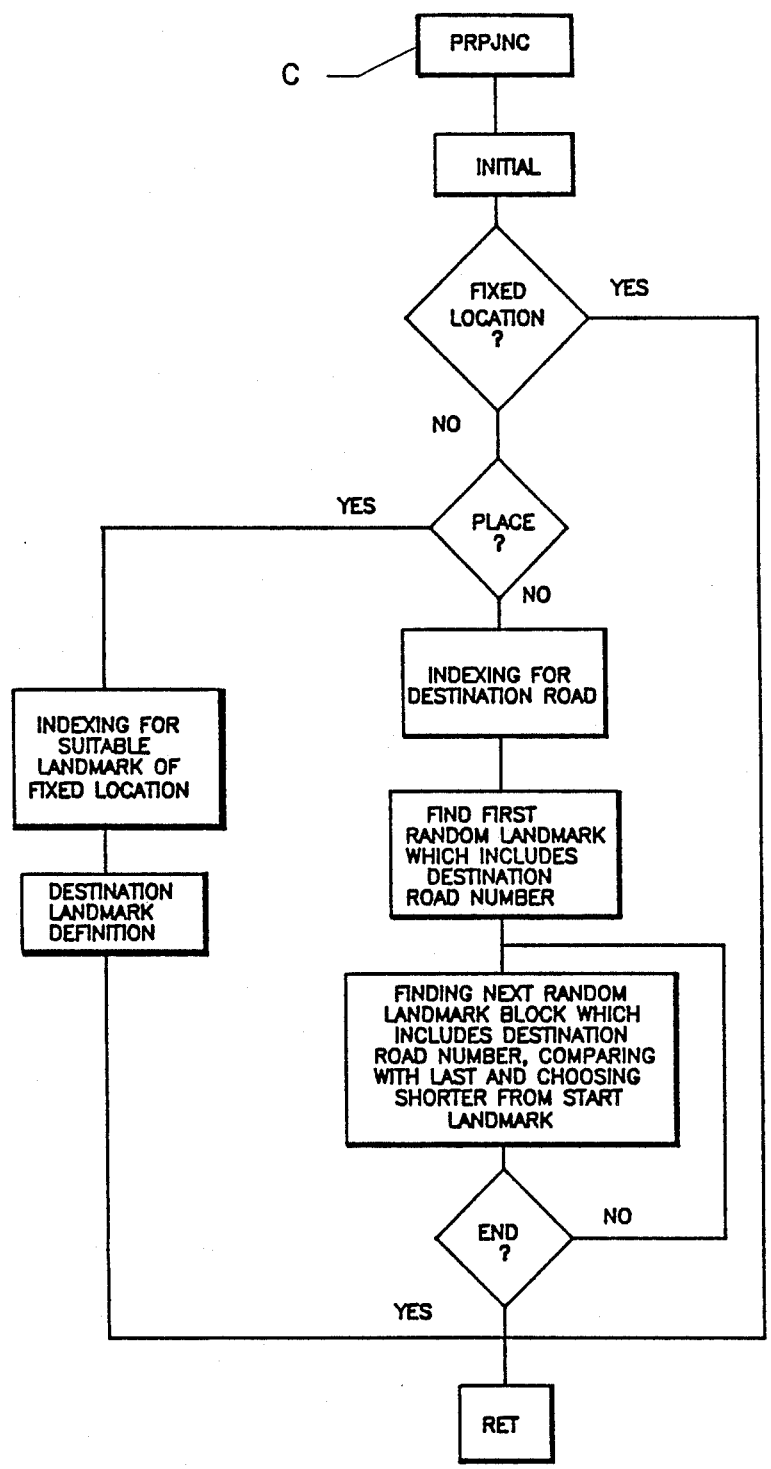
FIG. 7 is a flow chart illustrating destination junction determination without receiving cross street information from the user.

Referring now to FIG. 4, it will be noted that the first main sub-routine INSTJNC (A) is defined in more detail in FIG. 5 which in turn includes sub-routines set forth in FIGS. 6 and 7. The routine INSTJNC enables the system to receive data relating to start position and desired destination and accordingly to determine the vehicle start location and the desired destination. This operation is performed only once for each journey, before the journey commences. As indicated in FIG. 5, after the initial landmark (junction) and destination landmark (junction) have been defined (B, C,) provision is also made to take account of any abnormal traffic density D in certain areas and to process the one-time output from the compass E. This outpost is employed only to enable the system to determine the vehicle orientation with reference to the start landmark before the journey begins.

Path outline

The program then proceeds to the path outline processing stage, sub-routine PTHLINE F (FIG. 4). This is set forth in more detail in FIG. 8 which in turn refers to sub-routines defined in more detail in FIGS. 9 and 10. Sub-routine PTIAR (G) includes two sub-routines PTLVL2 (H) and PTLVL3 (I) relating to the process. These sub-routines are carried out in accordance with FIGS. 11, 12, 17, and 18. The path outline procedure is performed in order to select a sequence of junction data blocks defining a single route from the vehicle start location to the desired destination, and is illustrated schematically in FIG. 69.

Data processing

Figure 13:
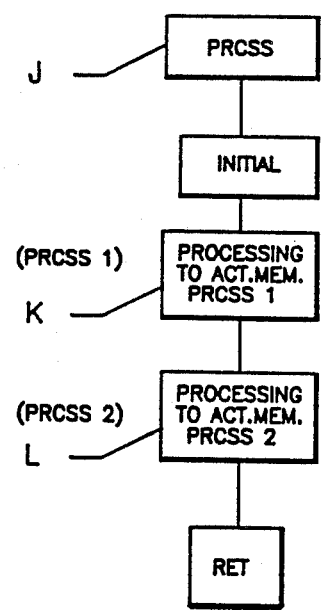
FIG. 13 is a flow chart illustrating the relationship between a path outline (route establishing means) and sequence action data processing (first processing means)
Figure 15:
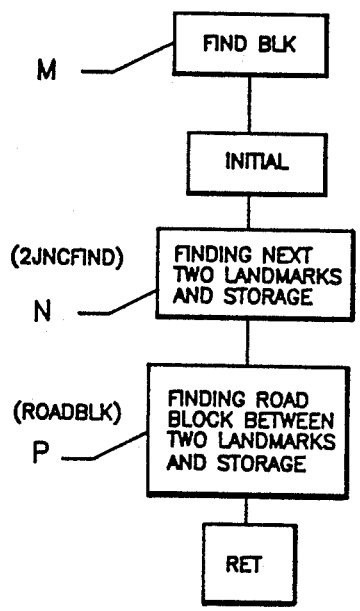
FIG. 15 is a flow chart illustrating the FINDBLK (find block for route information between two junctions) subroutine of FIG. 14.
Figure 23:
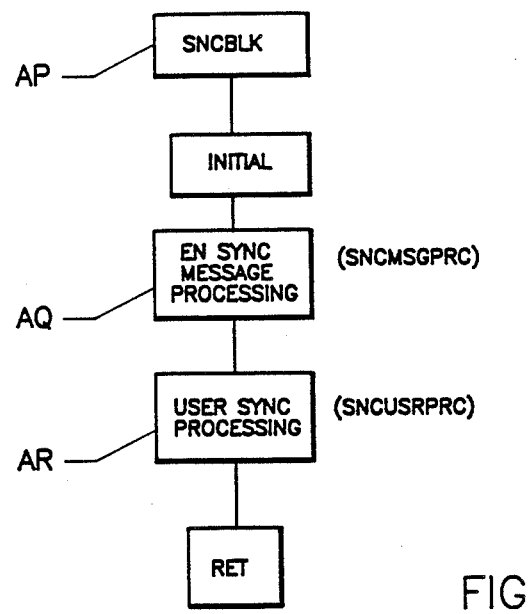
FIG. 23 is a flow chart illustrating the SNKBLK (user synchronization block) subroutine of FIG. 22.

Following the path outline process (F), the data processing stage sub-routine PRCSS (J) is entered to prepare action block data and to assemble the blocks in a part of RAM called action memory. This is defined in more detail in FIG. 13. FIG. 13 in turn refers to sub-routines PRCSSI (K) and PRCSS2 (L) defined in FIGS. 14 and 20 respectively. The sub-routine illustrated in FIG. 14 includes the sub-routine FINDBLK (M) of FIG. 15 which in turn involves the sub-routines of FIGS. 16 (N) and 19 (P). The sub-routine PRCSS2 (L) of FIG. 20 includes the sub-routine NXTACTBLK (Q) of FIG. 21 which in turn includes the sub-routines of FIGS. 22 (R), and which in turn includes the subroutines SNCBLK of FIG. 23. In addition, the routine of FIG. 21 (R) includes the sub-routine CRCLWEEL (S) defined in FIG. 53. FIG. 23 in turn refers to sub-routines defined in FIGS. 24 (AQ) and 52 (AR).

The data processing stage PRCSS (J FIGS. 4, 13) is performed in order to process the sequence data generated from the path outline stage, to prepare correct action blocks data for the "path implement" stage (W) which follows and to store this data in the action memory, forming part of RAM.

The path implement stage of sub-routine PTHIMP (W) is defined in FIG. 25. A more specific embodiment of PTHIMP (W) is found in FIG. 35. It will be appreciated that this stage is performed during the vehicle journey in order to control the vehicle location over the outlined route. To enable the driver to follow the route, instruction data are fetched from the data in action memory and supplied to the driver, and errors which may be accumulated are periodically corrected. In addition, on detection of a driving deviation, a new route may be computed. Thus, the sequence "path outline, data processing, path implement" may be performed more than once during a single journey.

This repetition may occur not only in the event of a driving mistake, but also if, for a long journey, the route is divided into a plurality of sections.

Finally, FIG. 4 indicates a sub-routine TIRFRCTN (X) which takes account of tire wear by adding the total distance travelled to the precious distance to enable a warning to be provided to the driver when the tires need replacement.

PATH OUTLINE EXPLAINED

Figure 8:
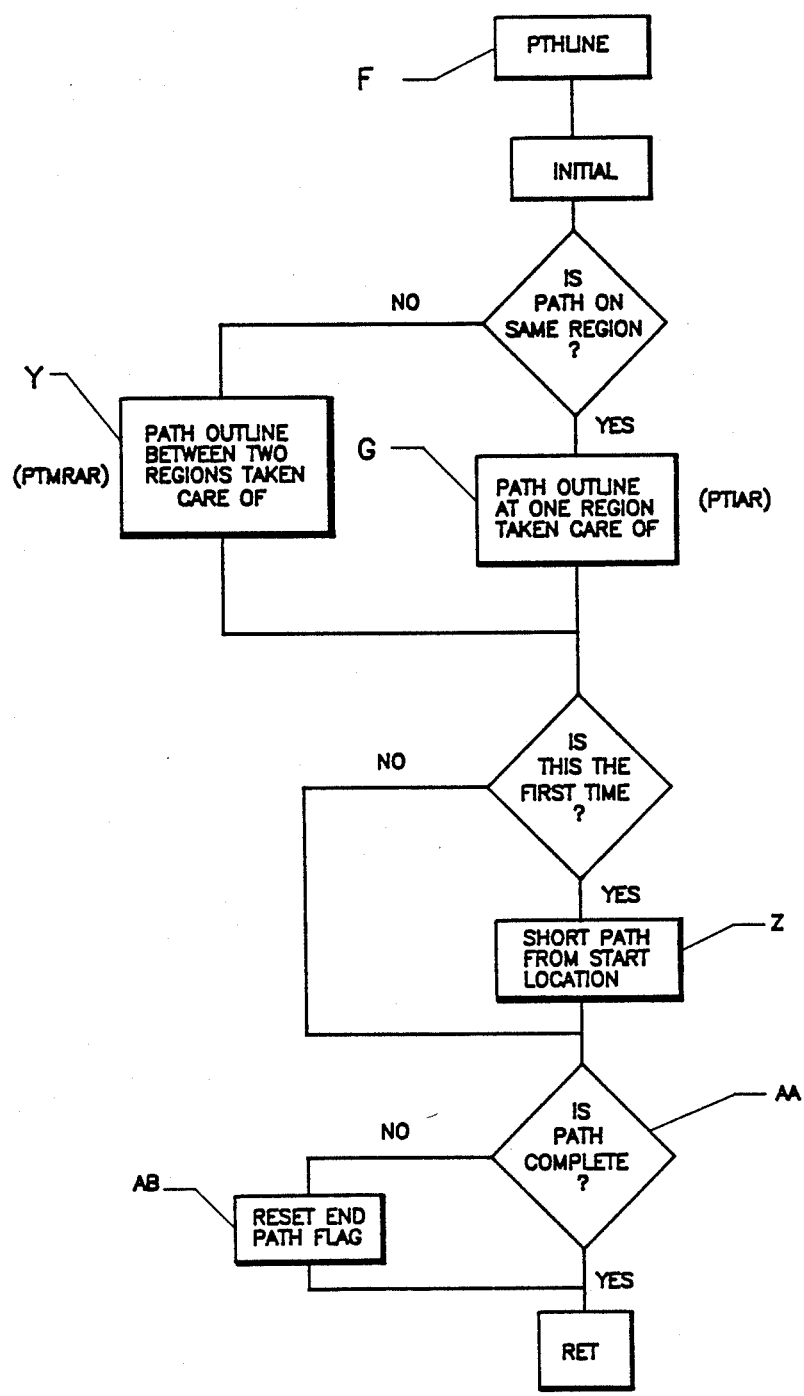
FIG. 8 is a flow chart illustrating a process for a general path outline (route establishing means)

Reference will now be made to FIG. 8 to define the path outline processing sub-routine PTHLINE (F) in more detail.

Figure 10:
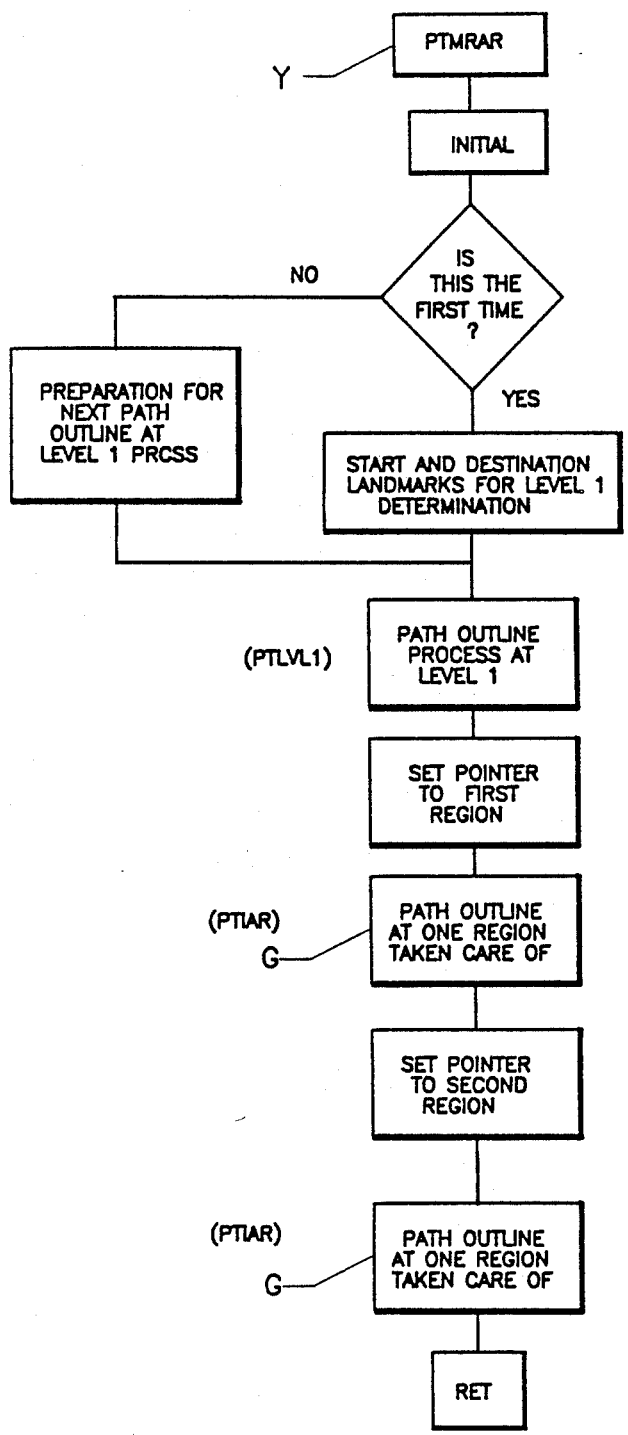
FIG. 10 is a flow chart illustrating the process for generating a path outline between any two regions.

For full comprehension of the sub-routine of FIG. 8, it is necessary to understand that if the start location and desired destination are in different regions (i.e. different plug-in units required), the path outline stage will be performed in three sections together with computation of a path outline between respective regions, as indicated in sub-routine PTMRAR, shown in more detail in FIG. 10.

Figure 69:
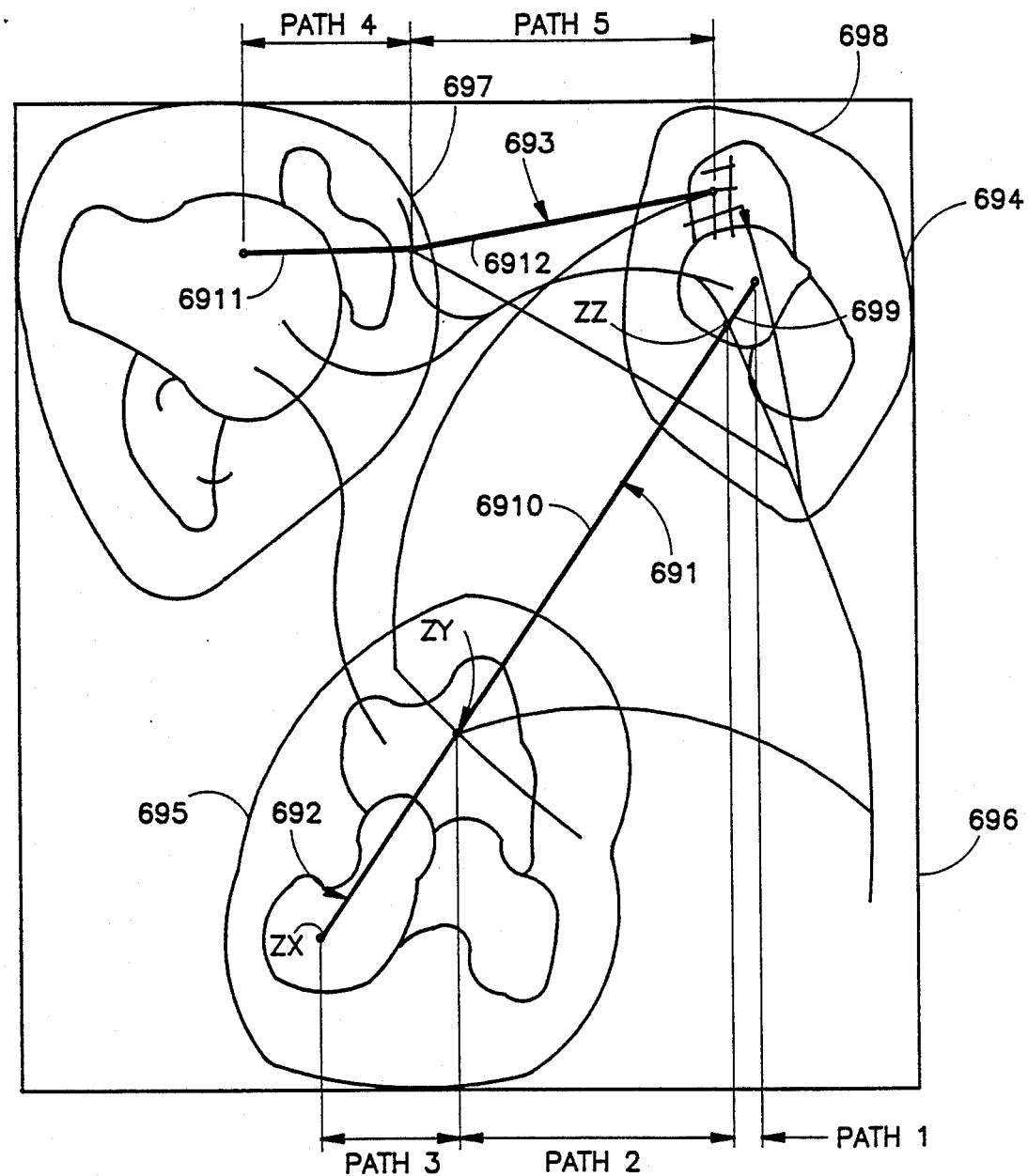
FIG. 69 illustrates path outlining schematically in accordance with the various kinds of memory units.

The path outline between the two regions (FIG. 10) will normally be carried out using high level roads (level one roads), such as motorways and main roads leading to cities. The path outline in the initial and final regions will normally be performed with level two and level three roads, using the routine of FIG. 9. Level two roads will perhaps be main roads within a city and level three roads would be internal narrow roads within a region. All level one roads will be specified in the country memory unit. The level two and three roads will be specified in the various plug-in units. Three possible routes 691, 692 and 693, comprising various sub-paths are illustrated in FIG. 69 which represents a country map showing three areas of three plug-in units.

In case 1, route 691 is established after employing the path outline procedure for plug-in units 1 and 3, 698 and 695 in the context of country memory unit 696. For example, the database of the first plug-in unit 698 is used to calculate a first path 699. The database for the third plug-in unit is used to calculate the third path 692, and the country memory unit 696 database is used to calculate the second path 6910 between a landmark within the database of the first plug-in unit 698 and a landmark in the database of the second plug-in unit 695 designated point ZZ and ZY, respectively.

In case 2, the database of plug-in unit 3 contains all information necessary to compute a route. Therefore, the computation is based solely on the content of the database of plug-in unit 3. This route is between point ZY and point ZX and, coincidentally, corresponds to the third path 692.

In case 3, the contents of the database of plug-in unit 2 697 and the country memory unit 696 are used to determine the third route 693. Information for path 4, 6911 is contained solely within the contents of the database plug-in unit 2 697. The information in the country database 696 contains sufficient information to determine routing between points within the databases to separated plug-in units, namely plug-in unit 1 698 and plug-in unit 2 697 along a level 1 road, herein represented by path 5 6912. Reduced to a minimum, all paths are either computed between points within the country memory unit or between points within a database of a plug-in unit, such as a city or metropolitan area.

Following the path outline stage, instructions for a short path (Z) from the start location to the start landmark (junction) will be prepared, as indicated in FIG. 8. This is necessary because the path outline algorithm is operative to define a route between two landmarks which are defined in the memory unit, and initially the vehicle will probably not be at a defined landmark. The short path routine brings the vehicle to the start landmark to await the first route instruction.

In FIG. 8, the decision block "Is path complete?" (AA) is indicated. This is to take account of the possibility that the route may be constructed of more landmark blocks (and thus of more data) than the action memory can contain. To allow for this, in the event that the path is not yet complete, an "end path flag" is reset (AB), as indicated, to indicate the route is still incomplete. After the first outlined route section has been performed, the main program in FIG. 4 includes the decision block "End path flag set?" (AC) and if the flag is not set, the program will again perform the path outline (F), data processing (J) and path implement stages (W). This successions of operations is continued until the entire path has been outlined.

Figure 9:
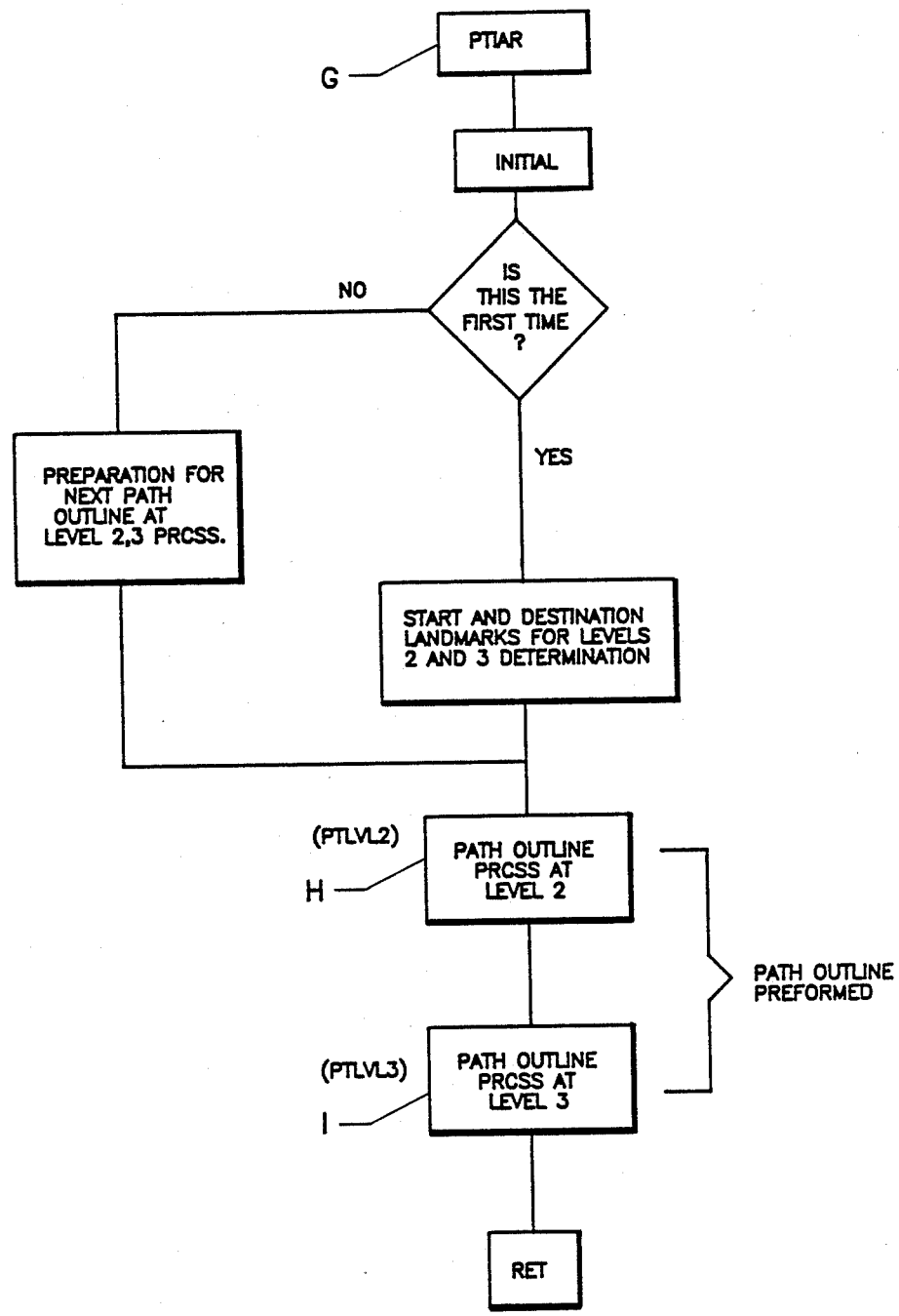
FIG. 9 is a flow chart illustrating the process for generating a path outline within a single region.

The sub-routine (G) of FIG. 9 defining the path outline procedure within one region will now be discussed in more detail. It will be observed from FIG. 9 that the path outline stage is divided into two main sub-stages, sub-routine PTLVL2 (H) (for path outline in the main road network) and sub-routine PTLVL3 I (for path outline in the internal road network) which relate to the path outline procedure employing level 2 and level 3 roads, respectively. In each case, the sub-routine is performed in accordance with FIGS. 11 and 12. The path outline process H, also called PTLVL or PTLVL1, PTLVL2 or PYLVL3, is the same procedure, differing only based on the road network level. The main functional stages of these routines are the following (FIGS. 11 and 12):

A. calculation of relative distance KL (AD); (the distance is calculated between two reference points).
B. determination of junction direction relative to objective junction, finding existing junctions (landmarks) and storing (AE, AF);
C. legality checking (AG);
D. taking account of any central junction (landmark) or backward step (AH).

The path outline process (FIG. 11) involves selection of a sequence of landmarks leading from the start location to the final destination. The sequence of landmarks is selected according to the following rule:

At each landmark, the total road distance ($D_1$) from the start location to the landmark added to the straight line or great circle distance ($L_1$) from the current landmark to the destination multiplied by a coefficient K should be less than or equal to the straight line or great circle distance (L) of the whole journey multiplied by the coefficient K. The coefficient K is chosen to provide an estimate of the road distance to be expected between any two landmarks. Thus, the algorithm is based on the assumption that the road distance between any two landmarks is always proportional to the shortest distance there between, "as the crow flies".

Figure 12:
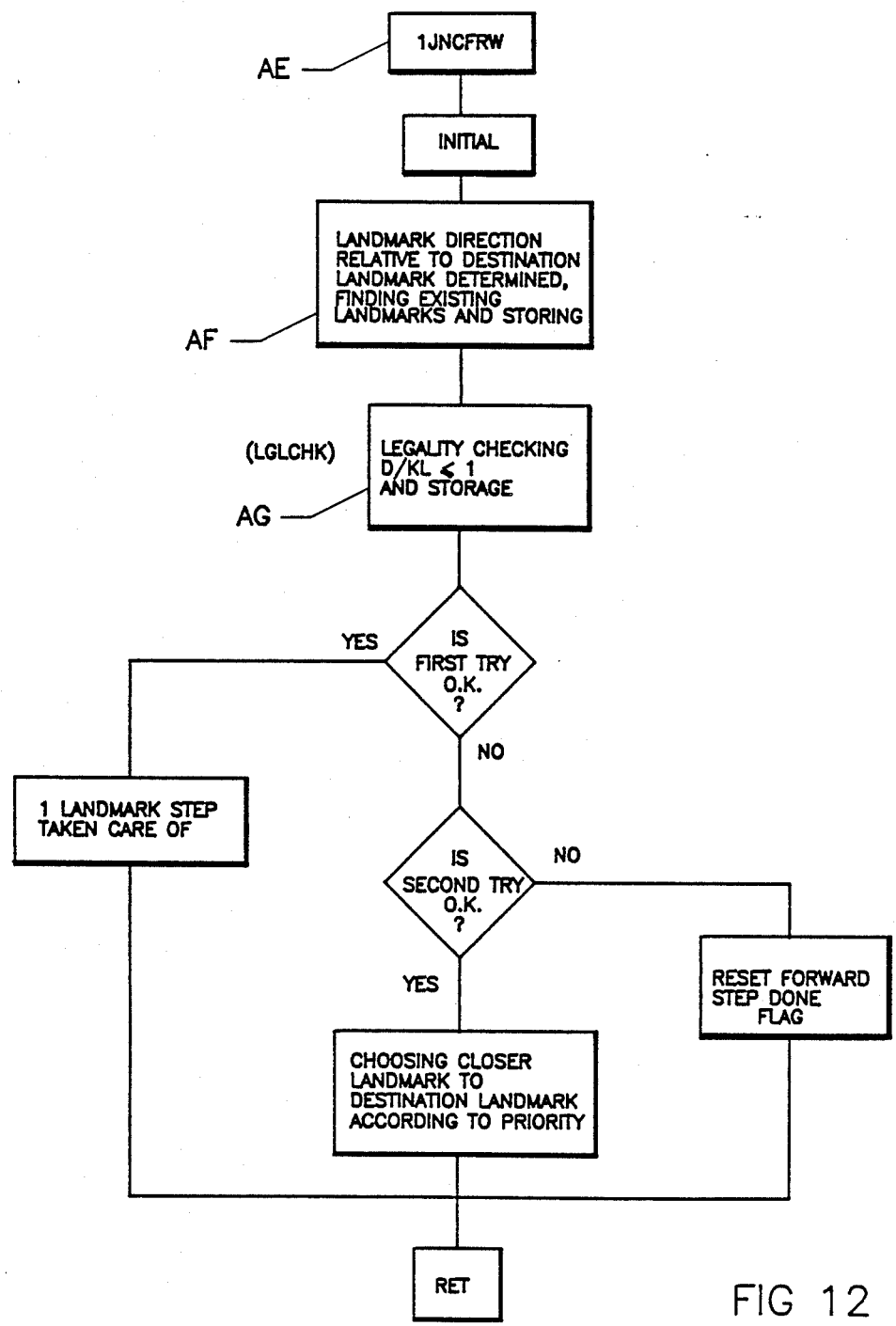
FIG. 12 is a flow chart illustrating the sequence of progress between adjacent junctions.

In FIG. 12, the above-defined legality condition is expressed as "D/KL less than or equal to one", where $D = D_1 + KL_1$. This is described as sub-routine LGLCHK (legality check) AG in FIGS. 17 (AG) and 18 (AJ).

Figure 11:
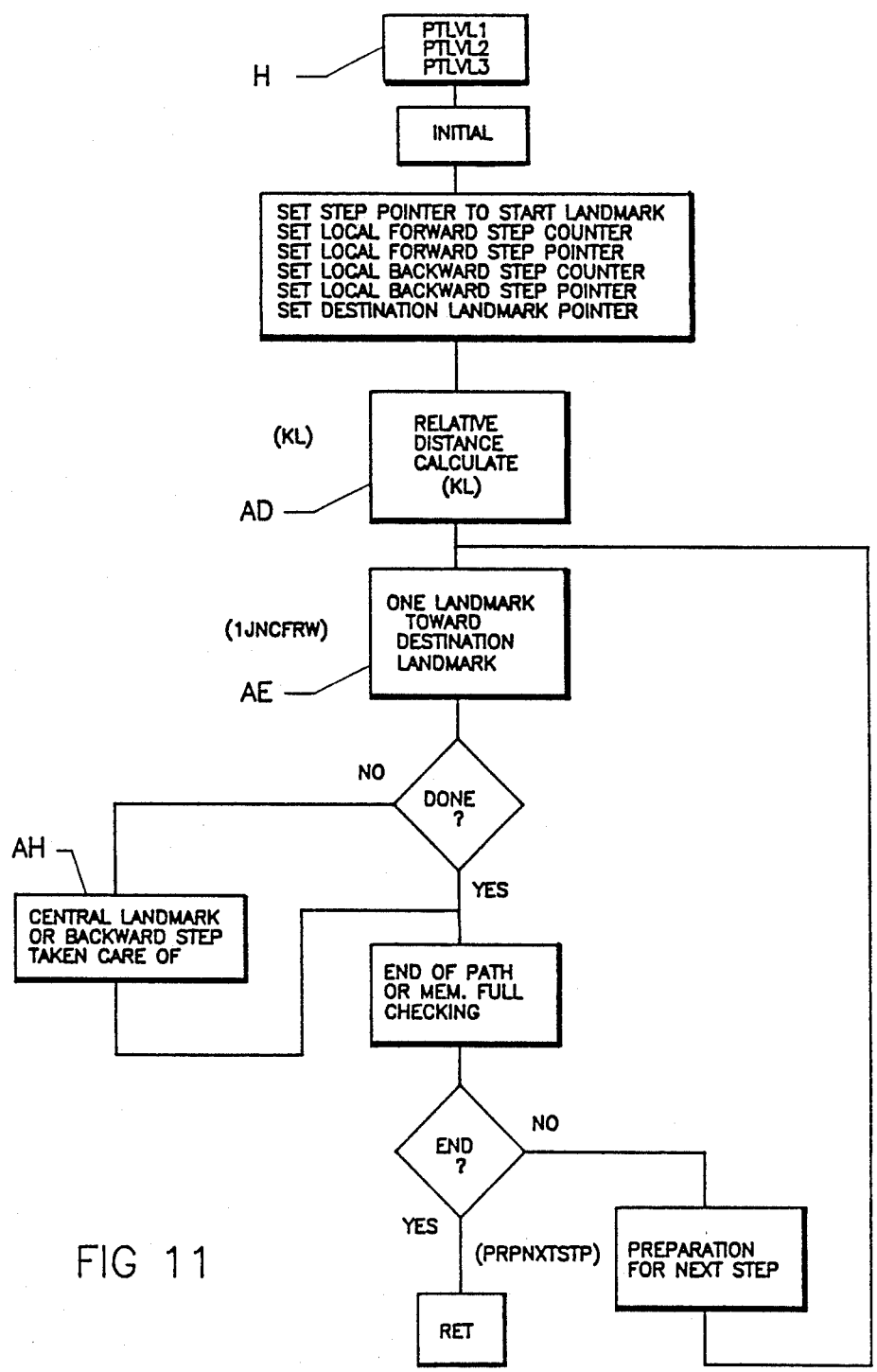
FIG. 11 is a flow chart illustrating the path outline procedure for any level including individual process steps for determining an entire route using a path outline.

It will be appreciated that step AD of FIG. 11 calculates the relative distance which is the maximum route length permitted and is equal to the straight line or great circle distance between the start location and desired destination multiplied by the constant coefficient.

Steps AE, AF and AG find all landmarks which satisfy the legality condition (if any) which make progress towards the desired destination and then determine the best landmark for the next step. Preference will be given to higher level intersections if there is more than one, provided that they meet the legality criterion.

If there is no legal intersection, step AH is entered so that either the route reverses by one landmark and seeks another landmark or alternatively determines the closest central landmark as an intermediate desired destination. As already mentioned, the data block for each landmark defines the landmark or junction number of the closest central landmark (Table A).

DATA PROCESSING EXPLAINED

The data processing step (J) will now be considered in more detail.

During the path outline step (F), the numbers of the landmark blocks which define the outlined route have been stored into particular locations of RAM according to the sequence of the route. In addition, a landmark or junction or counter 141 (FIG. 14) has been set to the number of landmarks or junctions which constitute the route. The junction counter 141 is a software counter associated with steps AE and AH of FIG. 11.

These data, i.e., the contents of the junction counter 141 and the number of the landmarks, form the input data for the data processing step J (FIG. 13). The data processing step (J) is divided into two main sub steps K and L. During the first substep K (illustrated in FIG. 14), the relevant junction block data is fetched from a plug-in unit, processed and stored according to the order in which the landmarks are to be visited during a journey. The data block for the first road interconnecting the first two landmarks will be processed and stored. The junction counter 141 will be decremented, and the data block for the next intersecting road interconnecting the next two landmarks will be fetched, processed and stored, the junction counter 141 will again be decremented, and this process will be continued until the junction counter 141 reaches zero. At this point, a "end of journey" data block is prepared (AM FIG. 14).

Figure 14:
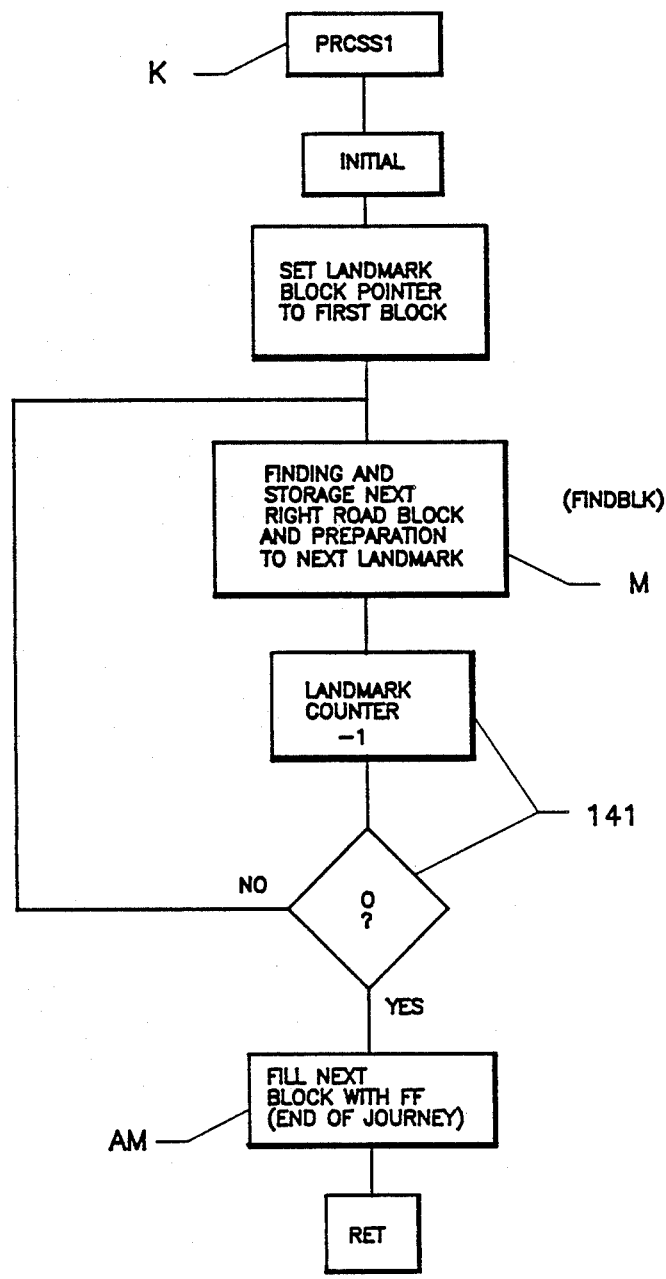
FIG. 14 is a flow chart illustrating the first process of the flow chart of FIG. 13 whereby relevant route outline data is fetched.
Figure 16:
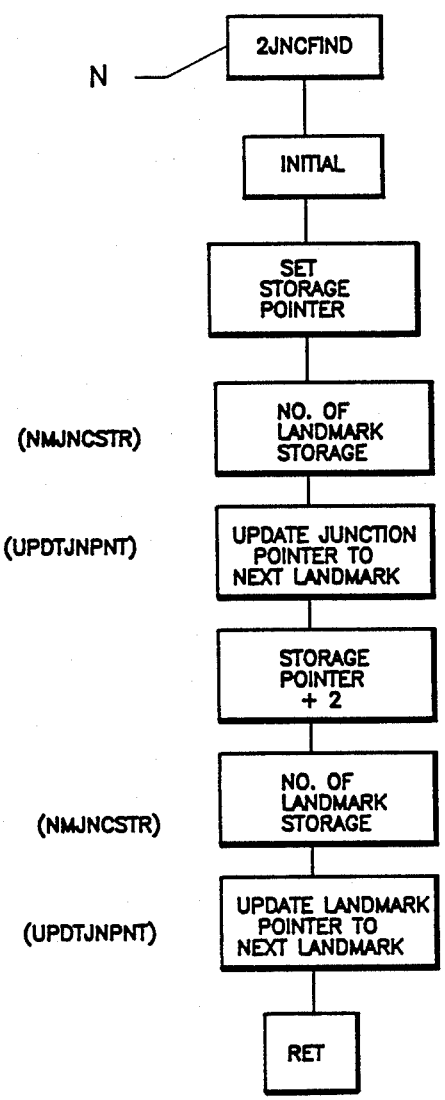
FIG. 16 is a flow chart illustrating the 2JNCFIND (two junction/find) subroutine of FIG. 15.
Figure 17:
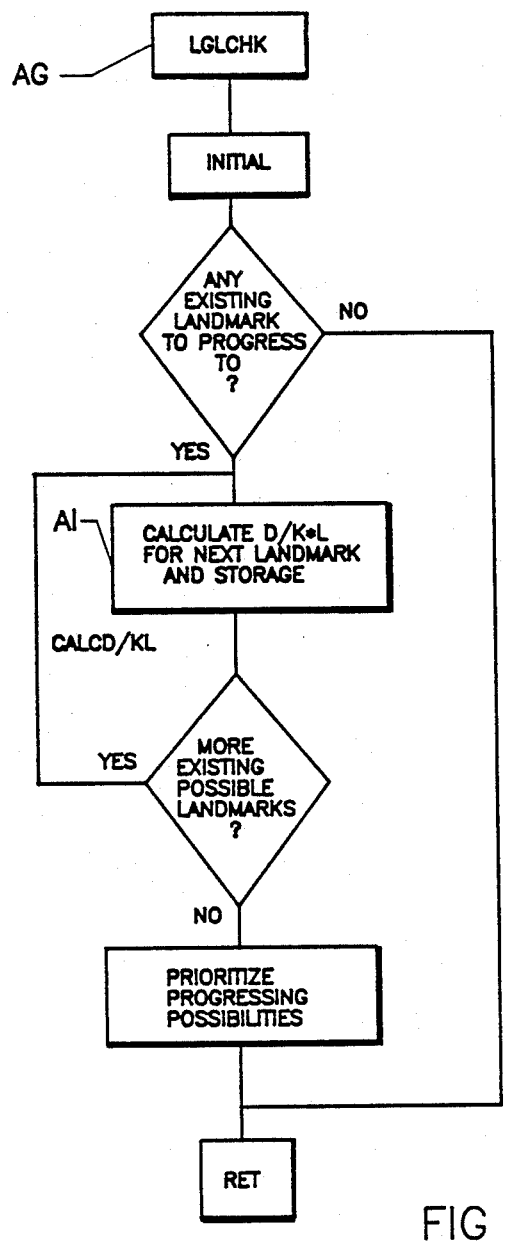
FIG. 17 is a flow chart illustrating the LGLCHK (legality check) subroutine of FIG. 12.
Figure 18:
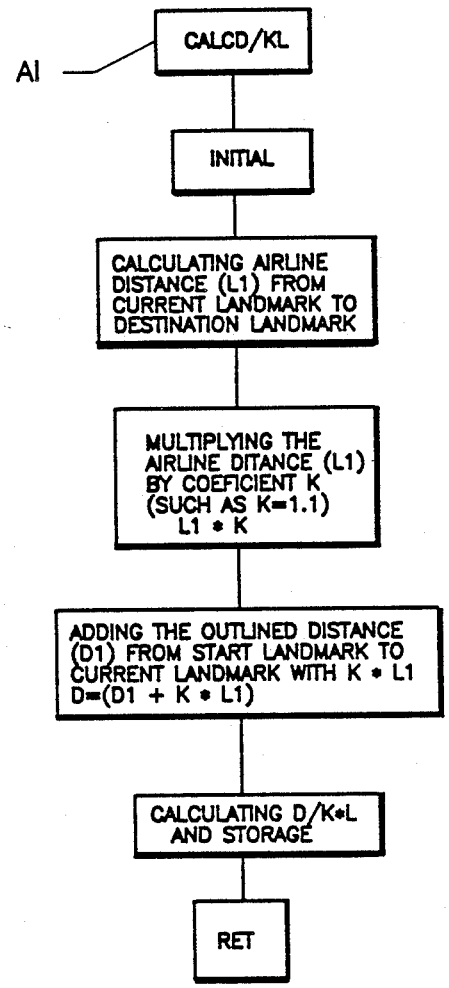
FIG. 18 is a flow chart illustrating the CALCD/KL (calculate D/KL) subroutine of FIG. 17.
Figure 19:
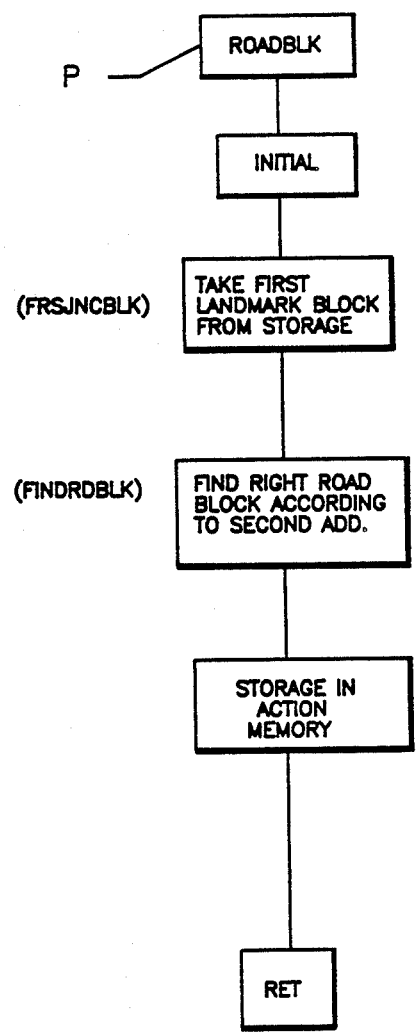
FIG. 19 is a flow chart illustrating the ROADBLK (the data related to the functions of FIG. 15) subroutine of FIG. 15.

The data generated from the stages or step indicated in FIG. 14 is temporarily stored in the locations of RAM referred to as "action memory" 228 (FIG. 2C). Each data block represents a road linking two landmarks. After the second sub step L of data processing the action data is stored in the action RAM 228 ready for path implementation. Each action block contains status flags (B1), the accumulated error (in wheel revolution units) B2, the distance of the action (cycle) in wheel revolution units B3, and data for display B4, as illustrated in Table B.

TABLE B

| An example of an action block specifying an action. | |
|---|---|
| Status Flags | B1 |
| Error Accumulated in Wheel Revolution Units | B2 |
| Wheel Revolutions in the Cycle | B3 |

TABLE B-continued

An example of an action block specifying an action.

| Data for Display | B4 |
|---|---|

The status flags B1 include a turn action flag, indicating whether the previous action is terminated by a significant turn, which implies that the error accumulated may be set to zero for the current action block. Other flags important for the synchronization process are the sync, auto sync, en sync, and sync action flags. The accumulated error is referred to herein as the mistake distance. An example of the interrelationships between the accumulated error, the mistake distance, and the computed distance is illustrated in FIG. 33. According to FIG. 33, the distance of the cycle between two landmarks is formed from the number of wheel revolutions calculated from the distance measured from the map (and therefore subject to a degree of mapping error). If a synchronization operation is defined for the action, a number of wheel revolutions corresponding to the $d+$ of the mistake distance is added to the number representing the distance of the cycle, and, the window enable distance is determined to be greater than or equal to the mistake distance $(d+ + d-)$. When no synchronization is defined for the action, the computed distance of the cycle is formed only from the number of wheel revolutions indicating the distance measured from the map.

There are four computed distances: the error accumulated, the mistake byte and window enable distance length, the computed action distance, and the window start point for synchronization enabling:

1. The error accumulated is a distance computed as a function of map distances measurements and the assumed systematic errors during the journeys. It may be expressed, for example, by the following equations:

$$d^+ = 12.5 \times 10^{-2} \times N + (0.025/100) \times S$$

expressed in meters $$d^- = 12.5 \times 10^{-2} \times N$$

expressed in meters

Where $d+$ defines the allowable error distance before the approached landmark, assuming the vehicle could arrive at the landmark with no errors, and $d-$ defines the allowable error distance for a vehicle after the approached landmark.

0.125 meters represents an error distance on a road for each landmark, where N represents the number of landmarks since the last synchronization, 0.025/100 represents the assumed systematic error, and S represents the distance travelled by the vehicle since the last synchronization was effected.

The mistake byte and window enable distance length comprises the mistake byte and the window enable distance length separately. The mistake byte consists of two portions: a first portion comprising the distance $d+$ and a second portion comprising the distance $d-$. The mistake byte allows access to both distances for subsequent calculation.

The window enable distance length (WEN) may be expressed as the sum of the distances $d+$ and $d-$.

The computed action distance is provided in one of two ways, action which does not involve synchronization and action which involves synchronization. For action which does not involve synchronization the computed distance is equal to the measured distance, or $d_c = d_m$.

For action which involves synchronization, the computed distance is equal to the sum of the measured distance plus the error distance before the approached landmark, or $d_c = d_m + d+$. The computed distance $d_c$ is as stored in the action ram, $d_m$ is the distance between the two landmarks of the action as indicated by map measurement without taking into account any accumulated distance or errors in travel along the map path. The value $d_c$ is compared with the value obtained from the one action road counter during one cycle.

The window start point for synchronization enabling is the value at which the one action road counter enables the window. This value corresponds to the distance $d_m - d+$. Thus, the window enable synchronization should occur at the distance before the approached landmark $d-$ assuming no errors in distance measurement by the one action road counter or by map measurement.

The second sub step L of data processing will now be described with reference to the drawings.

Figure 20:
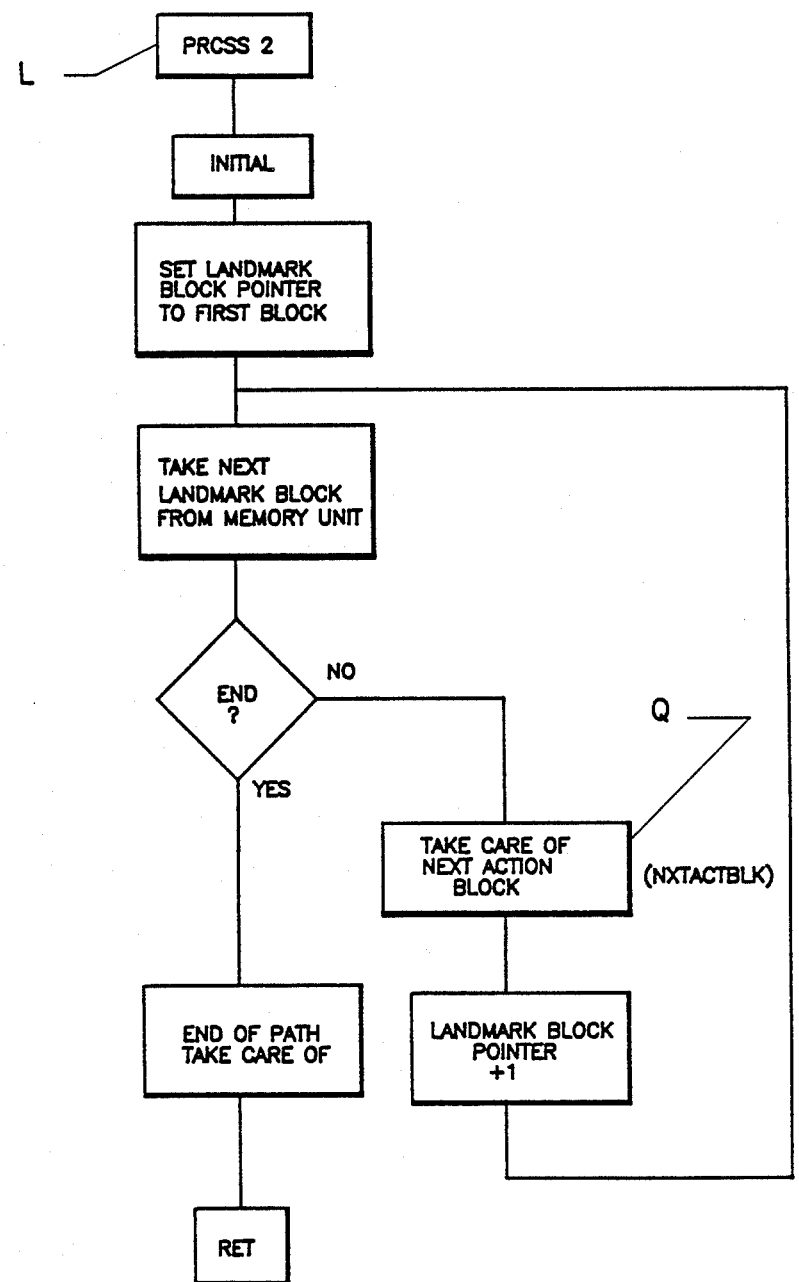
FIG. 20 is a flow chart illustrating the PRCSS 2 (sequence action data processing of the first processing means) subroutine of FIG. 13.
Figure 21:
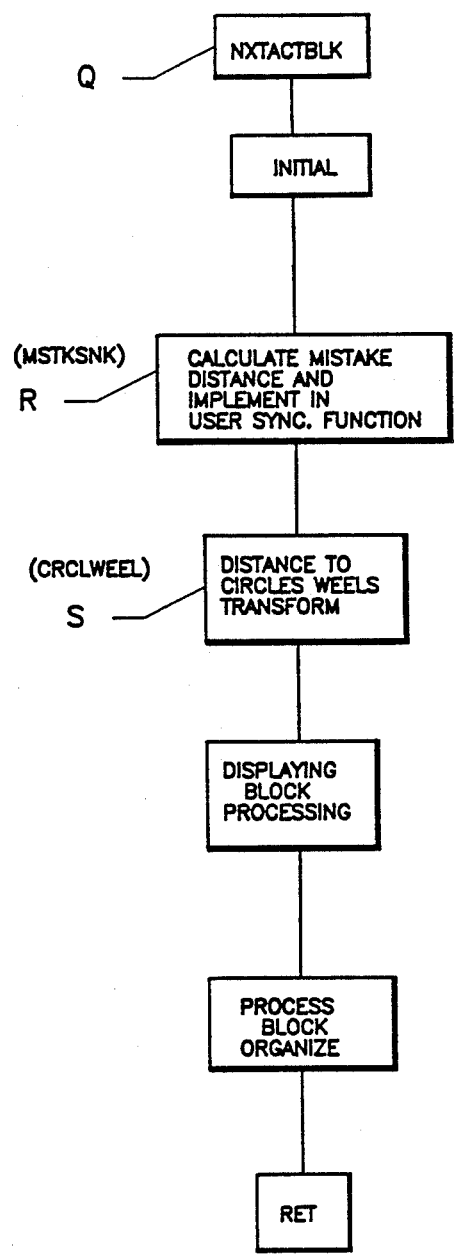
FIG. 21 is a flow chart illustrating the NXTACTBLK (next action block) subroutine of FIG. 20.
Figure 22:
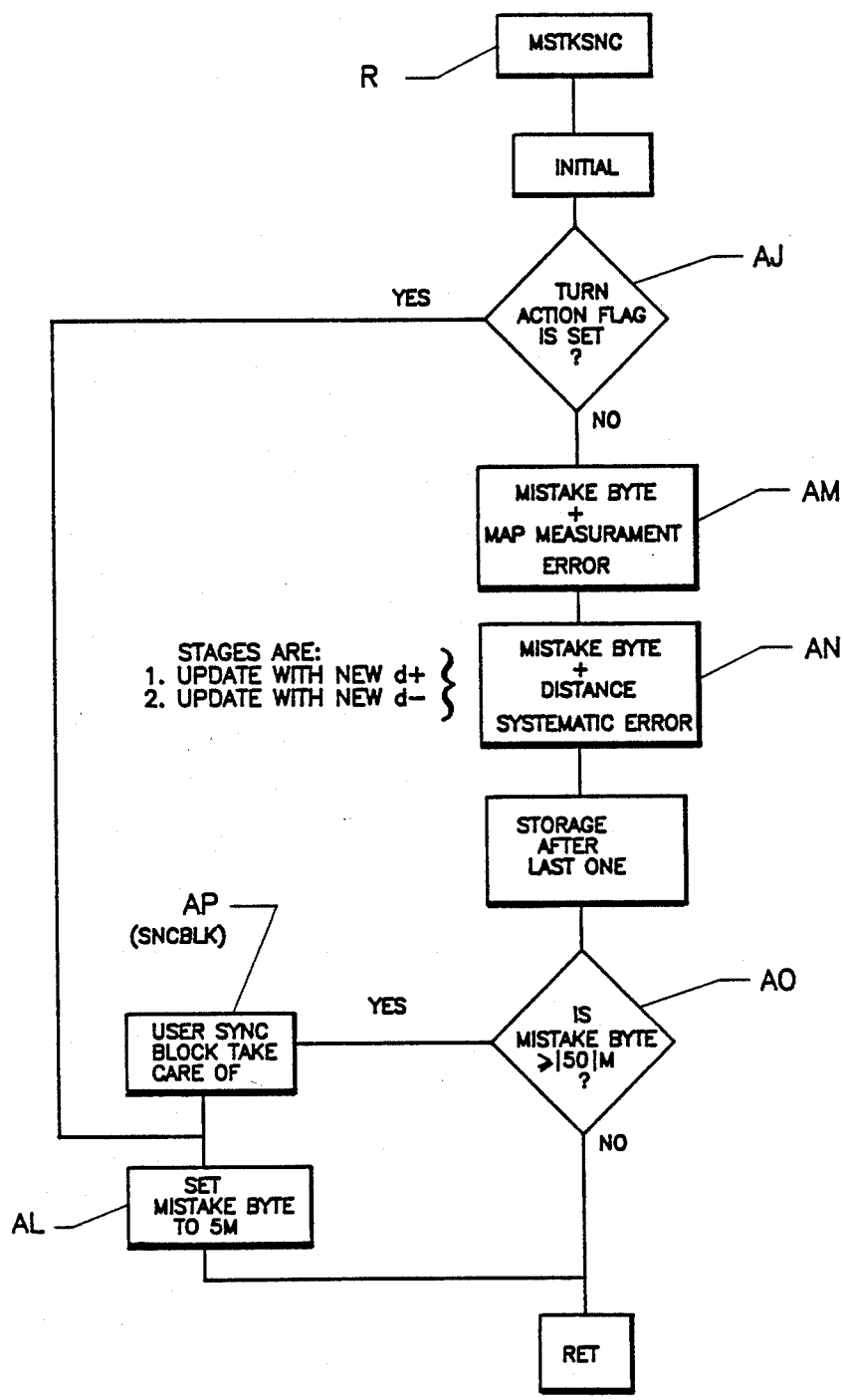
FIG. 22 is a flow chart illustrating the MSTKSNC (mistake calculation for synchronization) subroutine of FIG. 21.

Referring first to FIG. 20, this flow chart indicates that for each action block of data the sequence of steps Q illustrated in FIG. 21 is carried out in turn. The first main block of the sub-routine Q of FIG. 21 is sub-routine MSTKSNK R. The individual steps of this sub-routine R are illustrated in detail in FIG. 22. As will be seen, the first major step of this sub-routine R is a decision box AJ to determine the status of the mistake byte for this action by checking whether the previous action involves an automatic synchronization (when the turn action flag is set). If the flag is set the routine proceeds to "set mistake byte to 5 meters AL". Thus, if the previous action involves automatic synchronization, the mistake distance (i.e. the accumulated error) is set to an initial constant value, in this example 5 meters. This constant represents the possible distance of the vehicle from the center of the landmark from the point on the road where the turn is to be detected.

If on the other hand no synchronization is to take place at the previous landmark, the accumulated error is updated and added to the number stored as the mistake distance. The error is updated in two respects: in respect of error derived from the map measurement (AM) and in respect of error dependent on the distance travelled over the action (AN). It is then checked whether the accumulated error has reached a predetermined value AO, in this example 50 meters. If it has, the status flags are updated to indicate that manual synchronization is to be effected, as set forth in sub-routine SNCBLK illustrated in FIG. 23. FIG. 23 in turn refers to sub-routines defined in FIGS. 24 (AQ) and 52 (AR).

Figure 24:
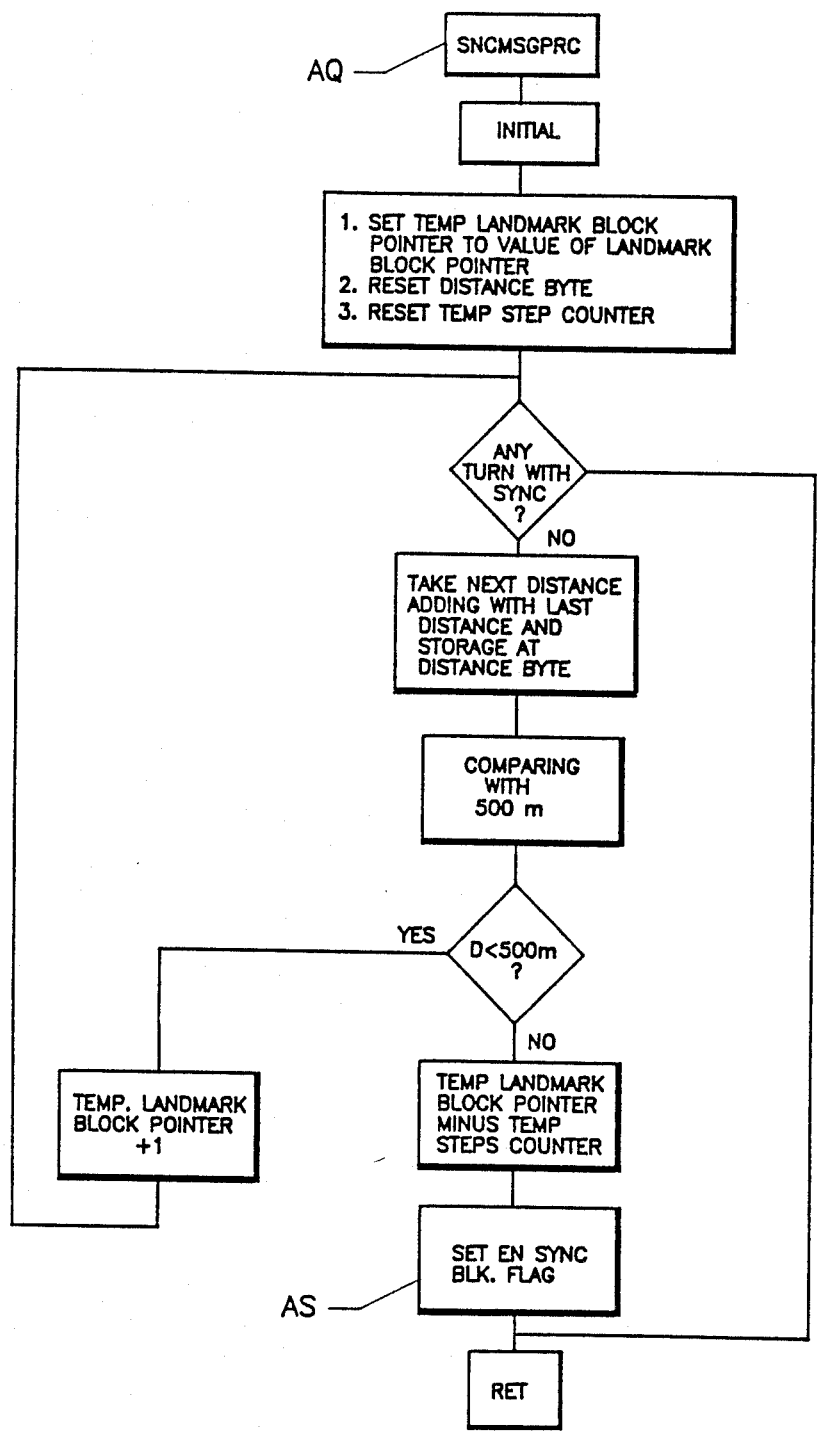
FIG. 24 is a flow chart illustrating the SNCMSGPRC (synchronization message processing) subroutine of FIG. 23.

As will be seen from FIG. 24, the first few operations have the effect of checking whether a turn is to be carried out within a range of 500 meters from the current junction. If no turn is to be expected, the closest junction in the forward direction having a distance from the current junction of at least 500 meters is determined. The status flags are updated to cause the driver to be warned to carry out manual synchronization, i.e. the "ENSYNC" flag is set (AS).

If a turn is expected within a range of 500 meters from the current junction, a manual sync will not be required. The sub-routine illustrated in FIG. 52 then processes the data generated from the sub-routine illustrated in FIG. 24. Having completed the sub-routine MSTKSNC (R), as illustrated in FIG. 21 the program then proceeds to sub-routine CRCLWEEL (S), illustrated in more detail in FIG. 53. As indicated, both the distance of the action and the accumulated error are transformed into a number of wheel revolutions indicated by the variable "WHEELS" and the variable d+ is defined in FIG. 33. The data is then prepared for display and then the data is organized in appropriate format for the path implement stage (PTHIMP) (W) of FIG. 4.

Figure 53:
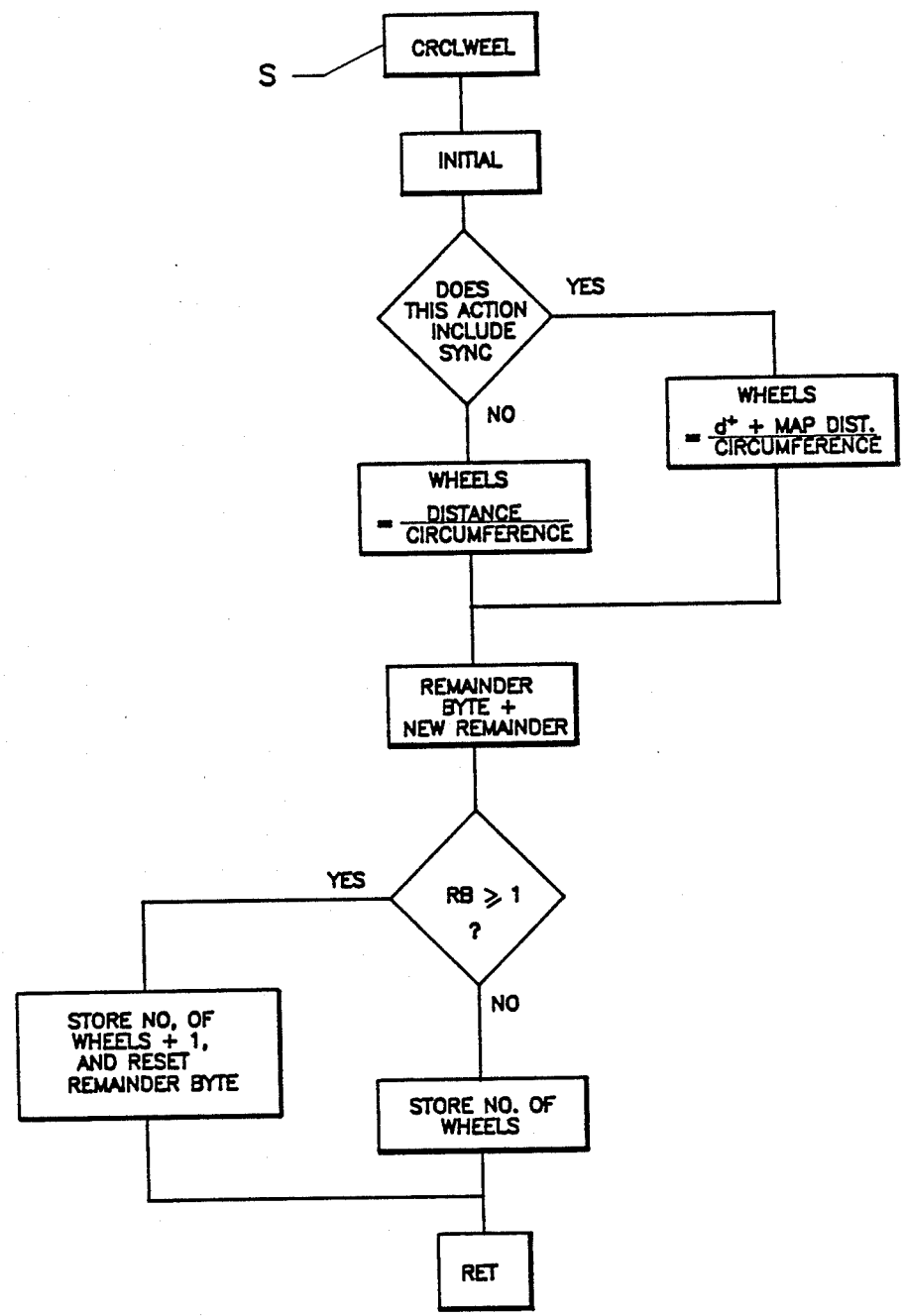
FIG. 53 is a flow chart ill CRCLWEEL (distance to circulation for wheel transformation) subroutine of FIG. 21.

The variable "WHEELS" mentioned in FIG. 53 when the action involves synchronization is formed from the number of wheel revolutions extracted from the distance as measured from the map plus the number of wheel revolutions extracted from the positive accumulated error distance (d+).

The window enable distance is determined to be equal to the accumulated error distance (d+ +d−), and the synchronization signal is enabled to be accepted when the vehicle is traversing this window distance. When the distance measured by the distance sensor indicates that the vehicle is within the accumulated error distance from a synchronizing turn, the window is opened and remains open during the period that the vehicle traverses through the window distance or until a sync signal is received.

PATH ROAD COUNTER UPDATE

Before describing the path implementation process and synchronization operations during the journey, reference should be made to FIG. 34. This Figure illustrates an interrupt routine (BA) which interrupts the path implementation sub-routine PTHIMP (W) at regular constant time intervals during system operation. A hardware timer (shown in FIG. 2a as "timing and control logic" 202 Int RST 7.5) interrupts the CPU 205 in order to permit reading of the forward road counter 2-11 (H1) reverse road counter 212 (H2) (FIG. 2g and Table C) connected directly to the road sensors 4a and 4b. The path road counter (BB FIG. 34 and S1 FIG. Table C) is then updated according to the contents of the hardware road counters 211, 212. The hardware road counters 211, 212 begin counting at the beginning of the journey and are reset at the end of the journey. If the "speed request" flag is set (BC), the interrupt routine also computes the vehicle speed proportional value.

In summary, the purpose of the interrupt routine (BA) illustrated in FIG. 34 is to regularly update the path road counter (BB, of Table C) in respect of the wheel revolutions travelled by the vehicle during the journey, and to update the speed road counter (S4 of Table C) when requested.

SYSTEM SYNCHRONIZATION

Figure 30:
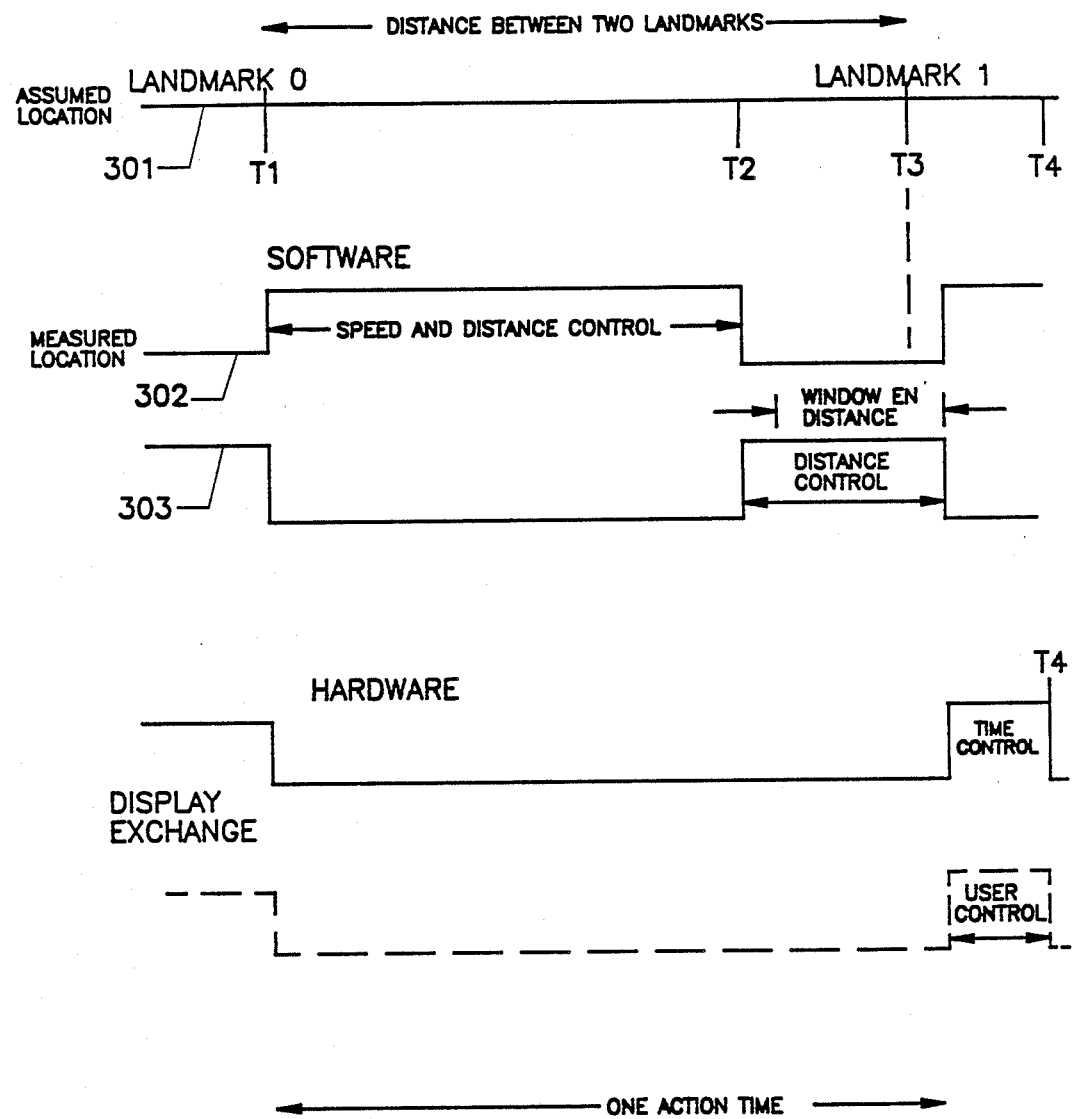
FIG. 30 is a timing diagram illustrating a cycle between two landmarks when automatic synchronization is needed but not employed.
Figure 31:
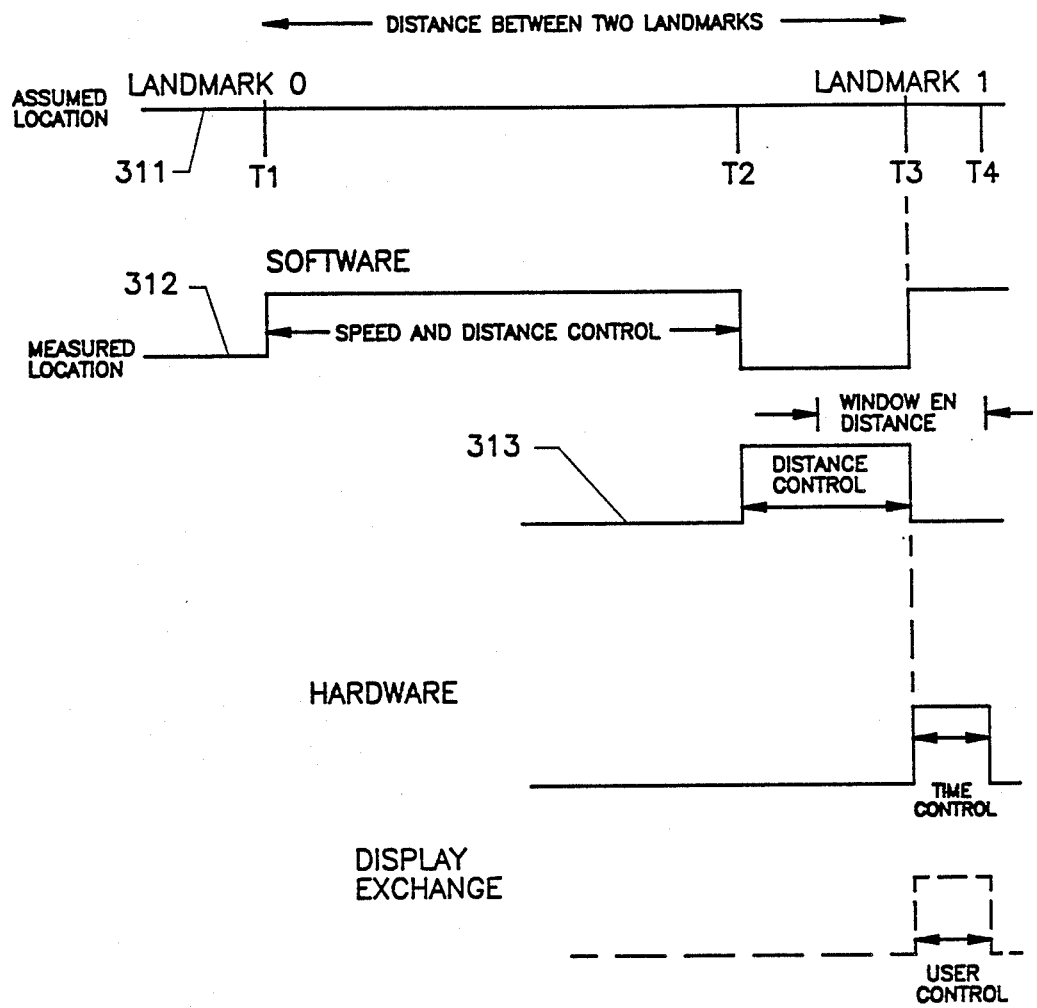
FIG. 31 is a timing diagram illustrating a cycle between two landmarks when automatic synchronization is employed.
Figure 32:
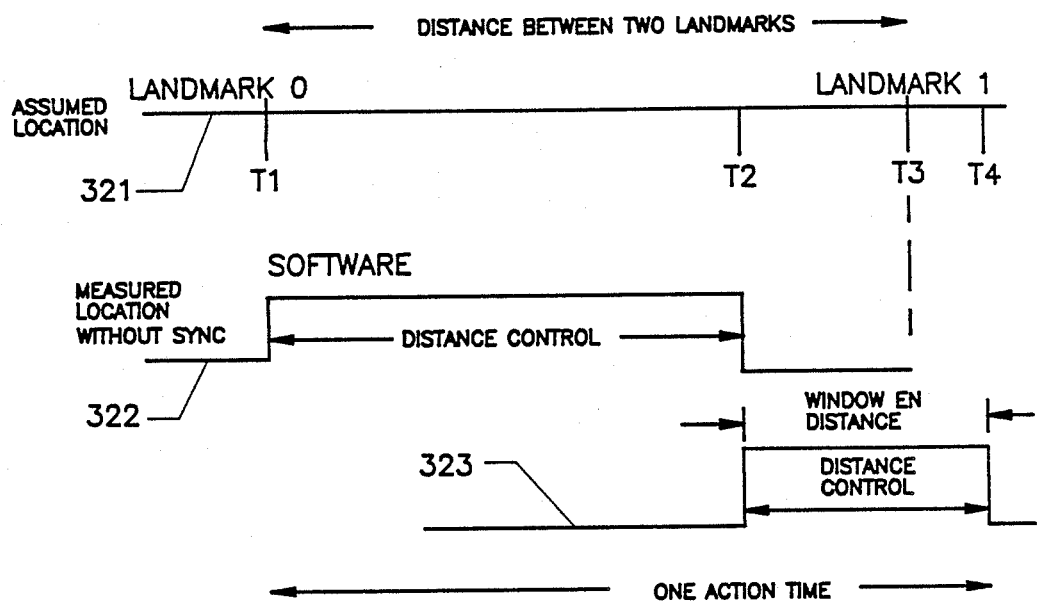
FIG. 32 is a timing diagram illustrating a cycle between two landmarks illustrating manual synchronization.
Figure 32:
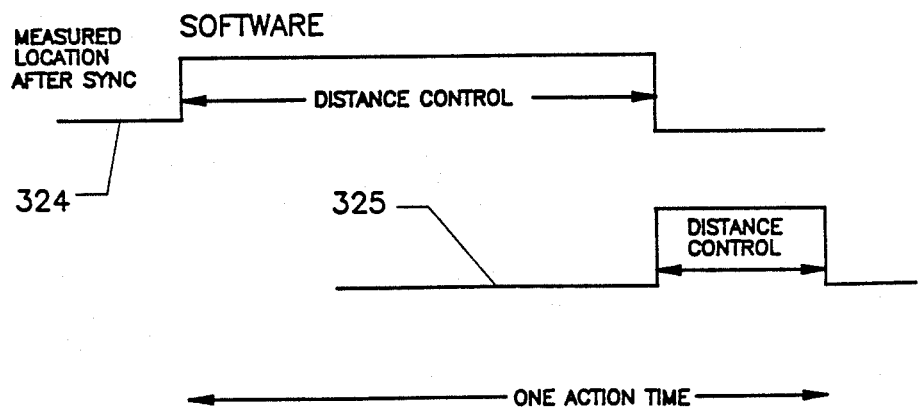

The synchronization method according to the invention is illustrated schematically in FIG. 27 29 to 32. In each of FIGS. 29 to 32, the first line 291, 301, 311, 321 represents assumed location and the second and third lines 292, 293; 302, 303; 312, 313; 322, 323 represent measured location. In FIG. 32 the fourth and fifth lines 324, 325 also represent measured location.

Figure 38:
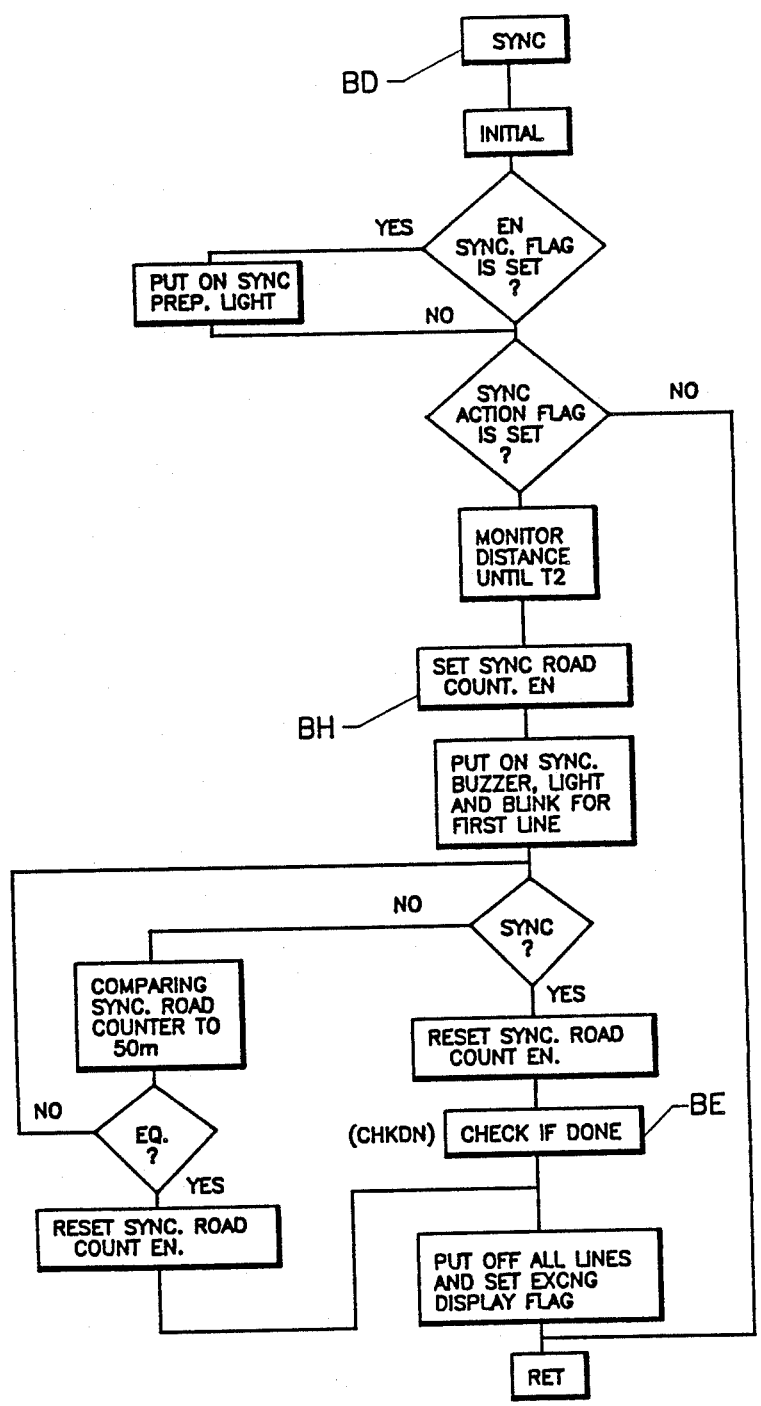
FIG. 38 is a flow chart illustrating the SYNC (synchronization) subroutine for manual synchronization of FIG. 36 and in accordance with FIG. 32.

The upper part of FIG. 27 illustrates first of all a typical example of the manual synchronization method performed over a series of four landmarks. The enable sync flag is set for 500 meters from the landmark where synchronization is to be effected. The sync action flag is set for the last two a landmarks. The related software is illustrated in FIG. 38 (BD) (which illustrates the "sync control" sub-routine (BD) of FIG. 36 and in FIG. 33 which is a "check if done" CHKDN (BE) sub-routine of FIG. 38 and the relevant timing appears in FIG. 32.

FIG. 27 part B also illustrates diagrammatically the automatic synchronization mode in which the system waits for a synchronization signal during the estimated turning period, referred to as the window enable distance.

Figure 29:
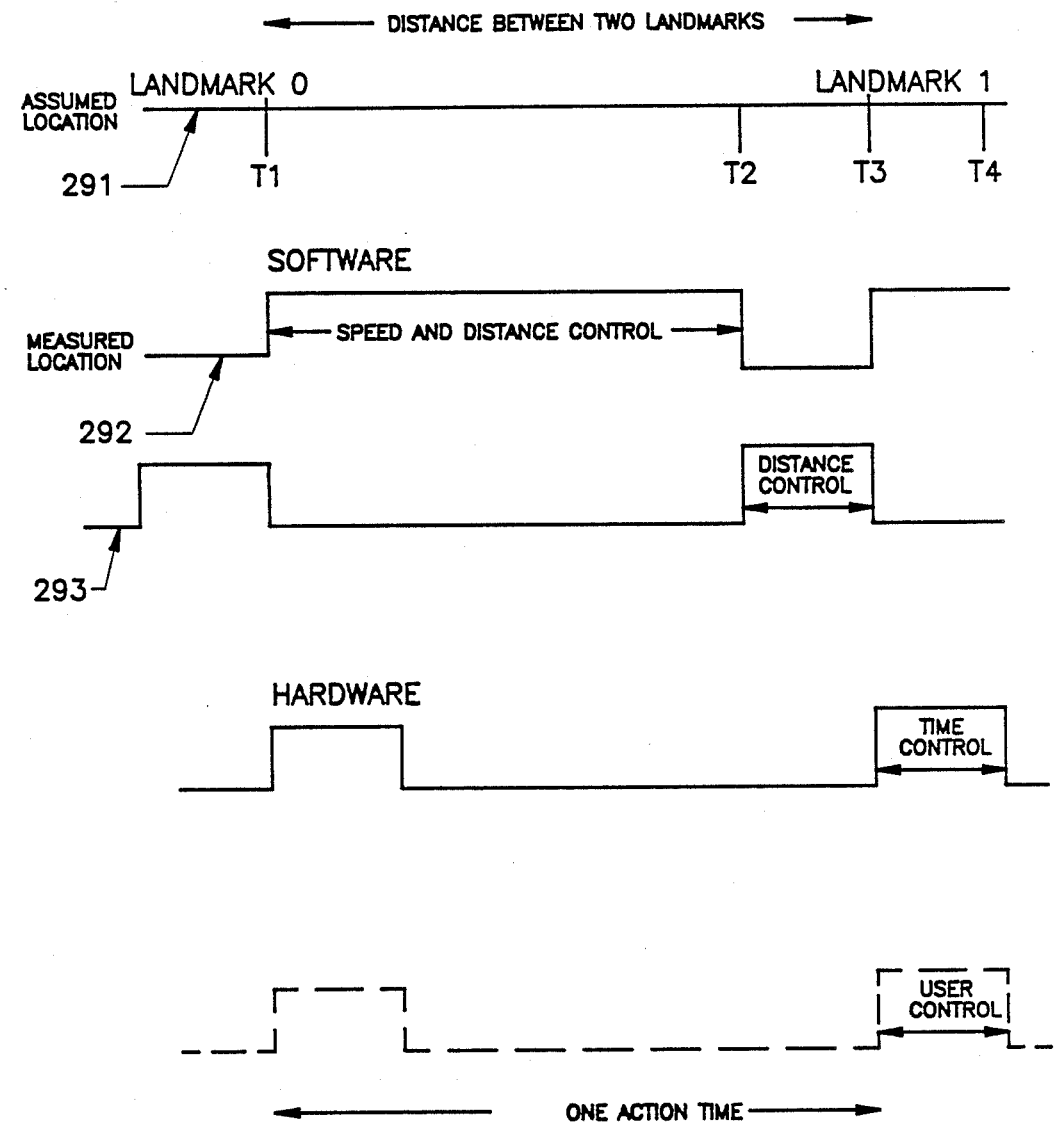
FIG. 29 is a timing diagram illustrating a cycle between two landmarks in the absence of automatic synchronization and assuming no errors.

FIG. 29 illustrates a cycle without automatic synchronization, assuming no errors. Landmark 1 thus occurs precisely at the end of the distance monitoring period.

Reference will now be made to FIGS. 30 and 31 which illustrate automatic synchronization. At landmark zero, at the time $T_1$, the action road counter begins counting the number of wheel revolutions. In parallel to this, the vehicle speed is checked. This process continues until the time $T_2$ when the vehicle is close enough to the approached landmark (landmark 1). At that time, the action instruction (usually a turn instruction) is emphasized for the driver. This display continues until $T_4$. From the time $T_2$, the vehicle location is monitored by counting the wheel revolutions and comparing to the distance as computed during the data processing stage, and illustrated in FIG. 53. In FIG. 30, where no synchronization takes place (perhaps because the driver missed the turn), this process continues until the time $T_4$ when the measured distance indicated by the action road counter equals the total computed distance of this action as stored in the action memory. In FIG. 31, automatic synchronization takes place at time $T_3$ before $T_4$ is reached. If an automatic synchronization is to take place, the process remains defined until the instant when the map measured distance as indicated by the action road counter added to the distance indicated by the accumulated error (d+) equals the computed distance stored in the action memory. The distance window (d+ +d−) is opened to await a turn after the vehicle has traveled the distance $d_m - d-$ as measured from map. If a sync signal is received, the process stops, as indicated at $T_3$ of FIG. 31. At the time $T_3$ (if sync is performed) or thereafter (if no synchronization is performed) the next action block is fetched from the action memory for the next action. The action road counter is reset to zero and begins counting the wheel revolutions for the forthcoming action. A trigger signal is provided to a hardware timer (indicated in the figures as "time control") for a constant time in order to provide a further period for the display before it is exchanged by data for the next cycle.

FIG. 32 similarly illustrates manual synchronization. Landmarks zero and one are two landmarks between which the action of manual synchronization is performed. At landmark zero, the action road counter begins counting the number of wheel revolutions. At the time $T_2$ when the distance measured by the vehicle indicates that the vehicle is now at a distance away from the approached landmark equal to the window distance, the system enters the waiting enable mode for a period corresponding to the computed distance d+ +d−. This is the only time when the system is enabled to accept the synchronization signal caused by the user. When the synchronization signal is accepted, the action road counter is set to zero (or a constant number representing the distance of the vehicle from the center of the intersection, e.g., 5 meters), and the vehicle is considered to be at the approached landmark.

T4 represents the point where the vehicle would be if manual synchronization was not effected. T3 represents the time when the vehicle reaches the approached landmark. As shown in FIG. 32, when synchronization has been executed the distance control stops exactly at the time T3. Also, as shown in FIG. 32, if synchronization is not executed, the distance control will stop only after the window enable period has lapsed, at the time T4.

When the time control period has lapsed, the CPU is interrupted to exchange the display. Below is a Table D illustrating the main operations during an action cycle, with reference to the timing T2, T3, and T4 of FIGS. 29-32.

TABLE D

| | |
|---|---|
| T2- | Emphasis "User Output" for coming action (instruction) for execution. |
| T4- | Output updating for user. |
| T3- | 1. Preparation for next action.<br>2. Fetch block of next action.<br>3. Next action cycle taking care of.<br>4. Giving trigger to timer which counts the "user output's" emphasis time, before display exchange. |

PATH IMPLEMENTATION

Reference will now be made to the path implementation process in more detail with reference to FIGS. 34 to 48. It has already been mentioned that FIG. 35 corresponds generally to the sub-routine already described with reference to FIG. 25. However, FIG. 35 is illustrated as comprising various sub-routines including "one action take care of" illustrated in more detail in FIG. 36, "preparation for next action" (BF) illustrated in more detail in FIG. 48.

Figure 36:
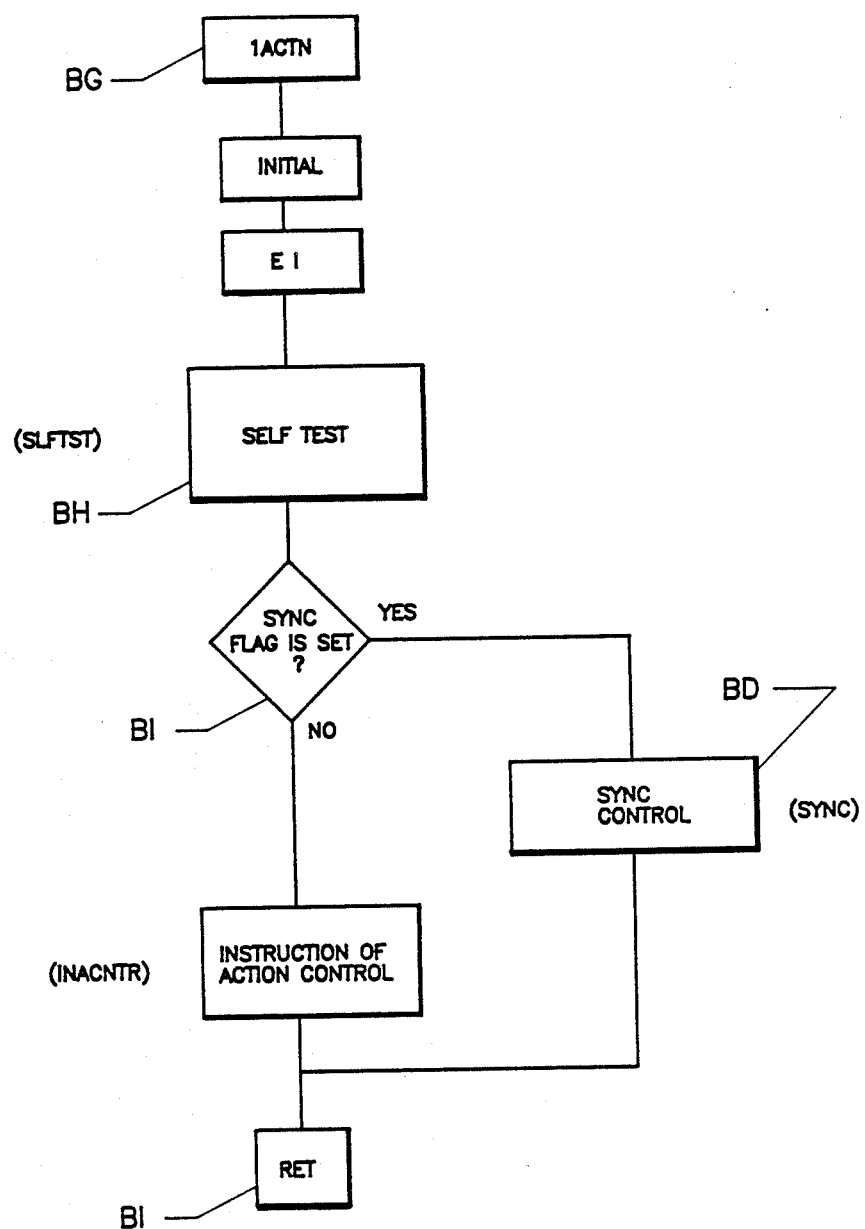
FIG. 36 is a flow chart illustrating the IACTN (one action block) subroutine of FIG. 35.
Figure 37:
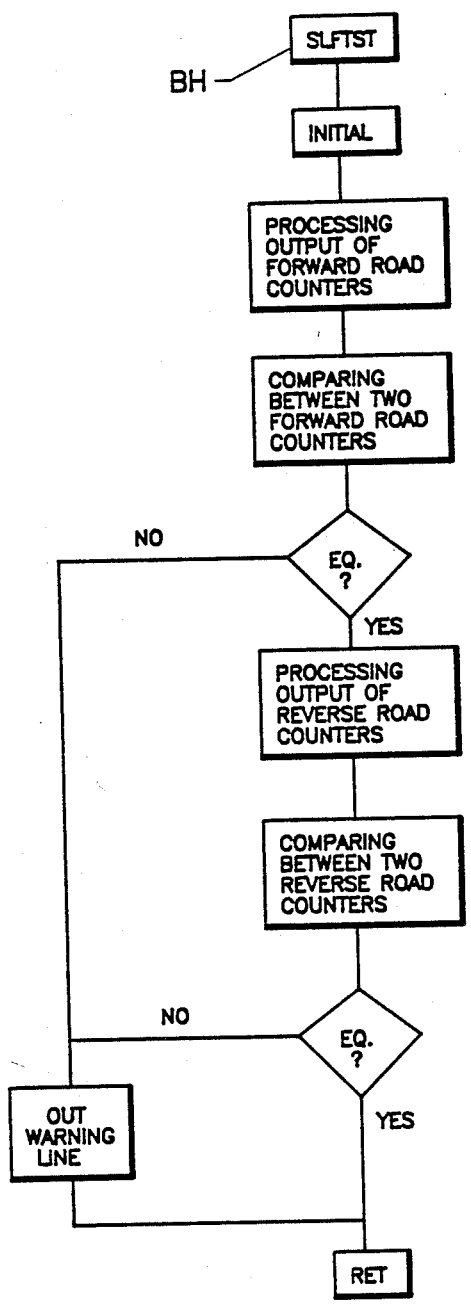
FIG. 37 is a flow cart illustrating the SLFTST (self test) subroutine of FIG. 36.

Referring now to FIG. 36, which is a sub-routine (BG) called from the routine of FIG. 35, following enabling of the interrupt of FIG. 34 and completion of the self-test routine (BH) (see FIG. 37), a check is made to see whether the sync flag is set (BI). If the sync flag is set, the routine SYNC BD of FIG. 38 is performed. A user warning is displayed if the EN sync flag is set, and then a check is made on the status of the sync action flag. If it is set, the distance is monitored until T2 (of FIG. 32), the sync road counter is enabled to start counting, and a manual synchronization signal is expected during the traveling period along the window enable distance (e.g, 50 meters).

The "sync road counter" is enabled (FIG. 38) (BH) to begin counting when the window enable distance is reached and the message for manual sync is displayed. These steps are illustrated in more detail in FIG. 38. If the sync road counter reaches the value equivalent to the accumulated error (d++d-) and no sync signal has been received, the procedure is ended. On the other hand, if a sync signal is received before the window enable distance is covered, the procedure is completed when the sync signal is received. The program then checks if the sync signal was received, and takes into account the case when it is not received. This is illustrated in the sub-routine (BE) of FIG. 33 (check if done). The program then returns to the end (BI) of the sub-routine (BG) illustrated in FIG. 36 from where it returns to the program illustrated in FIG. 35 at the "preparation for the next action" step (BF). This is illustrated in more detail in FIG. 48. The sub-routine concludes the current action and prepares for the next action by updating the action memory pointer and updating the flags.

Figure 39:
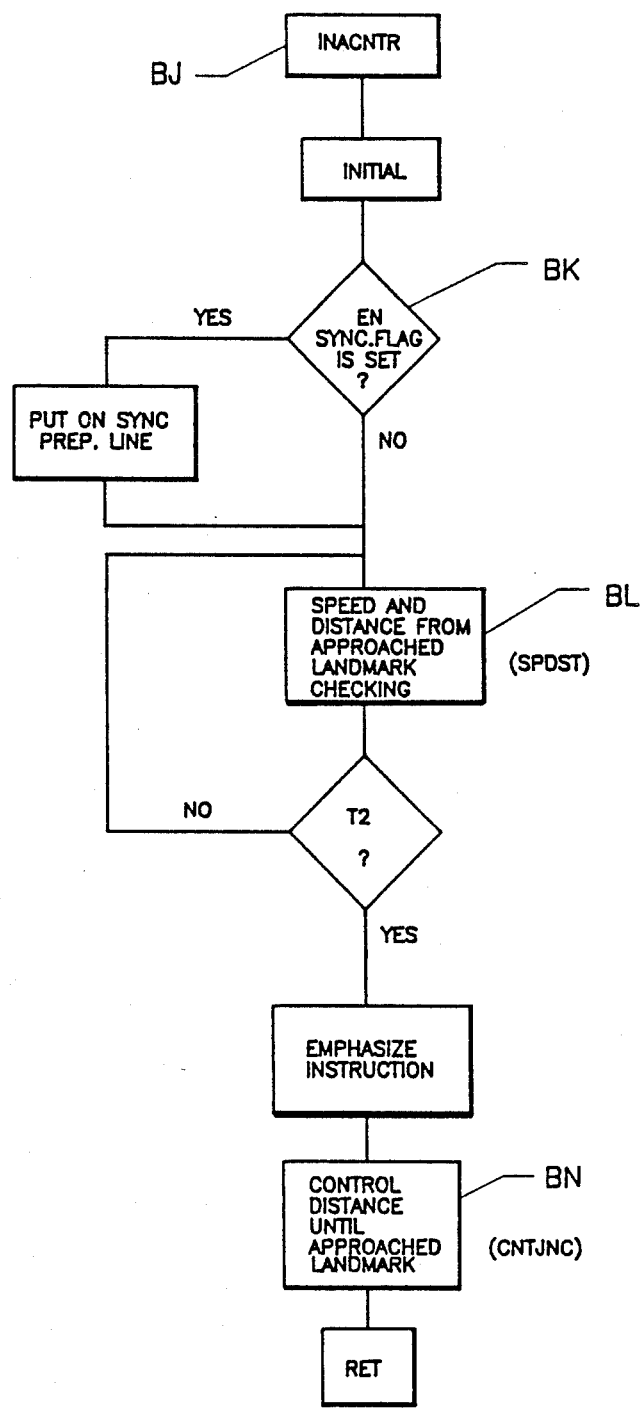
FIG. 39 is a flow chart illustrating the INACNTR (instruction of action control) subroutine of FIG. 38.

Reference will now be made to FIG. 39 which indicates the sub-routine INACNTR (BJ) "instruction of action control" which is followed if no sync flag is set at the decision block illustrated in FIG. 36. If the enable sync flag is set (BK), a warning of forthcoming manual synchronization is displayed to the user. The speed and distance from the first landmark (landmark zero) are continually monitored until the time T2. At time T2, a message is highlighted for the user and from this point on until or around the approached landmark only the distance travelled by the vehicle is monitored.

Figure 40:
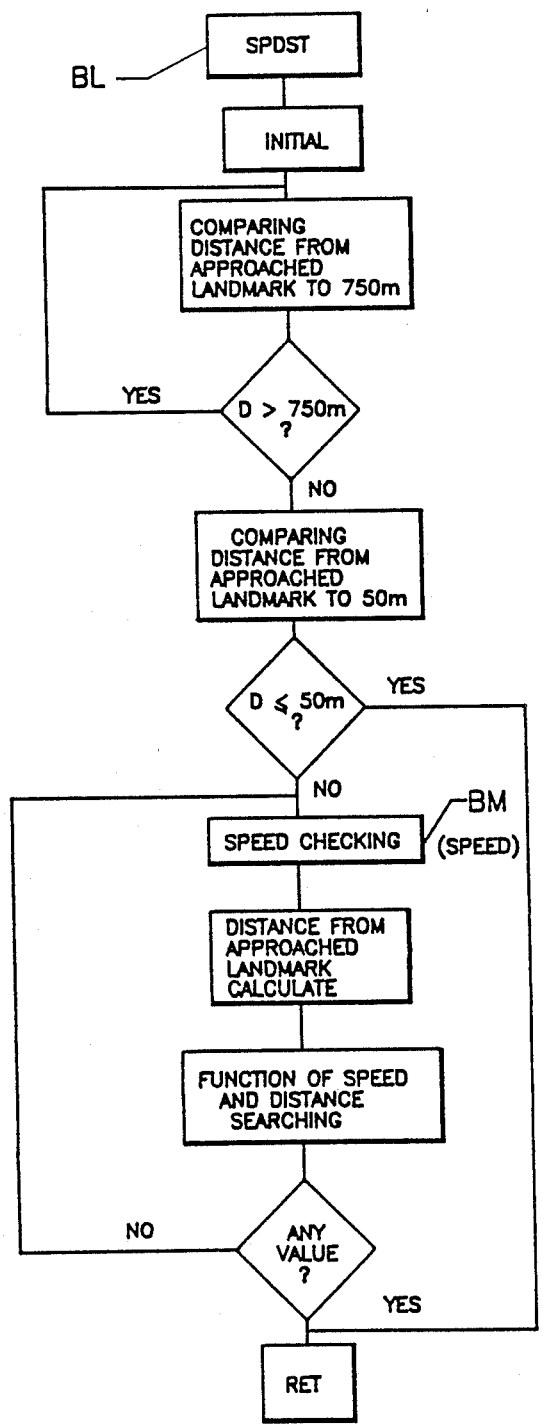
FIG. 40 is a flow chart illustrating the SPDST (speed and distance) subroutine of FIG. 30 used in accordance with the vehicle speed and distance to a junction.

The sub-routine SPDST (BL) mentioned in FIG. 39 is illustrated in more detail in FIG. 40. This procedure searches for the time T2 at a distance in the range of 50 to 750 meters from the approached landmark.

Figure 41:
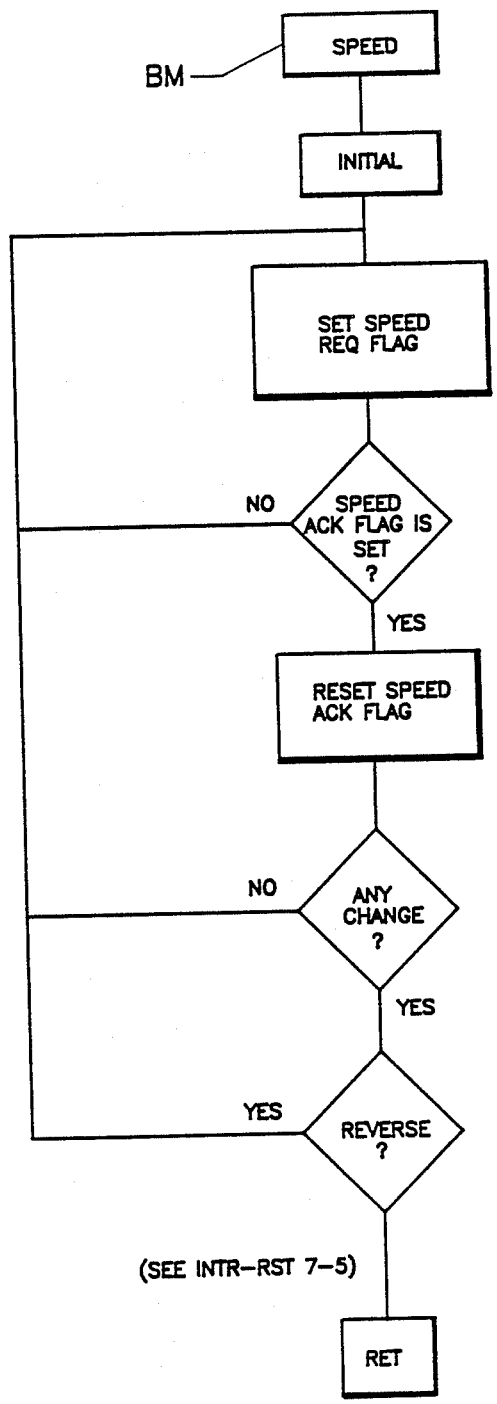
FIG. 41 is a flow chart illustrating the speed (vehicle speed checking) subroutine of FIG. 40 to work in connection with FIG. 34.

The sub-routine SPEED of FIG. 41 operates in conjunction with the interrupt illustrated in FIG. 34, in order to measure the vehicle speed.

Figure 42:
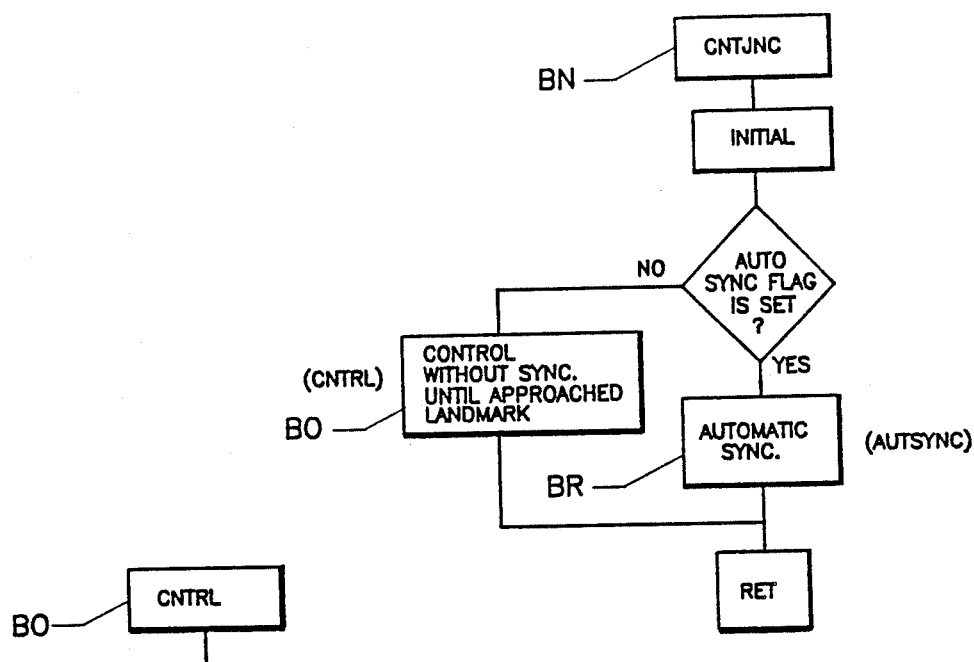
FIG. 42 is a flow chart illustrating the CNTJNC (control distance to junction) subroutine of FIG. 39.

FIG. 42 illustrates sub-routine CNTJNC (BN) called from the routine of FIG. 39. It illustrates the sequence form the time T2 until the cycle is completed.

Figure 43:
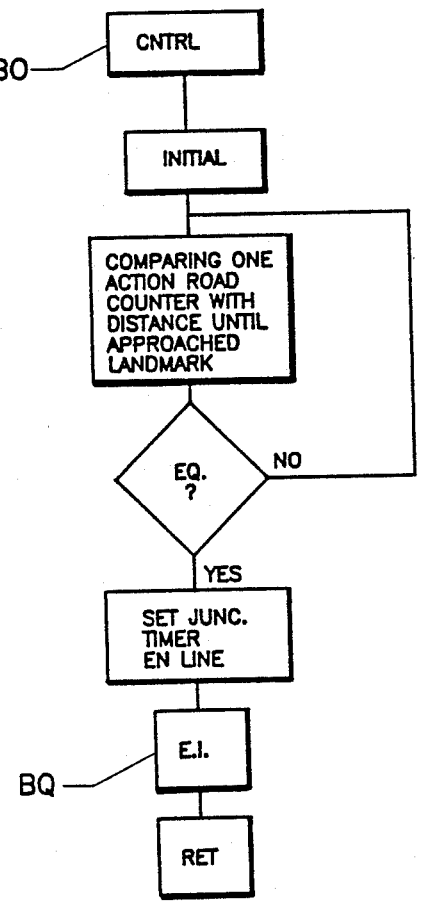
FIG. 43 is a flow chart illustrating the CNTRL (control distance) subroutine of FIG. 42.
Figure 44:
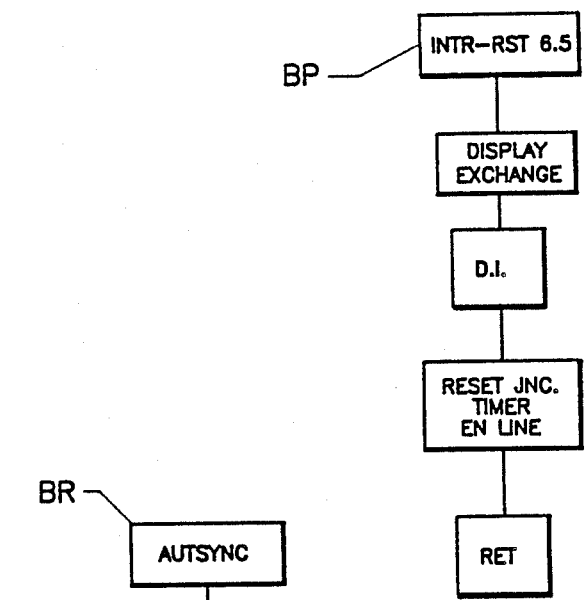
FIG. 44 is a flow chart illustrating interrupt for exchanging display in conjunction with FIG. 43 and FIG. 45.

FIG. 43 illustrates the sub-routine CNTRL (BO) entered if no auto sync flag is set in the routine of FIG. 42. It illustrates the sequence from T2 until the time when the vehicle is near landmark 1 when the action involves no synchronization, i.e., when the vehicle should pass straight through a junction without turning. When the distance indicated by contents of the one action road counter is equal to the distance indicated by the number of wheel revolutions expected in the cycle stored in the action memory, a hardware timer is enabled (time control of FIGS. 29 to 32). When the timer has lapsed, the procedure BP illustrated in FIG. 44 is initiated as a result of an interrupt signal following the enabling of the interrupt BQ by a CPU command, at the end of the sub-routine of FIG. 43.

Figure 45:
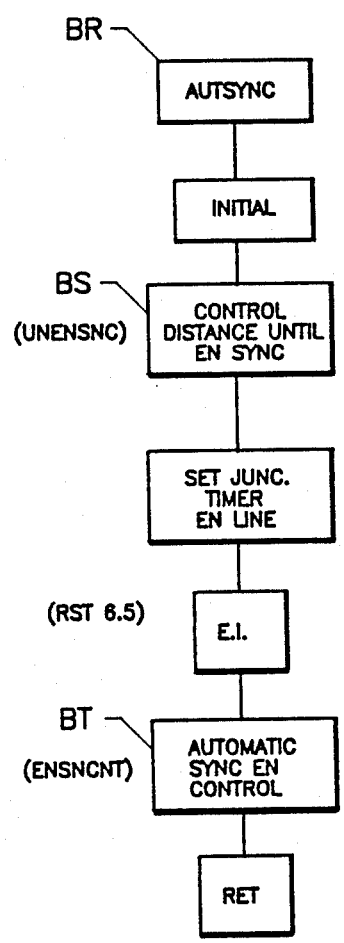
FIG. 45 is a flow chart illustrating the AUTSYNC (automatic synchronization around a junction) subroutine of FIG. 42.
Figure 46:
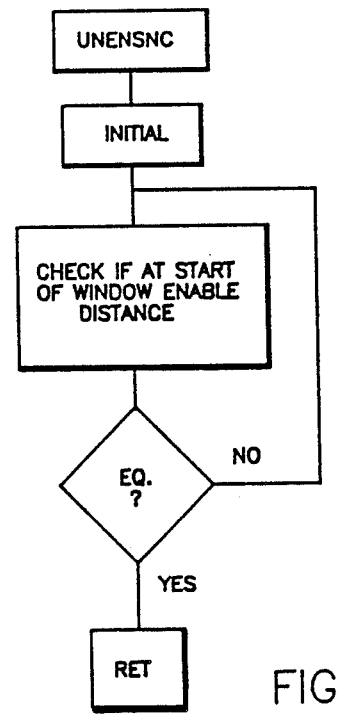
FIG. 46 is a flow chart illustrating the UNENSNC (distance control until synchronization is enabled) subroutine of FIG. 45.

Reference will now be made to FIG. 45 which illustrates the automatic synchronization process, sub-routine AUTSYNC (BR). This sub-routine is entered following a positive result to the "auto sync flag set" decision of the sub-routine illustrated in FIG. 42. As illustrated, the first step is a sub-routine UNENSNC (BS) illustrated in FIG. 46 which repeatedly checks if the starting point of the window enable distance is reached. When equality is detected, the procedure is ended.

Figure 47:
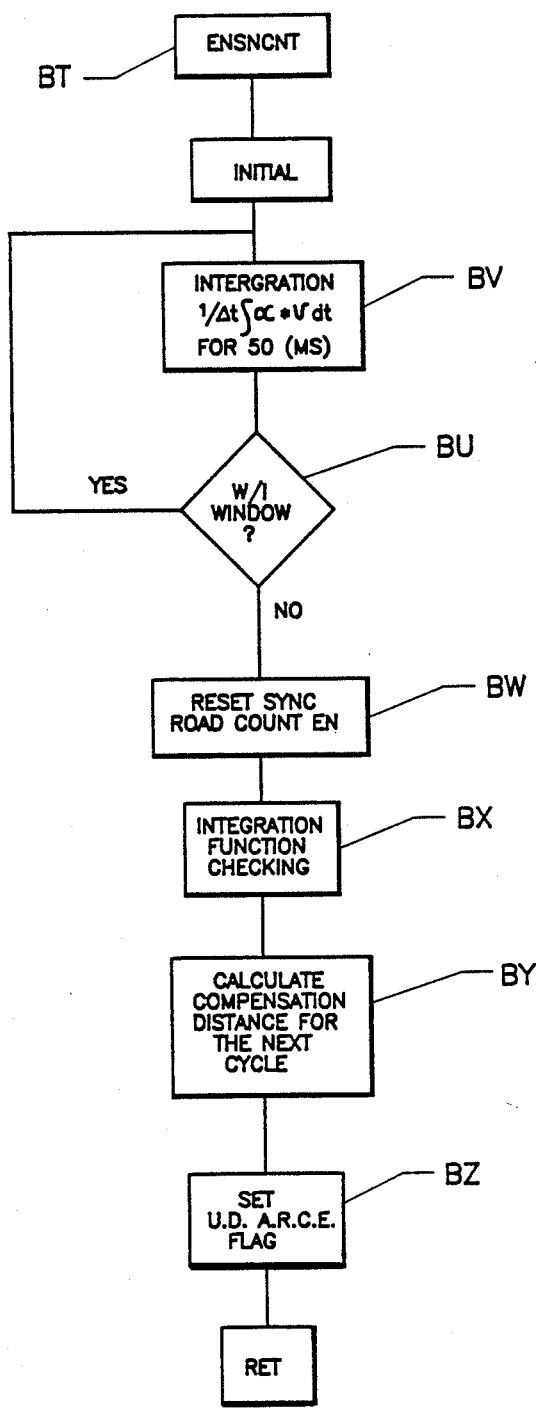
FIG. 47 is a flow chart illustrating the ENSNCNT subroutine of FIG. 45 specifying how data generated by an angle sensor or a turn detecting means is employed to synchronize vehicle position with a junction using an action road counter.

In the second major step of the auto synchronization process, the sub-routine ENSNCNT (BT) is entered, which is illustrated in more detail in FIG. 47. Referring to this figure, it will now be shown how the data generated from the turn detector enables accurate synchronization of the vehicle location indicated by the sequence action data with actual vehicle location detected by the turn detector in the distance window around an approached landmark.

In this connection, reference should be made to FIG. 49 illustrating three possibilities A, B and C for a left turn, and FIG. 50 illustrating the steering wheel direction turning with reference to the vehicle location on a road during a turning period within the window enable distance 501 around an approached landmark 502. During the window enable distance 501, the location of the actual turn is detected. A continual check is made to determine whether the vehicle is within the window enable distance (within the window?) (BU), so that the turn will only be detected during this distance. Detection of the turn is based on the principle that the actual angle through which the vehicle turns in a given time interval is proportional to the integration of the measured speed (v) multiplied by the measured angle over that time interval (50 ms in this example). Thus, the turn is detected according to the following steps:

1. An integration over 50 milliseconds is repeatedly carried out and the value of the integration and the associated location are stored (BV).
2. It is repeatedly checked whether the vehicle is within the window enable distance (BU).
3. If the vehicle is no longer within the window enable distance, the sync road counter is stopped (BW).

The turn location is then calculated in the "integration function checking" step (BX).

FIG. 51 illustrates the integration results during the window period for each of the possibilities A, B and C illustrated in FIG. 49. The point where the integration is the greatest (i.e., a maximum) may be regarded the closest point to the center of the intersection. The angle is the measured angle which may be the angle of the front wheels of the vehicle or the angle of the steering wheel relative to the center line of the vehicle.

The turn location is determined according to the data stored in step BV by determining the location at which the integration result is a maximum. For this location, a value is then calculated to indicate the difference between the measured distance (action road counter) and the distance stored in action memory for compensation purposes in the following action.

Figure 48:
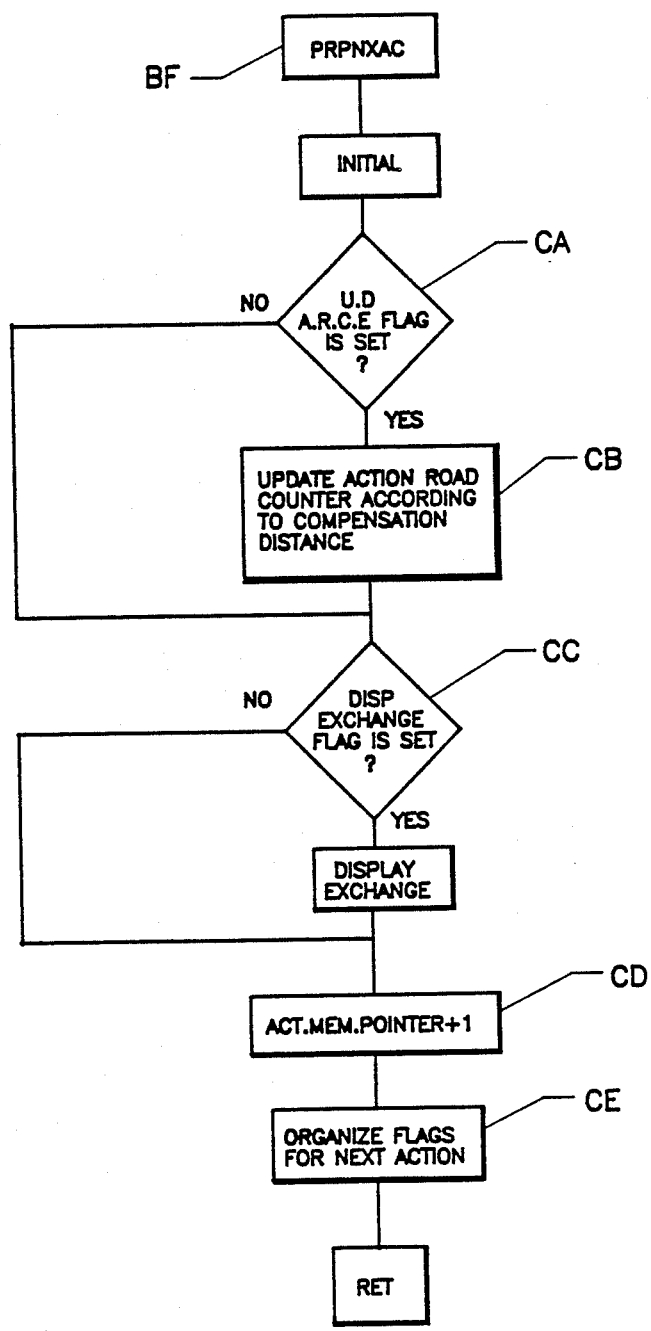
FIG. 48 is a flow chart illustrating the PRPNXAC (preparation for the next action subroutine of FIG. 35 wherein the process update action road counter is employed.

Having calculated the compensation distance (BY) (FIG. 47) for the next action and set the update action road counter enable flag (BZ), the program concludes the process of FIG. 36 (BG) and advances to the next block of FIG. 35 "preparation for next action" (BF) which is set forth in more detail in FIG. 48.

First all, the program checks whether an automatic synchronization has been performed, indicated in the figure as "update action road counter enable flag is set?" (CA). If the road counter enable flag is set, appropriate compensation is made (CB) to the action road counter and various other flags are checked and reset (CC, CD, CE) where necessary. The program then returns to the path implementation procedure of FIG. 35, and the data for the next action are taken from action memory (CF).

Figure 54:
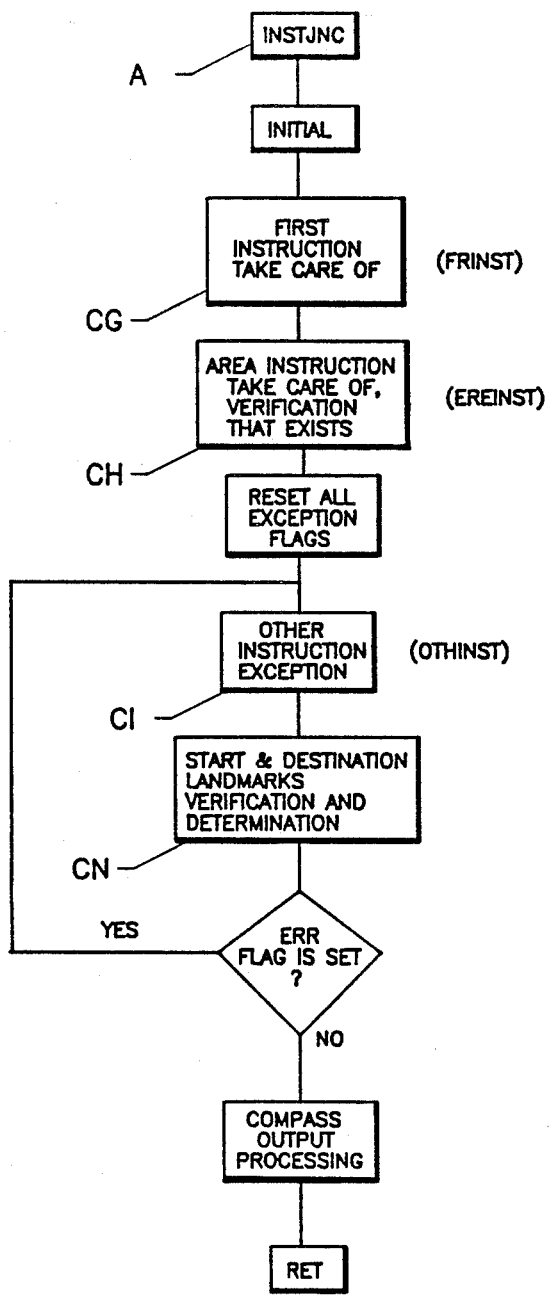
FIG. 54 is a flow chart illustrating the INSTJNC (initial instruction from user) subroutine of FIG. 4 illustrating operations from the point of view of a vehicle operator
Figure 56:
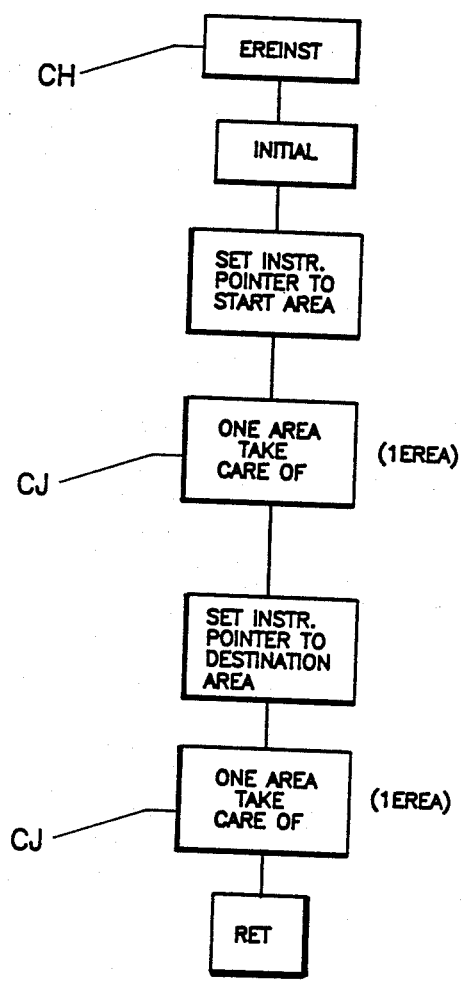
FIGS. 55 and 56 are flow charts illustrating respectively the FRINST (first instruction) subroutine and EREINST subroutine of FIG. 54.
Figure 55:
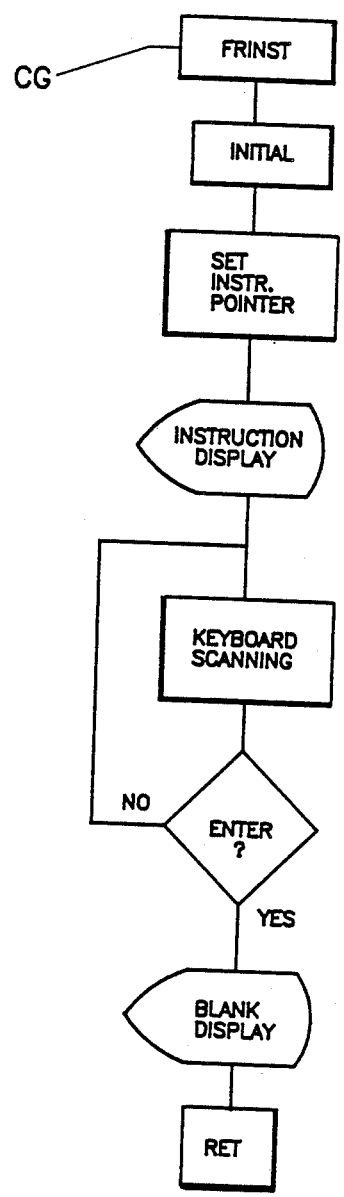
Figure 57:
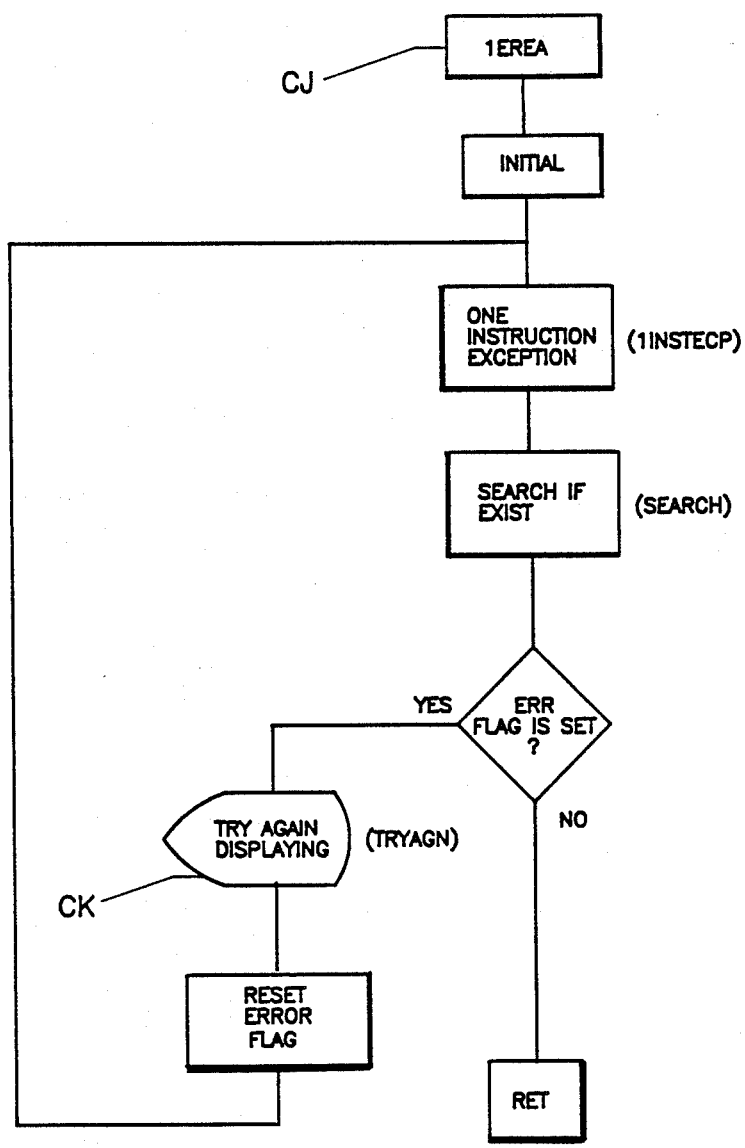
FIG. 57 is a flow chart illustrating the IEREA (one area) subroutine of FIG. 56.
Figures 58, 59:
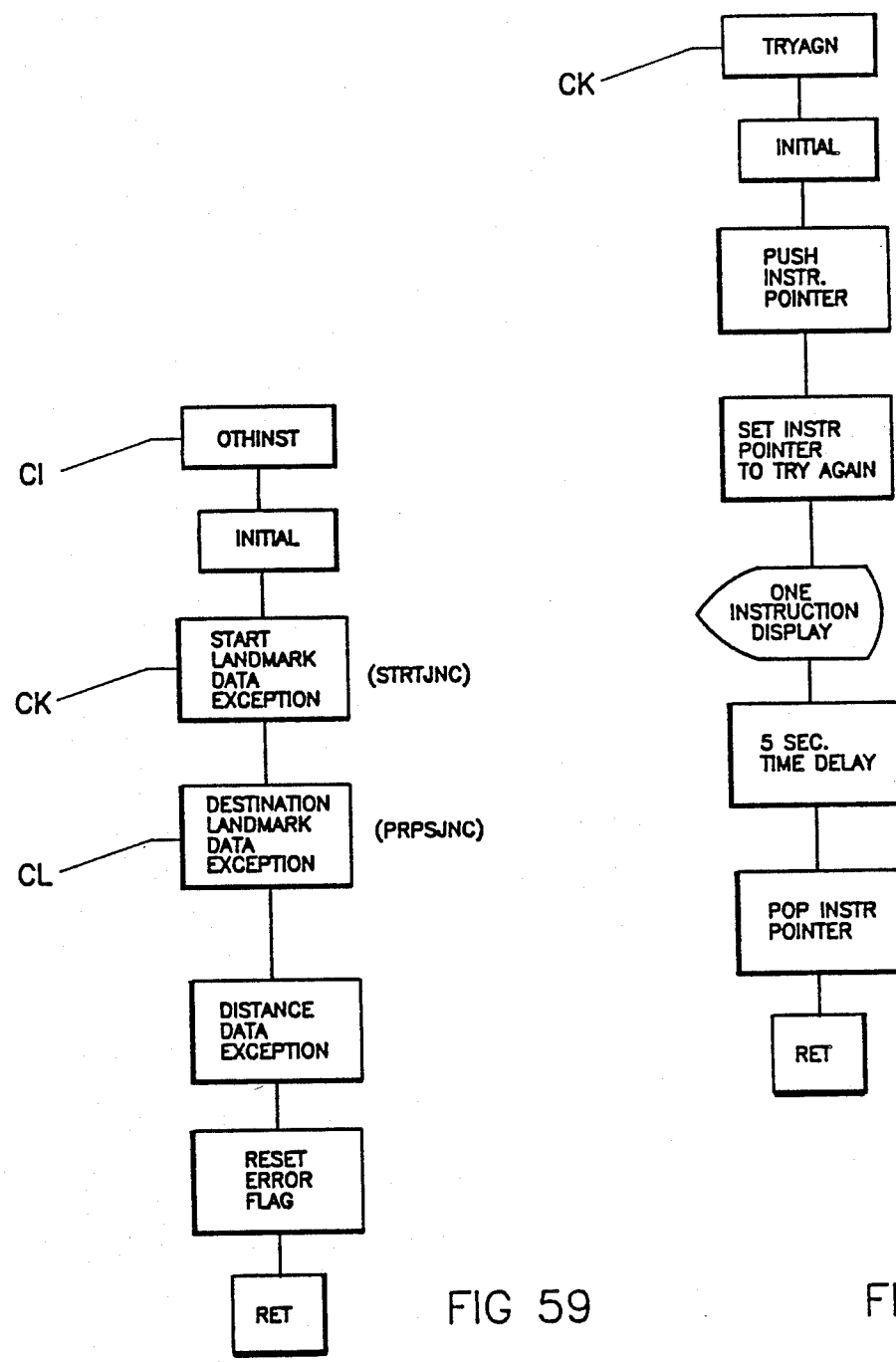
FIG. 58 is a flow chart illustrating the TRYAGN (try again) subroutine of FIG. 57.
FIG. 59 is a flow chart illustrating the OTHINST (other instruction) subroutine of FIG. 54.
Figure 60:
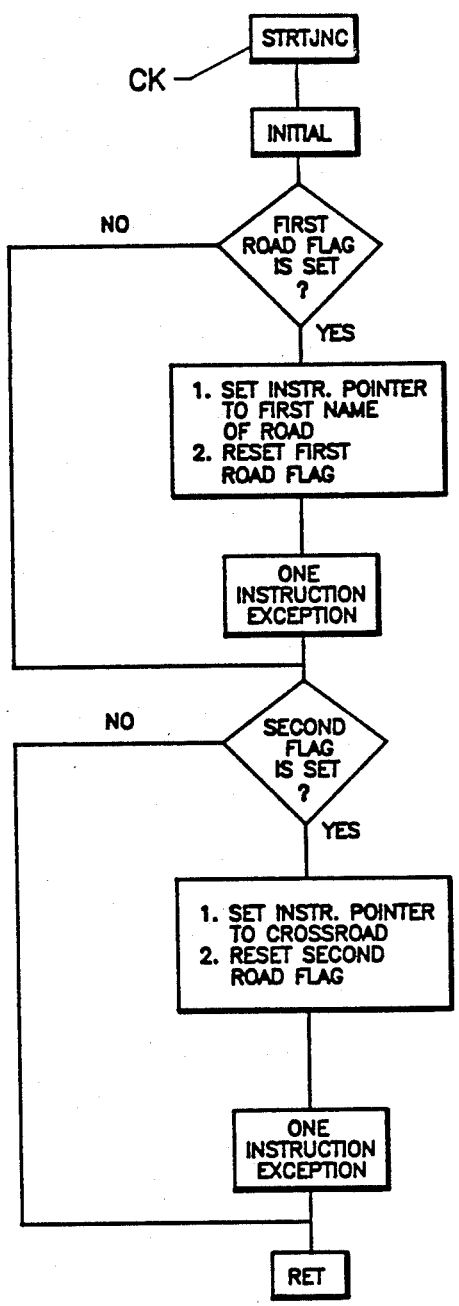
FIG. 60 is a flow chart illustrating the STRTJNC (start junction) subroutine of FIG. 59.
Figure 61:
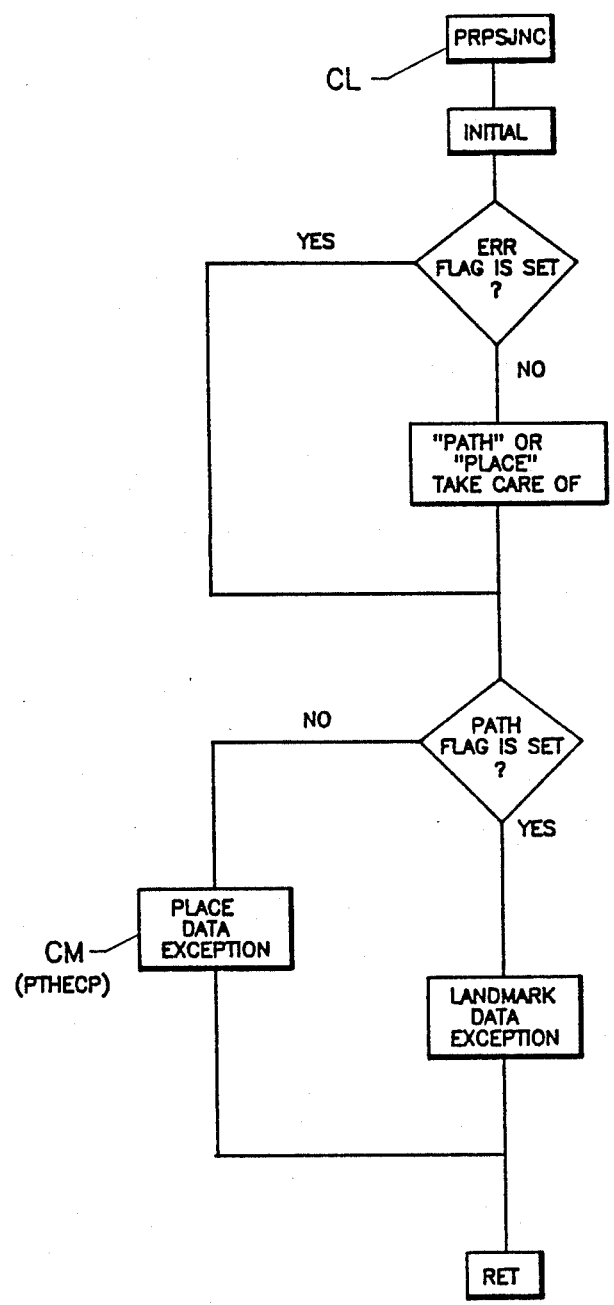
FIG. 61 is a flow chart illustrating the PRPSJNC (proposed destination junction) of FIG. 59.
Figure 62:
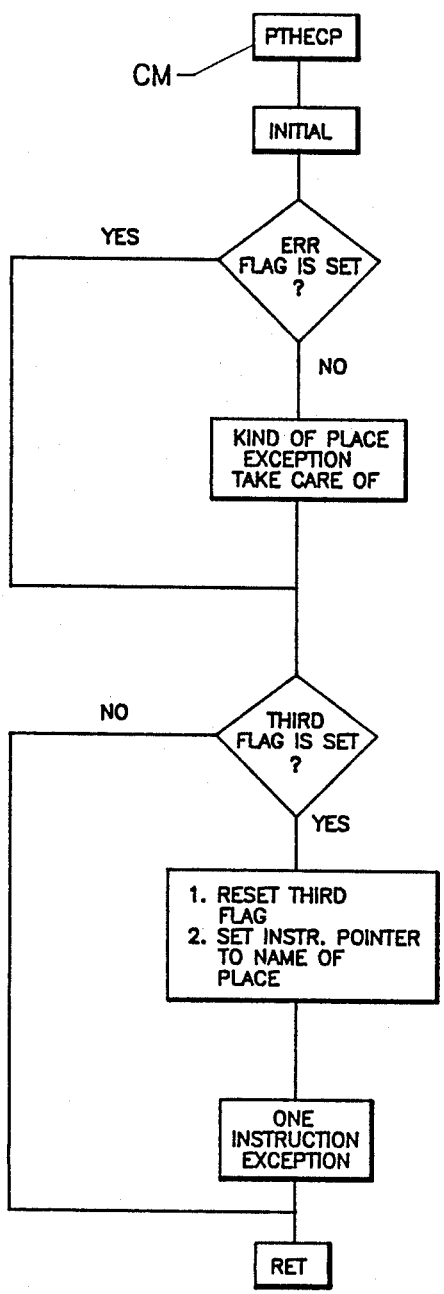
FIG. 62 is a flow chart illustrating the PTHECP (path data exception) subroutine of FIG. 61.
Figure 63:
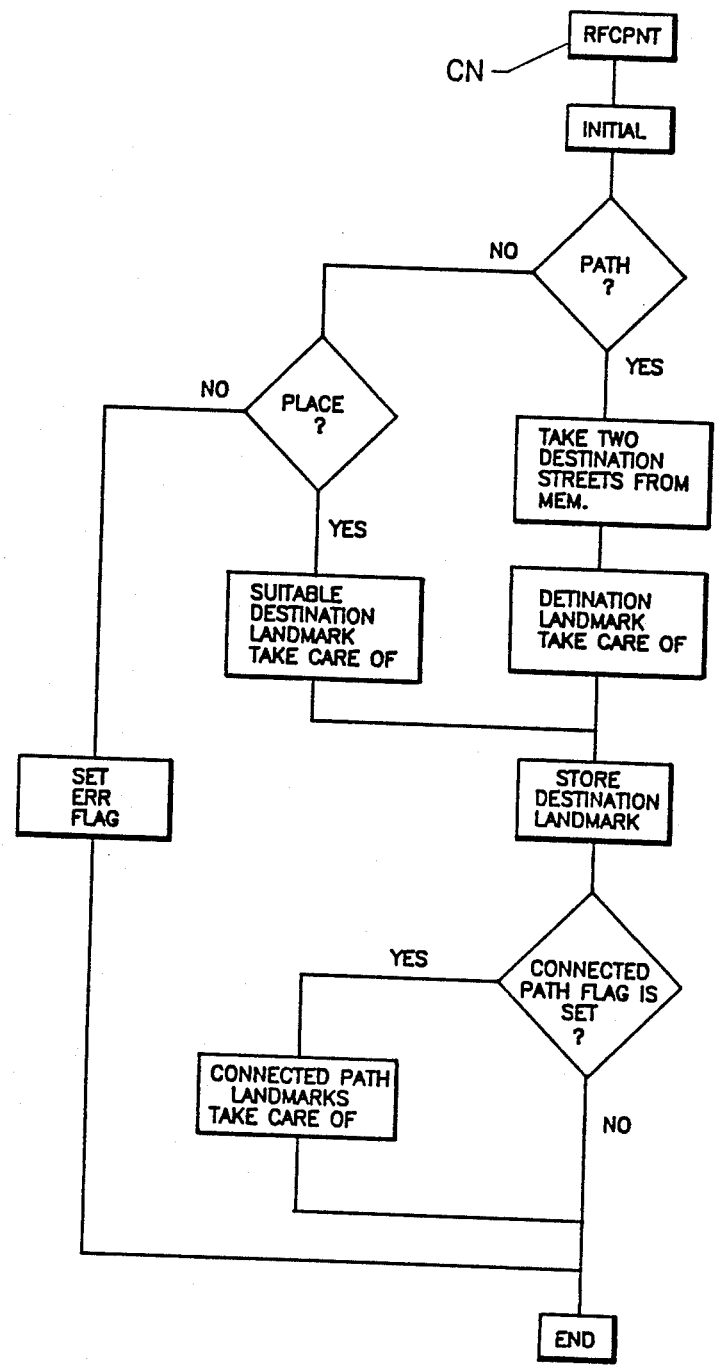
FIG. 63 is a flow chart illustrating the RFCPNT (reference point coordinate verification and determination) subroutine of FIG. 54.
Figure 64:
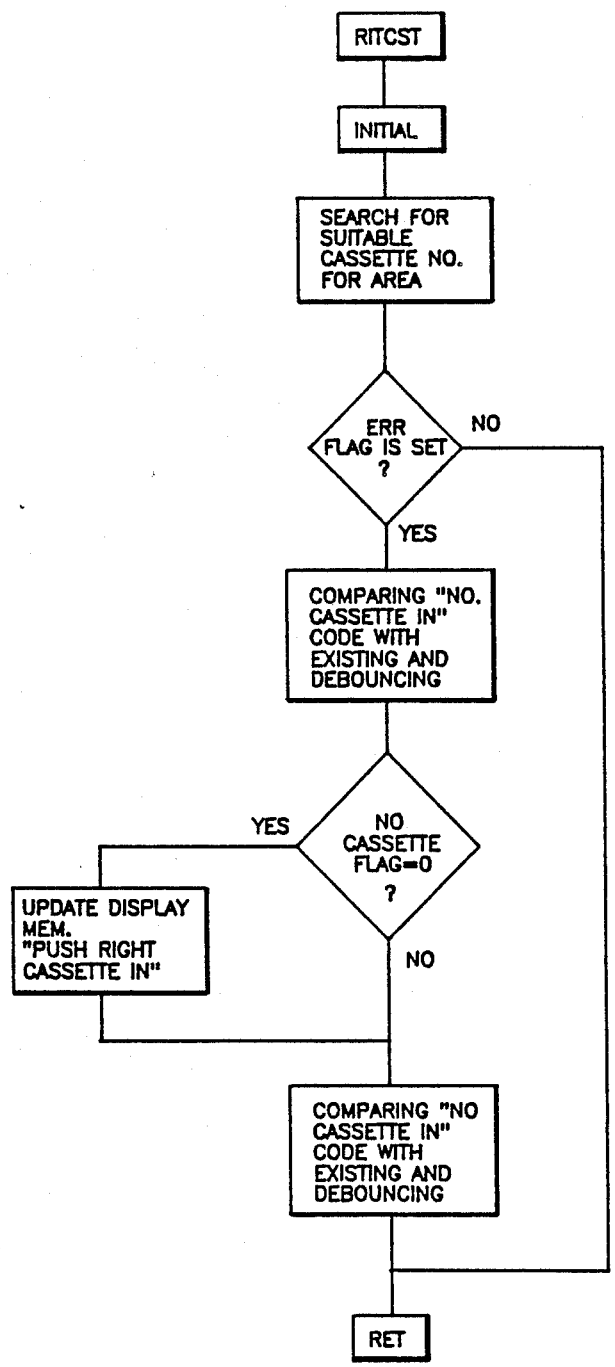
FIG. 64 is a flow chart illustrating the RITCST (read in title of cassette/plug-in unit) routine for verifying that the proper map data has been supplied.
Figure 65:
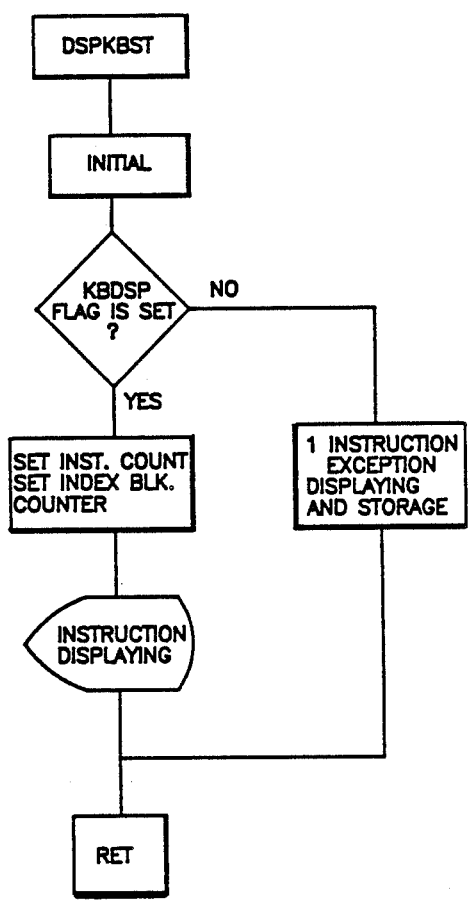
FIG. 65 is a flow chart illustrating a first DSKBST (display keyboard status) routine to determine whether there are more instructions to accept and to ensure proper display of information to and from operator.

The sub-routine INSTJNC (A) of FIG. 54, with its associated sub-routine of FIGS. 55 to 63, illustrate the routine INSTJNC (A) of FIG. 4 from the point of view of the vehicle operator. FIG. 64, 65 and 66 are routines for verifying map data and displaying keyboard status. No detailed description will be given of these figures, which are largely self-explanatory.

The invention has now been explained in detail with reference to specific embodiments. Other embodiments will be apparent to those of ordinary skill in this art upon reference to the specification within undue consideration or experimentation. It is therefore not intended that this invention be limited except as indicated by the appended claims.

I claim:

1. A vehicle navigation system comprising:
    means for storing map data representing a road network, said data comprising information about landmarks, said information comprising landmark identifiers, landmark location and landmark characteristics of said landmarks in said road network, map distances between said landmarks, and path characteristics between adjacent landmarks;
    means for receiving start location data indicating vehicle start location;
    means for receiving destination data indicating a desired destination;
    means coupled to said map data storing means for establishing a route comprising sequence data, said sequence data indicating a sequence of landmark identifiers;
    first processing means coupled to said route establishing means for receiving said sequence data and for computing sequence action data, said sequence action data comprising computed lineal distances between landmarks and status data related to an approached landmark;
    distance measuring means for measuring distance travelled by said vehicle to provide measured distance data;
    means for detecting vehicle movement in a distance window only around said approached landmark to provide movement data indicative of change in motion of said vehicle;
    second processing means coupled at least to said first processing means, to said distance measuring means, and to said vehicle movement detecting means for receiving said movement data, said distance data and said sequence action data, for supplying output data indicative of current location or expected actions in sequence for aiding a driver of the vehicle to adhere to the route; and
    output means for supplying the output data in a form discernible by the driver.

2. A system according to claim 1 wherein said second processing means is operable to synchronize said sequence action data with actual vehicle location based on said vehicle movement data in said distance window around said approached landmark.

3. A system according to claim 1 wherein said output means provides at least one of a visual display and an audible spoken output.

4. A system according to claim 1 wherein said map data storing means further includes means for receiving a non-volatile memory device storing data representing a street map.

5. A system according to claim 4 wherein the non-volatile memory device is a plug-in unit.

6. A system according to claim 1 wherein said distance measuring means comprises a transducer device for providing an electrical signal representing vehicle wheel revolution.

7. A system according to claim 1 wherein said movement detecting means comprises a transducer device for providing an electrical signal representing angular position of a steering wheel of the vehicle.

8. A system according to claim 1 wherein said first processing means and said second processing means comprise a plurality of program sequences for a microprocessor unit and a read only memory storing said programming sequences for said microprocessor unit.

9. A system according to claim 1 wherein said movement detecting means is for indicating a change in direction of travel relative to current direction of travel toward said approached landmark.

10. A system according to claim 9 wherein said movement detecting means includes an angle sensor for sensing angle of steering relative to a tangent to direction of travel of said vehicle.

11. A system according to claim 10 wherein said movement detecting means further includes a momentary speed detection means for detecting instantaneous speed of said vehicle.

12. A system according to claim 11 wherein said momentary speed detection means is for measuring speed of the vehicle within a distance around said approached landmark, and wherein said second processing means employs outputs of said angle sensor and of said momentary speed detection means to compute degree of change of orientation.

13. A system according to claim 1 further including computing means coupled to said first processing means for establishing size of said distance window at least as a function of computed distance to said approached landmark in order to improve resolution of movement around said approached landmark.

14. A system according to claim 1, wherein said route establishing means comprises third processing means coupled to said data storing means, to said start location receiving means and to said destination data receiving means for computing a route through said road network prior to a journey, said route comprising sequence data indicating a sequence of said identifiers of landmarks.

15. A system according to claim 2 wherein said movement detecting means is for indicating a change in direction of travel relative to current direction of travel toward said approached landmark.

16. A vehicle navigation system according to claim 1 wherein said second processing means further includes means for comparing expected movement data with actual movement data to generate run error data for aiding the driver of the vehicle to adhere to the route.

17. A vehicle navigation system according to claim 1 wherein said start location receiving means includes means for receiving an indication of vehicle location relative to magnetic North.

18. A vehicle navigation system comprising:
means for storing distance data between landmarks;
distance measuring means for measuring distance travelled by said vehicle from a know location to provide distance data;
window enable means for defining a distance window around an approached landmark to provide window data indicative of vehicle location relative to said approached landmark;
means for detecting vehicle movement only in a distance window around said approached landmark to obtain movement data indicative of change in motion of said vehicle; and
processing means coupled to said distance measuring means, to said window enable means and to said vehicle movement detecting means for receiving from said vehicle movement detecting means said movement data, and from said window enable means said window data for synchronizing said stored distance data with actual vehicle location based on said vehicle movement data in said distance window around said approached landmark.

19. A system according to claim 18 wherein said movement detecting means is for indicating a change in direction of travel relative to direction of travel toward said approached landmark.

20. A system according to claim 19 wherein said movement detecting means includes an angle sensor for sensing angle of steering relative to a tangent to direction of travel of said vehicle.

21. A system according to claim 20 wherein said movement detecting means further includes a momentary speed detection means for detecting instantaneous speed of said vehicle.

22. A system according to claim 21 wherein said momentary speed detection means is for measuring speed of the vehicle only in a distance window around said approached landmark, and wherein said processing means employs output of said angle sensor and of said momentary speed detection means to compute degree of change of orientation.

23. A system according to claim 18 further including computing means coupled to said window enable means for establishing size of said distance window as a function of at least computed distance to said approached landmark in order to improve resolution of movement around said approached landmark.

24. A vehicle navigation system according to claim 18 further including means for automatically scaling between two preselected landmarks, said scaling means comprising:
means for comparing a value representative of said stored distance with a value representative of said measured distance between said two preselected landmarks to obtain a scaling factor; and
means for storing said scaling factor.

25. A vehicle navigation system according to claim 24 wherein said measured distance is directly proportional to the number of wheel revolutions of a vehicle axle.

26. A method for navigating a vehicle comprising:
storing map data representing a road network, said map data comprising information about landmarks, said information comprising landmark identifiers, landmark location and landmark characteristics of said landmarks in said road network, map distances between said landmarks and path characteristics between adjacent landmarks;
receiving start location data indicating vehicle start location;
receiving destination data indicating a desired destination;
establishing a route comprising sequence data indicating a sequence of landmark identifiers;
computing sequence action data from said sequence data, said sequence action data comprising computed lineal distances between landmarks and status data related to an approached landmark;
measuring distance travelled by said vehicle to provide measured distance data;
detecting vehicle movement in a distance window only around said approached landmark to provide movement data indicative of change in motion of said vehicle;
comparing said movement data with said status data of said sequence action data and said measuring distance data with said computed lineal distances of said sequence action data and supplying output data indicative of expected actions in sequence for aiding a driver of the vehicle to adhere to the route; and
supplying the output data in a form discernible by the driver.

27. A navigation system for a vehicle comprising means for receiving data indicating an actual vehicle location; means for storing data representing a road network; means for measuring distance travelled by said vehicle; turn detecting means for detecting a turn by the vehicle and providing a turn signal in response thereto; means for receiving destination data indicating a desired destination; computing means for computing a route through said road network from the actual vehicle location to the desired destination; processing means for receiving data from the distance measuring means, for computing the actual vehicle location therefrom and for preparing instruction data for aiding a driver of the vehicle to adhere to said route; output means for supplying the instruction data in a form discernible by the driver; window enable means for defining a distance window in which a significant turn will be made by the vehicle when following said route; and synchronizing means operative to synchronize the computed route with actual vehicle location based on said turn detecting means producing a signal indicating a significant turn within said distance window.

28. A system according to claim 27 wherein the turn detecting means is operative to provide data representing an angle through which the vehicle has turned.

29. A system according to claim 27 wherein the output means provides at least one of a visual display and an audible spoken output.

30. A system according to claim 27 further including means for receiving a non-volatile memory device storing data representing a street map.

31. A system according to claim 30 wherein the memory device is a plug-in-unit.

32. A system according to claim 27 further comprising a compass located externally of the vehicle and operative to provide an electrical output representing the vehicle orientation before a journey begins.

33. A system according to claim 27 wherein said means for measuring distance comprises a transducer device arranged to provide an electrical signal representing vehicle wheel revolutions.

34. A system according to claim 33 wherein on detection of said turn signal within any distance window said processing means is operative to calibrate the scale factor relating distance travelled to the number of wheel revolutions.

35. A system according to claim 27 wherein said turn detecting means comprises a transducer device operative to provide an electrical signal representing angular position of a steering wheel of the vehicle.

36. A system according to claim 27 wherein said processing means comprises a microprocessor unit and a read only memory storing a program for said microprocessor unit.

* * * * *